(12) United States Patent
Radichel et al.

(10) Patent No.: US 11,025,039 B2
(45) Date of Patent: Jun. 1, 2021

(54) TRANSMISSION LINE INSTALLATION SYSTEM

(71) Applicant: Condux International, Inc., Mankato, MN (US)

(72) Inventors: Bradley P. Radichel, Edina, MN (US); David J. Stockton, Woodbrige (GB); Eric L. Cope, Mankato, MN (US); Michael Wayne Brooks, Owatonna, MN (US)

(73) Assignee: CONDUX INTERNATIONAL, INC., Mankato, MN (US)

( * ) Notice: Subject to any disclaimer, the term of this patent is extended or adjusted under 35 U.S.C. 154(b) by 0 days.

(21) Appl. No.: 16/349,920

(22) PCT Filed: Nov. 14, 2017

(86) PCT No.: PCT/US2017/061621
§ 371 (c)(1),
(2) Date: May 14, 2019

(87) PCT Pub. No.: WO2018/090043
PCT Pub. Date: May 17, 2018

(65) Prior Publication Data
US 2019/0341752 A1 Nov. 7, 2019

Related U.S. Application Data

(60) Provisional application No. 62/421,698, filed on Nov. 14, 2016.

(51) Int. Cl.
*H02G 1/08* (2006.01)
*G01V 11/00* (2006.01)
(Continued)

(52) U.S. Cl.
CPC ............ *H02G 1/086* (2013.01); *G01V 11/002* (2013.01); *G02B 6/4464* (2013.01); *G02B 6/52* (2013.01); *H02G 1/085* (2013.01)

(58) Field of Classification Search
CPC ...... G01V 11/002; G02B 6/4464; G02B 6/50; G02B 6/52; H02G 1/085; H02G 1/086
(Continued)

(56) References Cited

U.S. PATENT DOCUMENTS

| | | |
|---|---|---|
| 3,862,497 A | 1/1975 | Vernooy et al. |
| 3,973,441 A | 8/1976 | Porter |

(Continued)

FOREIGN PATENT DOCUMENTS

| | | |
|---|---|---|
| DE | 10106614 C1 | 5/2002 |
| DE | 202015004691 U1 | 7/2015 |

(Continued)

OTHER PUBLICATIONS

International Search Report and Written Opinion for PCT/US2017/061621, dated Mar. 26, 2018.

(Continued)

*Primary Examiner* — Joseph J Hail
*Assistant Examiner* — Arman Milanian
(74) *Attorney, Agent, or Firm* — Merchant & Gould P.C.

(57) ABSTRACT

A transmission line installation system includes a transmission line conveying apparatus that operates to install a transmission line within a conduit by advancing the transmission line through the conduit. The transmission line conveying apparatus includes a plurality of components. The components include local controllers. Communication with the local controllers of the components synchronizes operation of the components during the installation of a transmission line.

22 Claims, 39 Drawing Sheets

(51) Int. Cl.
*G02B 6/44* (2006.01)
*G02B 6/52* (2006.01)

(58) Field of Classification Search
USPC .............. 254/134.3 FT, 134.3 R, 134.4, 264;
226/172, 35; 709/209, 208; 166/380,
166/77.2
See application file for complete search history.

(56) References Cited

U.S. PATENT DOCUMENTS

| | | | |
|---|---|---|---|
| 4,305,537 A * | 12/1981 | Samokovliiski | B23K 9/124 226/108 |
| 4,372,161 A | 2/1983 | de Buda et al. | |
| 4,495,808 A | 1/1985 | Fischer, III | |
| 4,541,278 A | 9/1985 | Marsh et al. | |
| 4,747,317 A | 5/1988 | Lara | |
| 4,835,876 A | 6/1989 | Petermann et al. | |
| 4,856,760 A * | 8/1989 | Frost | G01P 13/0086 254/134.4 |
| 4,959,810 A * | 9/1990 | Darbee | G08C 19/28 340/12.22 |
| 5,390,841 A * | 2/1995 | Horiuchi | B65H 51/14 226/108 |
| 5,485,148 A | 1/1996 | Tseng | |
| 5,551,545 A * | 9/1996 | Gelfman | H02G 11/02 191/12.2 A |
| 5,675,251 A | 10/1997 | McLean et al. | |
| 5,813,658 A * | 9/1998 | Kaminski | B65H 51/14 254/134.4 |
| 5,906,357 A | 5/1999 | Munson, Sr. | |
| 6,012,621 A | 1/2000 | Hoium et al. | |
| 6,059,264 A | 5/2000 | Kaminski et al. | |
| 6,264,171 B1 * | 7/2001 | Hoium | G02B 6/4463 226/35 |
| 6,364,290 B1 | 4/2002 | Barker | |
| 6,540,208 B1 | 4/2003 | Pecot et al. | |
| 6,746,000 B2 | 6/2004 | Watanabe et al. | |
| 6,935,425 B2 | 8/2005 | Aronstam | |
| 7,100,463 B2 | 9/2006 | Boudreaux | |
| 7,210,364 B2 | 5/2007 | Ghorbel et al. | |
| 7,317,308 B2 | 1/2008 | Fagbayi et al. | |
| 7,498,816 B1 | 3/2009 | Olsson et al. | |
| 7,562,861 B2 | 7/2009 | Fee et al. | |
| 7,594,448 B2 | 9/2009 | Jacobson et al. | |
| 7,623,961 B2 | 11/2009 | Van Den Broeck | |
| 7,841,249 B2 | 11/2010 | Tormoen | |
| 7,845,419 B2 * | 12/2010 | Naumann | E21B 17/206 166/380 |
| 8,001,858 B2 | 8/2011 | Cogen et al. | |
| 8,051,524 B2 | 11/2011 | Ferreira Lino et al. | |
| 8,261,623 B2 | 9/2012 | Miller et al. | |
| 8,395,661 B1 | 3/2013 | Olsson et al. | |
| 8,491,722 B2 | 7/2013 | Phipps | |
| 8,547,428 B1 | 10/2013 | Olsson et al. | |
| 8,655,596 B2 | 2/2014 | Ekseth et al. | |
| 8,661,909 B2 | 3/2014 | Chu et al. | |
| 8,689,653 B2 | 4/2014 | Cogen et al. | |
| 8,720,030 B2 | 5/2014 | Barker et al. | |
| 8,765,061 B2 | 7/2014 | Tunheim et al. | |
| 8,775,083 B2 | 7/2014 | Young et al. | |
| 9,156,665 B2 | 10/2015 | Yoder et al. | |
| 2004/0211258 A1 | 10/2004 | Geen | |
| 2005/0198063 A1 | 9/2005 | Thomas et al. | |
| 2006/0219992 A1 | 10/2006 | Fee et al. | |
| 2006/0290779 A1 | 12/2006 | Reverte et al. | |
| 2007/0269269 A1 | 11/2007 | Coronado et al. | |
| 2008/0012720 A1 | 1/2008 | Rostron | |
| 2009/0188059 A1 | 7/2009 | Albrecht et al. | |
| 2010/0236811 A1 | 9/2010 | Sasse et al. | |
| 2010/0296519 A1 * | 11/2010 | Jones | H04L 12/4616 370/463 |
| 2011/0125462 A1 | 5/2011 | Petrosky et al. | |
| 2011/0239222 A1 | 9/2011 | Wu | |
| 2012/0061633 A1 | 3/2012 | Holley | |
| 2012/0118085 A1 | 5/2012 | Christie | |
| 2012/0168699 A1 * | 7/2012 | Rachminov | H02G 1/085 254/134.3 FT |
| 2012/0257042 A1 | 10/2012 | McKaigue et al. | |
| 2013/0030704 A1 | 1/2013 | Young et al. | |
| 2013/0200055 A1 * | 8/2013 | Enyedy | B23K 9/1087 219/130.21 |
| 2013/0256613 A1 * | 10/2013 | Hyde | H02G 1/02 254/134.3 R |
| 2014/0013872 A1 | 1/2014 | Thursby | |
| 2014/0209126 A1 | 7/2014 | Doig | |
| 2016/0159509 A1 | 6/2016 | Lewis et al. | |

FOREIGN PATENT DOCUMENTS

| | | |
|---|---|---|
| EP | 0911452 A2 | 4/1999 |
| FR | 2577724 A1 | 8/1986 |
| GB | 1508261 A | 4/1978 |
| GB | 2088554 A | 6/1982 |
| JP | 2012-173086 A | 9/2012 |
| WO | 92/09847 A1 | 6/1992 |
| WO | 2006/103419 A1 | 10/2006 |
| WO | 2012/165824 A2 | 12/2012 |
| WO | 2013/169200 A1 | 11/2013 |
| WO | 2016/176467 A1 | 11/2016 |

OTHER PUBLICATIONS

International Search Report and Written Opinion for PCT/US2016/29816, dated Aug. 12, 2016.
"Fiber Optic Cable Blowing", product manual, Condux International, Inc., accessed on Apr. 25, 2016.
Extended European Search Report for Application No. 17869560.7 dated Jun. 8, 2020.

* cited by examiner

120

502

Leg 0 Length
10 m

Leg 0 Inclination
90 Degrees

Bend 0 Deviation
90 Degrees

Bend 0 Radius
5 m

Leg 1 Length
17 m

Leg 1 Inclination
0 Degrees

Bend 1 Deviation
90 Degrees

Bend 1 Radius
5 m

Leg 2 Length
37 m

Leg 2 Inclination
0 Degrees

Bend 2 Deviation
90 Degrees

Bend 2 Radius
5 m

Leg 3 Length

FIG. 29

Results

The required force is 20.8 N. Subject to cable and duct limitations, this can be installed by the following machines: GS200, GS300, GS400. The blow-only distance is 629.8 m. Therefore the anticipated installation length is between 629.8 and 862 m. The required flow rate is 0.67 CFM (0.0003 m$^3$/s). The suggested compressor capacity is 1 CFM.

Debug    Graph

FIG. 33

| LEG | Installation Settings |
|---|---|
| 0 | A |
| 1 | B |
| 2 | C |
| 3 | D |
| 4 | E |
| ... | ... |

FIG. 34

TRANSMISSION LINE INSTALLATION SYSTEM

This application is a National Stage application of PCT International patent application No. PCT/US2017/061621, filed Nov. 14, 2017, which claims priority to U.S. Patent Application No. 62/421,698, filed 14 Nov. 2016, which applications are hereby incorporated by reference. To the extent appropriate, a claim of priority is made to each of the above disclosed applications.

BACKGROUND

Transmission lines are used for transmitting power or data signals. One type of transmission line is a fiber optic cable that can be used to transmit digital data using light signals. The use of fiber optic cable for data transmission is becoming increasingly popular, at least in part due to the high data transmission rate and very fast transmission speed.

Transmission lines can be used to carry power or data signals short distances, such as within a building, or long distances, such as between neighboring cities. For longer distance communication, cables are often installed in underground ducts, where continuous cables as long as 0.5, 1, 2, 5 kilometers, or more, are desired between manhole or handhole locations.

Installation equipment such as line blowers and pullers has been developed that can be used to insert fiber optic cables into ducts over long distances, but there are many variables that impact whether or not such an installation will be successful. For example, the installer typically knows the beginning and end points of a run, but the actual geometry of the duct (such as the location and extent of bends and slopes) between the beginning and end of the run is largely unknown. Further, even if the geometry of the duct were known, installation equipment is incapable of taking advantage of that information.

As a result, it is not uncommon for cable installations to fail to reach the full desired distance, requiring either that the installation be retried or, more commonly, that the end of the cable be located, the duct opened up, and one or more additional attempts be made to complete the run. In some cases the remaining cable is manually pulled through the duct until the cable reel has been emptied, and then the rest of the cable is installed into the remaining length of the duct. Additionally, in order to reduce the risk of a failed installation, some choose instead to divide the run into several shorter distances resulting in much more manual labor, time, and expense, and reducing the quality of the fiber optic cable transmission due to the need to include numerous splices along the length of the run.

SUMMARY

In general terms, this disclosure is directed to a system involving multiple components which are in data communication with one another to provide improved overall performance of the system. In one possible configuration and by non-limiting example, the system is a transmission line installation system that includes multiple components that are in data communication with each other to synchronize their operation during a transmission line installation, providing improved performance. Various aspects are described in this disclosure, which include, but are not limited to, the following aspects.

One aspect is a transmission line installation system comprising: a control unit comprising a processing device, a computer-readable storage device, a communication device, a display device, and at least one input device, the control unit being configured to display status information and to receive input from a user; and a transmission line conveying apparatus operable to advance a transmission line through a conduit, the transmission line conveying apparatus comprising a plurality of components each including a local controller operable to locally control the associated component, the local controllers of the components comprising a processing device, a computer-readable storage device, and a communication device, wherein the communication devices of the local controllers are configured to communicate with at least one of the control unit and at least one other local controller to synchronize operation of the components during installation of the transmission line.

A further aspect is a method of installing a transmission line, the method comprising: using a transmission line conveying apparatus to advance a transmission line through a conduit, the transmission line comprising a distal end; determining a position of the distal end of the transmission line in the conduit; and adjusting operation of the transmission line conveying apparatus based on the position of the transmission line in the conduit.

Another aspect is a method of determining conduit specifications for use during transmission line installation into the conduit, the method comprising: receiving by a computing device information about the conduit; and retrieving conduit specifications from a conduit database based at least in part on the information about the conduit.

Yet another aspect is a method of determining transmission line specifications for use during installation of the transmission line into a conduit, the method comprising: receiving by a computing device information about the transmission line; and retrieving transmission line specifications from a transmission line database based at least in part on the information about the conduit.

A further aspect is a method of determining transmission line installation settings, the method comprising: receiving by a computing device information about a conduit; retrieving conduit specifications from a conduit database based at least in part on the information about the conduit; and determining transmission line installation settings based at least in part on the conduit specifications.

An additional aspect is a method of determining transmission line installation settings, the method comprising: receiving by a computing device information about a transmission line; retrieving transmission line specifications from a transmission line database based at least in part on the information about the transmission line; and determining transmission line installation settings based at least in part on the transmission line specifications.

Another aspect is a method of graphically displaying a status of an installation of a transmission line into a duct, the method comprising: generating a graphical user interface with a computing device, the graphical user interface including a graphical display of a duct route; determining a position of a leading edge of the transmission line during the installation of the transmission line into the duct; and generating in the graphical user interface an indication of the position of the leading edge of a transmission line along the duct route.

Yet another aspect is a computing device comprising: at least one processing device; and at least one computer readable storage device, the computing device being part of or in data communication with a transmission line installation system, wherein the at least one computer readable storage device stores data instructions that, when executed by the at least one processing device causes the at least one processing device to: generate a graphical user interface, the graphical user interface including a graphical display of a duct route; determine a position of a leading edge of a transmission line during the installation of the transmission line into the duct; and generate in the graphical user interface an indication of the position of the leading edge of a transmission line along the duct route.

A further aspect is a method of evaluating a duct, the method comprising: advancing a route evaluation unit through a duct; using the route evaluation unit to collect route data as the route evaluation unit is advanced through the duct; and storing the route data.

Yet another aspect is a method of installing a transmission line in a duct, the method comprising: evaluating the duct including determining a duct route; determining installation settings; and receiving a single input from a user to cause a transmission line installation system to perform the transmission line installation based on the installation settings, without requiring any further input from a user.

Another aspect is a method of providing remote support during a transmission line installation, the method comprising: receiving a request for remote support at a remote computing device; initiating a support session with a remote support technician through the remote computing device; receiving installation information from a transmission line conveying apparatus; and displaying at least some of the installation information to the support technician to assist the remote technician in supporting the transmission line installation.

A further aspect is a method of updating software for a transmission line installation system, the method comprising: establishing a communication connection between a remote computing device and a transmission line installation system, the transmission line installation system including a transmission line conveying apparatus; transmitting a software update from the remote computing device to the transmission line installation system; and installing the software update on the transmission line installation system.

Another aspect is a method of installing a transmission line, the method comprising: generating an installation plan for installing a transmission line in a conduit, the plan including installation parameters; using a transmission line conveying apparatus to advance the transmission line through the conduit; detecting one or more characteristics of the installation; adjusting the installation plan to change at least one of the installation parameters based on the detected characteristics; and adjusting the operation of the transmission line conveying apparatus based on the changed at least one of the installation parameters while the transmission line is being advanced through the conduit.

BRIEF DESCRIPTION OF THE DRAWINGS

FIG. 29 illustrates an example of duct route data.

FIG. 33 illustrates at least a portion of an example plan for an installation having fixed installation settings.

FIG. 34 illustrates another example plan for an installation.

DETAILED DESCRIPTION

Figure 1:
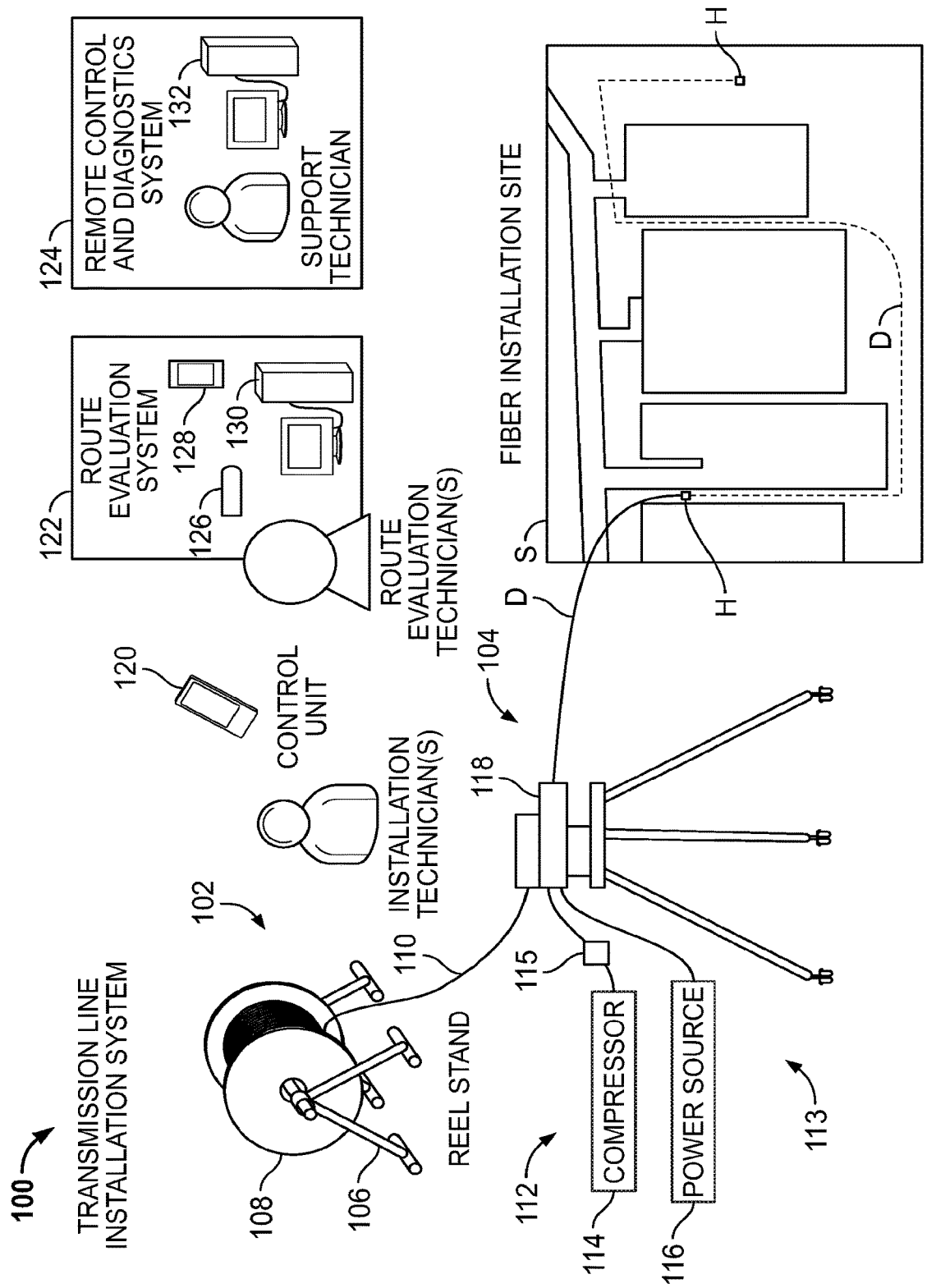
FIG. 1 is a schematic diagram illustrating an example transmission line installation system.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The present disclosure relates to a transmission line installation system 100, which can be used to install a transmission line. The term "transmission line" is used herein as a generic term for any type of wire, cable, or other elongate structure capable of transmitting energy, whether in the form of a fiber optic cable, power line, electrical cable, telephone line (copper line), coaxial cable, or the like. For simplicity, the present disclosure refers to a particular example of a transmission line, namely a fiber optic cable. However, the transmission line installation system 100 can be used in the same manner for installation of any other transmission line, and therefore the present disclosure should not be interpreted to be limited to installation of fiber optic cables. Instead, the transmission line installation system 100 can also be used for installing power lines, telephone lines, coaxial cables, and any other desired transmission line. In typical embodiments the transmission line installation system 100 is configured to install a transmission line within a conduit such as a duct. Additionally, a transmission line installation system can also be used for other purposes, such as for installing a pull tape or other pull line, an inner duct, or other items within a conduit.

Although the term "transmission line" is sometimes used to refer to a specific type of line used to carry radio frequency signals, the term "transmission line" is not intended to be so limited in the present disclosure, but rather is intended to broadly include the transmission of any type of energy or signal along an elongate and flexible structure. Specifically, examples of transmission lines include those that can transmit electricity, such as a wire, or light, such as an optical fiber.

FIG. 1 is schematic diagram illustrating an example transmission line installation system 100. In the illustrated example, the transmission line installation system 100 includes a transmission line source 102 and a transmission line conveying apparatus 104. The example transmission line source 102 includes a reel stand 106 for holding a transmission line reel 108 containing a transmission line 110. The example transmission line conveying apparatus 104 includes a line blower system 112. The line blower system 112 includes a plurality of components 113, such as including a compressor 114, a power source 116, and a line blower 118. The system 100 further includes in some embodiments a control unit 120 usable by the installation technician. Some embodiments also include one or more of a route evaluation system 122 and a remote control and diagnostics system 124. In some embodiments the route evaluation system 122 includes a route evaluation unit 126, a mobile computing device 128, and a computing device 130. In some embodiments the remote control and diagnostics system includes a computing device 132 for interacting with a support technician. Also shown in FIG. 1 is a transmission line installation site S containing a conduit such as a duct D, for receiving the transmission line 110.

The transmission line installation system 100 is usable by one or more installation technicians to install a transmission line 110 in a site. An example process is illustrated and described in further detail herein with reference to FIG. 19, but is briefly summarized here by way of introduction. In a typical scenario, a conduit such as a duct D is buried underground at a site S along a desired route prior to cable installation. The ends of the duct terminate at hand holes H, which are enclosures with an access opening though which the ends can be accessed. The route of the duct D may have multiple bends, slopes, and other features, such as around a building or to follow under or along a road, etc.

Often the exact geometry of the duct D is not known, and therefore the route evaluation system 122 can be used prior to cable installation to evaluate and determine the geometry of the duct D route. One or more route evaluation technicians can use the route evaluation system 122 to conduct the route evaluation prior to the transmission line installation.

The transmission line conveying apparatus 104 is then used to install the transmission line 110. For example, an end of the cable is inserted into the duct D. The transmission line conveying apparatus 104 then operates to push or pull the cable through the duct D. In some embodiments, the transmission line conveying apparatus also or alternatively utilizes air or liquid to blow the transmission line 110 through the duct D. When the geometry of the duct, and other specifications and characteristics of the duct, fiber, and environment are known, the transmission line installation system 100 can precisely control, synchronize, and adjust the operation of each component of the transmission line installation system 100 in order to optimize the installation and to ensure that the installation is successfully completed. This greatly reduces the chance that the cable does not reach the end of the duct, and thereby eliminates all of the additional effort, time, and expense that is incurred when a cable does not reach the desired destination.

Turning to the specific examples shown in FIG. 1, the transmission line source 102 is the source of the transmission line 110 that is to be installed at the site S. In some embodiments the transmission line source 102 includes a reel stand 106 on which a transmission line reel 108 storing the transmission line 110 is stored. Examples of the transmission line source 102 are illustrated and described in further detail with reference to FIGS. 2-6 and 9.

As described above, the transmission line installation system 100 operates to install the transmission line 110 into a conduit, such as the duct D. Examples of the duct are illustrated and described in further detail with reference to FIGS. 7-8.

Figure 21:
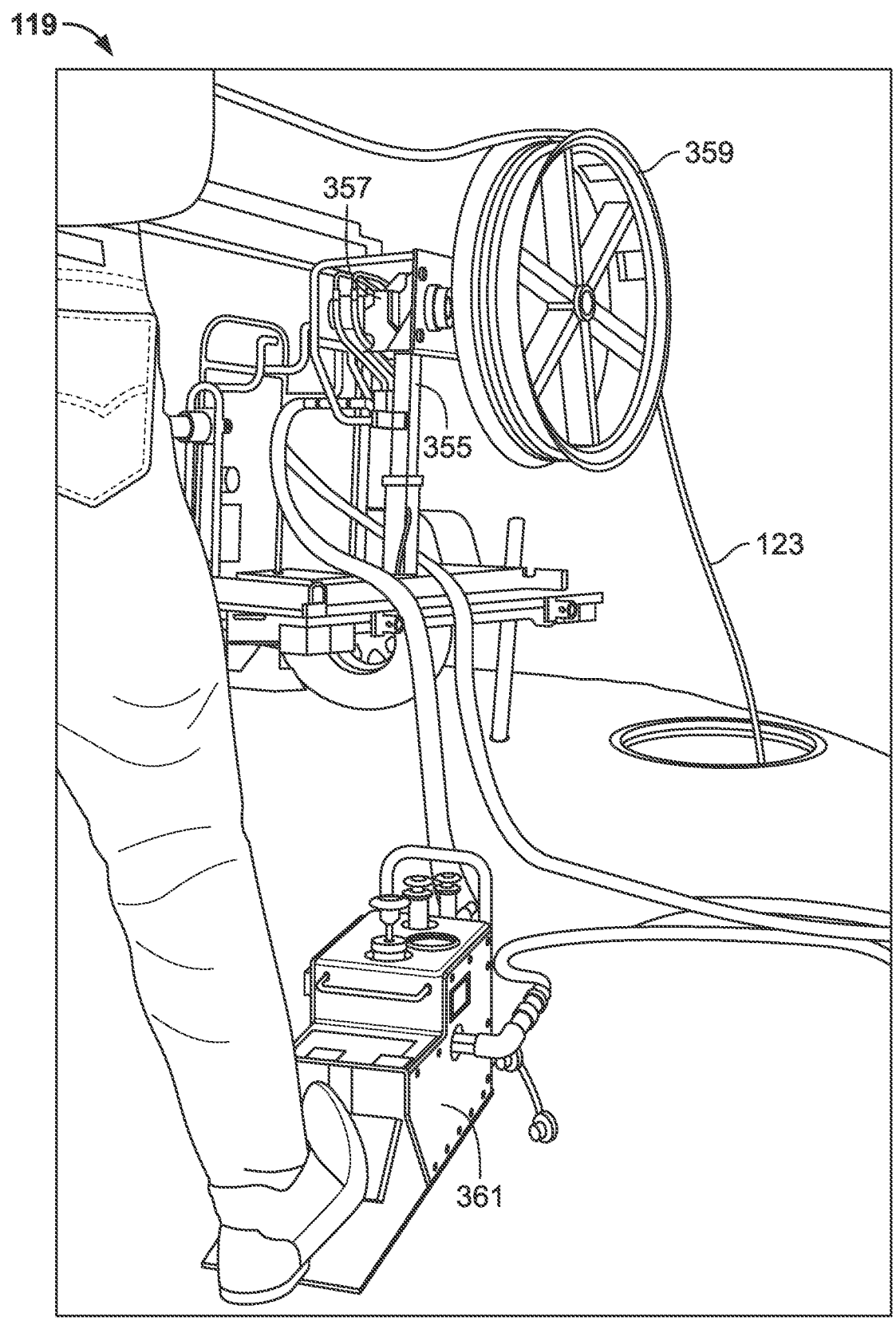
FIG. 21 is a perspective view illustrating an example of a line puller.

The transmission line conveying apparatus 104 is a machine that operates to install a transmission line 110 into the duct D. Examples of transmission line conveying apparatuses 104 include line blower systems 112 and line puller systems. The example shown in FIG. 1 shows a line blower system 112, but other embodiments can utilize other transmission line conveying apparatuses 104, such as a line puller system comprising a line puller. An example of a line puller is shown in FIG. 21. In some embodiments a transmission line conveying apparatus 104 includes both a line blower and a line puller. Additionally, in some embodiments a line blower system 112 includes a line puller, and in some embodiments a line puller system includes a line blower.

In this example, the line blower system 112 includes a compressor 114, a compressor module 115, a power source 116, and a line blower 118. The compressor 114 provides a source of pressurized air to the line blower 118, and in some embodiments also operates to detect qualities of the air and to condition the air prior to delivery to the line blower 118. An example of the compressor 114 is illustrated and described in further detail with reference to FIGS. 10-11.

Some embodiments include a compressor module 115 arranged between the compressor 114 and the line blower 118. The compressor module 115 includes air input and output ports that the pressurized air from the compressor 114 can pass through. The compressor module 115 includes sensors to analyze qualities of the air delivered to the line blower 118. In some embodiments the sensors detect one or more of air pressure, temperature, humidity. Further, in some embodiments the compressor module 115 can operate to modify the quality of the air, such as to adjust one or more of the air pressure, temperature, and humidity. In some embodiments the compressor module 115 is part of the compressor 114.

The power source 116 is a source of energy for the transmission line conveying apparatus 104. In some embodiments the energy is electrical energy. In other embodiments the energy can be in the form of hydraulic or pneumatic energy. An example of the power source 116 is illustrated and described in further detail with reference to FIG. 12.

The line blower 118 is a machine that operates to advance the transmission line 110 through the duct by pushing the transmission line 110 and by providing a flow of pressurized air into the duct. The pressurized air helps to propel the transmission line 110 through the duct by means of distributed viscous drag and can further generate a pulling force at the distal end of the transmission line to further assist in advancing the transmission line 110 through the duct. For example, in some embodiments a carrier (shown in FIG. 15) having a diameter greater than that of the transmission line 110 is attached to the forward/distal end of the transmission line 110. The carrier acts to block or resist air flow through the duct, creating a pressure differential on either side of the carrier. This pressure differential presses on the carrier propelling it and the foreword end of the transmission line 110 along the duct. An example of the line blower 118 is illustrated and described in further detail with reference to FIGS. 13-15.

In an alternative embodiment, the transmission line conveying apparatus 104 includes a line puller system 119 (not shown in FIG. 1), such as illustrated and described in more detail with reference to FIG. 21. A line puller system is a machine configured to pull a transmission line through the duct. In its most basic configuration, the line puller system utilizes an elongate member 123 (shown in FIG. 21) such as a wire, rod, tape, cord, or the like (collectively included within the term "line") which extends through the duct. The transmission line source 102 is positioned at one end of the duct, and the system is arranged at the opposite end of the duct. The transmission line 110 at the transmission line source 102 is then fastened to an end of the elongate member 123. The line puller then pulls on the elongate member 123 which in turn pulls on the end of the transmission line 110 to advance the elongate member 123 through the duct. Other components such as blowers can also be used with the puller to generate a distributed viscous drag between the air and the transmission line that further assists in advancing the transmission line through the duct, similar to the operation of the line blower systems described herein.

In some embodiments a catcher is positioned at an end of a duct to catch any objects that pass through the duct and come out the distal end. The catcher includes openings through which air can easily pass, and a mesh or other type of material that stops the object from exiting the catcher. One example of a catcher is a radio basket catcher. Another example is an OPT catcher device. A catcher is another example of a component 113, which can be in wired or wireless communication with the control unit 120 or other components 113. In one example embodiment the catcher includes a detector that catches and detects when a leading end of a transmission line has reached the end of the duct. In some embodiments the catcher includes a communication device that automatically sends a message indicating that the transmission line has reached the end of the duct. Upon receipt of the message by the control unit 120 or other components 113, the transmission line installation system 100 determines that the transmission line installation has been completed and terminates the installation automatically, such as by turning off or deactivating the transmission line conveying apparatus 104 (e.g., blower and/or line puller), reel stand, and any other components 113 involved in the installation upon receipt of the message. In some embodiments the message is communicated wirelessly. In some embodiments the message is an SMS text message, such as sent across a cellular network.

The control unit 120 is a computing device that provides an interface between the installation technician and the transmission line installation system 100. In some embodiments the control unit 120 receives control inputs from the installation technician, such as to start and stop an installation. In some embodiments the control unit 120 provides status information to the installation technician, such as to convey the current status of the installation and to show the progress that has already been made. The control unit 120 is in data communication with one or more other components of the transmission line installation system 100, such as the transmission line conveying apparatus 104. An example of the control unit 120 is illustrated and described in further detail with reference to FIGS. 16-18.

The route evaluation system 122 is included in some embodiments, which operates to evaluate the duct D including its route, to provide route data usable by the transmission line installation system 100 during the installation of the transmission line 110. In this example, the route evaluation system 122 includes the route evaluation unit 126 that can be passed through the duct, such as to detect and determine the geometry of the duct D. In some embodiments the mobile computing device 128 operates in conjunction with the route evaluation unit 126, such as to receive route data from the unit 126 and provide that information to the computing device 130. The computing device 130 stores the route data in memory and can subsequently transfer or make available the route data for use by other components of the transmission line installation system 100. More specifically, the route data can be sent to the installation technician, the control unit 120, the transmission line conveying apparatus 104, the cloud-data storage of the route evaluation system 122 or other cloud-data storage accessible to the installation technician, and/or to the remote control and diagnostics system 124. The route data can be referred to as "as-built" data when it describes the actual "as-built" configuration of the duct route at the installation site. However, in other embodiments the route data can alternatively be data describing the hypothetical or expected layout and configuration of the duct route. In some embodiments the functions of the computing devices 128 and 130 are performed by the same computing device, or by multiple computing devices.

If help is needed, the remote control and diagnostics system 124 is provided in some embodiments, through which technical support can be obtained from a support technician. In this example the remote control and diagnostics system 124 includes at least one computing device 132 in data communication with other components of the transmission line installation system (such as the control unit 120) to permit data communication therebetween. In some embodiments the remote control and diagnostics system 124 can also be used to perform quality control functions, such as by receiving data from the transmission line conveying apparatus during or after a line installation. The data provides information about the installation such as route information, details of the configuration of the transmission line installation system, installation settings, and run data collected during the run. The data can be analyzed by the remote control and diagnostics system to identify problems or to recommend modifications to the installation setup or process.

In some embodiments the installation technician can communicate with the support technician via any one or more of video conferencing (through a web page or other video conferencing system or service), text-chat, text message, e-mail, or voice call. Further, in some embodiments the communication can occur through pre-written or pre-recorded instructions, frequently asked questions, tutorials, or the like.

Figure 2:
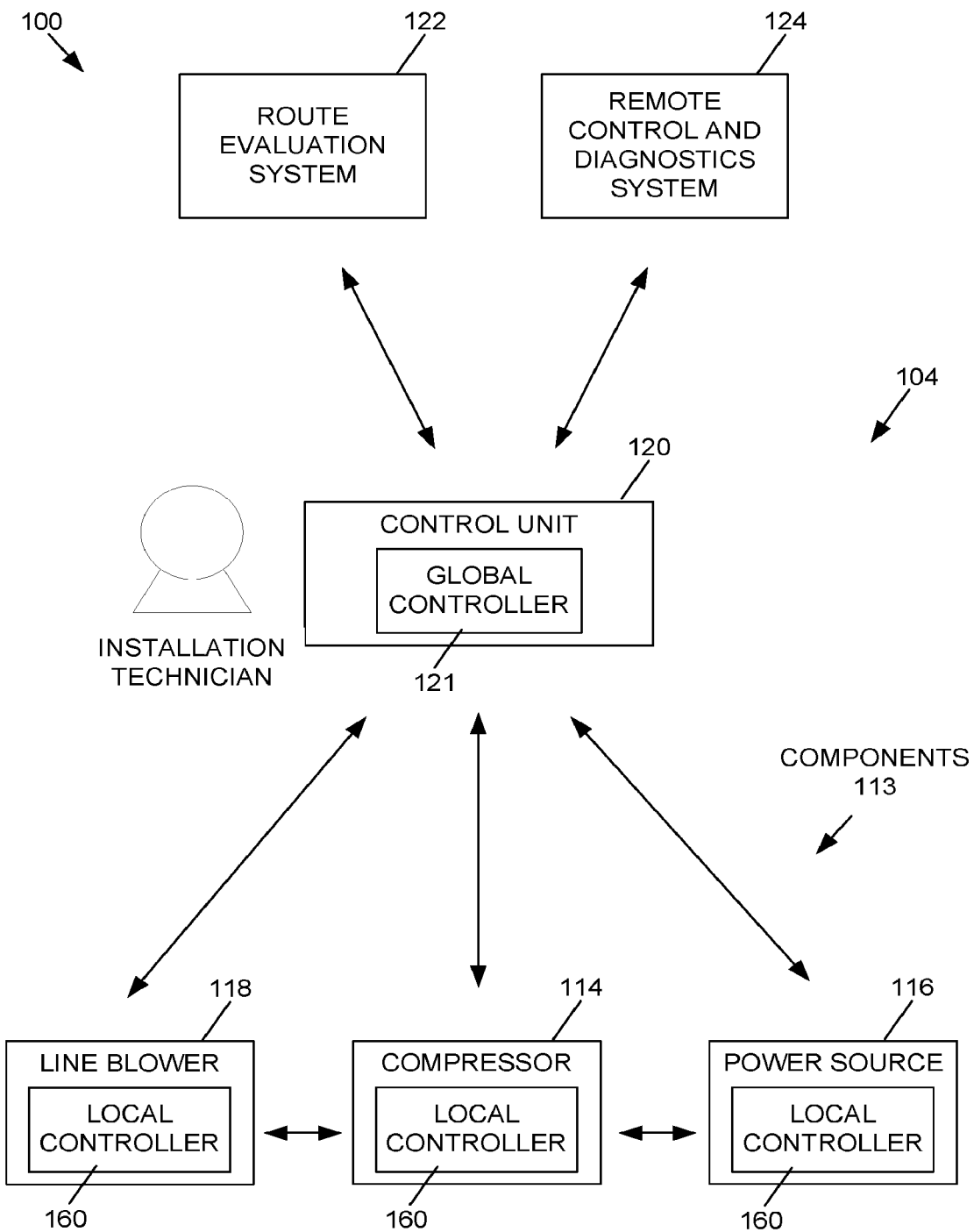
FIG. 2 is a block diagram illustrating exemplary communications within an example of the transmission line installation system shown in FIG. 1.

FIG. 2 is a block diagram illustrating exemplary communications within an example of the transmission line installation system 100. Similar to the example shown in FIG. 1, the example transmission line installation system 100 includes the transmission line conveying apparatus 104, such as a line blower, as well as the route evaluation system 122 and the remote control and diagnostics system 124. The example transmission line conveying apparatus 104 includes the control unit 120 and a plurality of components 113, such as the line blower 118, compressor 114, compressor module 115, and power source 116, or other possible components (including a line puller 119, compressor module, figure-eight machine, horizontal-directional drilling machine, lubricator, transmission line cleaner, etc.). In some embodiments the control unit 120 includes and operates as a global controller 121 and the components include local controllers 160.

A fiber optic lubricating machine is another example of a component 113, which is operable to add (apply or inject) lubricant onto the fiber optic cable or into the duct D. The lubricating machine can be arranged at the start of the run to apply lubricant to the fiber optic cable before it enters the duct, or to inject lubricant into the starting end of the duct. The fiber optic lubricating machine includes a pump or other lubrication applicator, and includes a local controller operable to interact with the control unit 120 and/or other components 113, and to control the operation of the lubricating machine, such as to adjust the amount of lubricant being added, or to turn on or off the addition of lubricant. In some embodiments the fiber optic lubricating machine has various types of lubricant and can select between those types depending on the conditions, and even adjust the lubricant on the fly as installation proceeds.

A transmission line cleaner is another example of a component 113, which is operable to clean a transmission line before it enters the transmission line conveying apparatus 104. The transmission line cleaner typically includes one or more cleaning mechanisms (motorized or non-motorized), such as including The transmission line cleaner can also include sensors to detect foreign objects such as sand, mud, water, and the like, and determine whether and an extent of cleaning that is required, and then activates the cleaning mechanism to perform the appropriate cleaning. Cleaning mechanisms can include brushes, wipers, and water or other liquid baths. As with other components 113, the transmission line cleaner includes a local controller to permit communication with other components 113, the control unit 120, and operates to control the operations of the cleaning mechanism itself. In some embodiments the cable cleaner is positioned before an optical detector (discussed herein) that reads markings on the exterior of the transmission line. The cleaning removes any obstructions on the markings that might otherwise interfere with the reading by the optical detector.

Some embodiments include a tether mechanism. A tether mechanism operates similarly to a line puller, but instead of pulling the transmission line toward it, it operates instead to provide a back pressure to provide more precise speed control to the transmission line, such as when using a blower to advance the transmission line through the duct. The tether mechanism typically includes an elongate member (e.g., a tape or cable) that is connected to the transmission line (directly or with a coupler). In some embodiments the elongate member is connected to the line carrier. The line puller 119 is an example of a tether mechanism when it is operated in reverse. In another embodiment, the tether mechanism can include a brake or other controllable slip interface that is operable to apply a braking force to control a speed at which the transmission line is advanced through the duct D.

The control unit 120 operates as the primary user interface with the installation technician. The control unit 120 prompts the user, such as the installation technician or other user, to provide inputs to control the overall operation of the transmission line conveying apparatus 104, such as start or stop inputs, and to define an installation plan including settings for the system. In some embodiments the control unit includes both a local communication device as well as a network communication device such as a cellular modem or Wi-Fi communication device. The local communication device can be either a wired or wireless communication system, such as a wired serial communication device (such as a universal serial bus ("USB") device), or a wireless device (such as utilizing Wi-Fi or BLUETOOTH communication), which allows the control unit to communicate with the components 113 and their local controllers 160. The network communication device enables the control unit 120 of the transmission line conveying apparatus 104 to communicate across the Internet or other network, such as with the route evaluation system 122 or the remote control and diagnostics system 124.

The local controllers 160 can communicate with the control unit 120 and/or other local controllers 160. The local controllers 160 are coupled to other sensors or controllable devices within the components 113, and therefore are capable of receiving or generating data associated with the components 113, and are also able to control any controllable devices such as motors, pumps, and the like.

The communications can be used to transmit control commands or data. Control commands are issued by one controller to another controller and instruct the other controller to adjust an operation, such as to speed up or slow down, start or stop, increase or decrease a pressure, or other controllable operation.

Data communication is used to transmit information within the system. An example of a data transmission may include a temperature, speed, pressure, humidity, tension or force, or other information. Data may be generated by a sensor or may simply identify a current status or operational parameter of one of the components (e.g., indicating that the device is turned on, or indicating that the device is currently set to operate at a particular speed, etc.). Data received from one controller by another controller can be used by that other controller to react accordingly, such as to adjust its own operation, or may be used by the control unit to send one or more commands to the components 113.

In some embodiments the control unit 120 and plurality of components 113 are configured to communicate with each other according to a predefined communication protocol to automatically identify each other and to make use of resources provided by the connected components. For example, when a first component 113 is added to the transmission line installation system, the first component 113 and the global controller 120 communicate with each other to identify each other and determine the resources (including features and functionality) that are now available to the transmission line installation system 100 as a result. When additional components 113 are added the components are similarly identified. The transmission line installation system 100 can therefore operate in such a way that it utilizes the resources available to it, and similarly can identify any problems or deficiencies in the current system configuration and make recommendations to the operator to change the configuration if needed. When an installation plan is developed, as discussed herein, the plan can be customized based on the specific configuration of the system at that time. Similarly, other parts such as the duct itself, the transmission line or transmission line reel, and the like can also be identified by the transmission line installation system, such as by reading an RFID tag or communicating with a local controller associated with those parts, to identify characteristics of the parts.

In some embodiments the control unit 120 and the components 113 are fully operable individually regardless of whether or not they are connected with the control unit 120 or other components 113. When connected they cooperate with each other to utilize the resources of the others, and when disconnected they operate with whatever resources are available.

Figure 4:
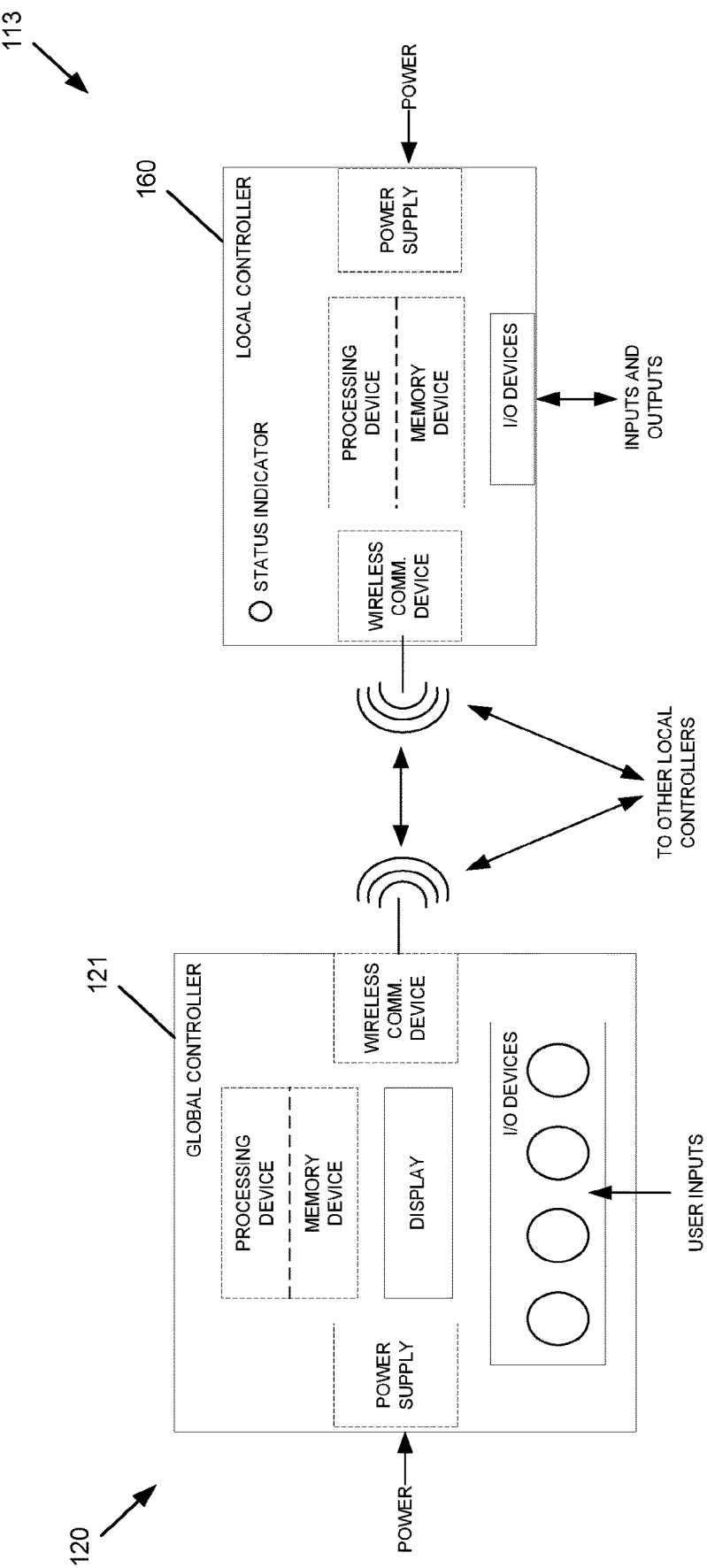
FIG. 4 is a block diagram illustrating another example control mode of operation of the transmission line installation system shown in FIG. 1.
Figure 5:
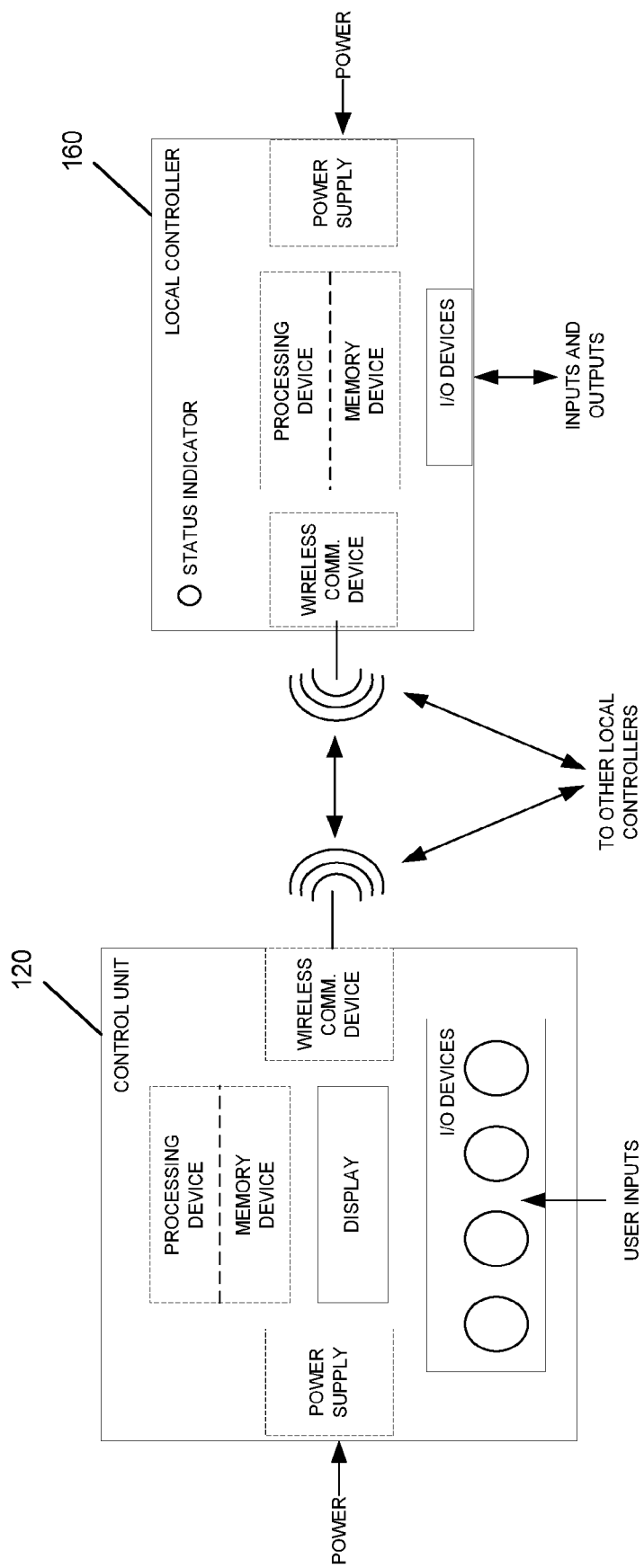
FIG. 5 is a block diagram illustrating another example control mode of operation of the transmission line installation system shown in FIG. 1.

In various implementations the transmission line installation system 100 can operate in various different control and communication modes. Several examples are illustrated in FIGS. 3-5.

Figure 3:
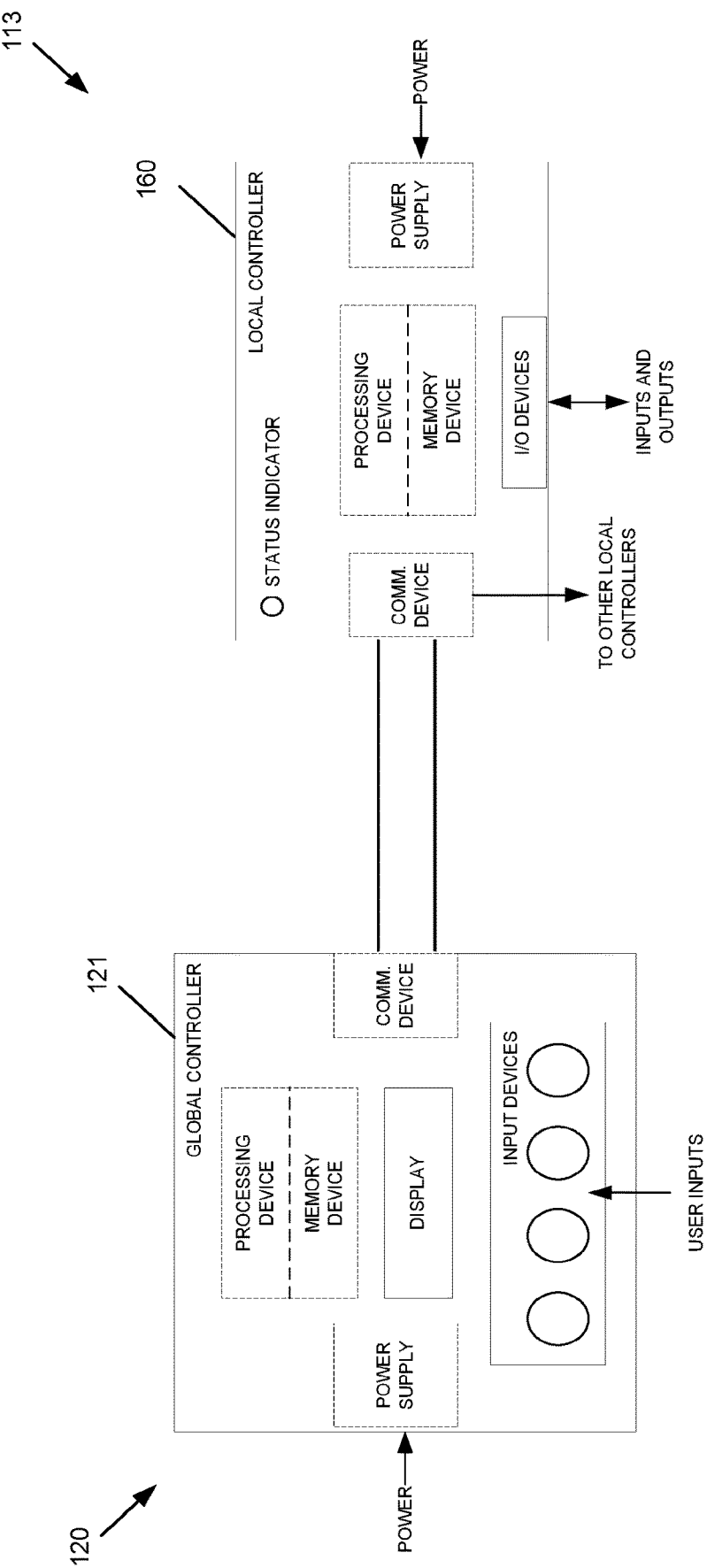
FIG. 3 is a block diagram illustrating an example control mode of operation of the transmission line installation system shown in FIG. 1.

FIG. 3 is a block diagram illustrating an example control mode of operation of the transmission line installation system 100. The system 100 includes the control unit 120 including the global controller 121 and a plurality of components 113 including the local controller 160.

In some embodiments the control unit 120 includes a processing device, memory, a display device, a power supply, a communication device, and one or more input devices.

In some embodiments the local controller 160 includes a processing device, a memory device, a power supply, a communication device, one or more input/output devices, and at a status indicator or status display.

In this example, the transmission line installation system 100 operates in an example control mode in which the in which the control unit 120 operates as a global controller 121, and the transmission line installation system 100 utilizes a master/slave communication model. The global controller 121 operates as the master device and the local controllers 160 operate as the slave devices. In some embodiments the communication between the global controller 121 and the local controllers 160 is through wired communication, such as through a serial (USB) communication system or using COM ports, or other communication or network communication protocols.

The power supply can be connected to an external power source, such as a mains power receptacle using a power cord, or a generator, or alternatively can include its own power source such as a battery, solar panel, or the like.

The global controller 121 issues commands to the local controllers 160 and the local controllers 160 respond to those commands by locally controlling the respective components 113. Additionally, the local controllers 160 provide responses and/or data back to the global controller 121, which the global controller 121 uses to make control decisions and adjustments.

The status indicator of the local controller 160 can be, for example, a three-color LED which displays green when operating, red when stopped, and yellow when an alert condition is present. In other embodiments the local controller 160 can include a different type of display, or no display at all.

FIG. 4 is a block diagram illustrating another example control mode of operation of the transmission line installation system 100.

In this example, the control unit 120 continues to operate as the global controller 121, but instead of the master/slave mode shown in the example in FIG. 3, this example utilizes a peer-to-peer communication model. In the peer-to-peer communication model the global controller performs an advisory role, whereas the local controllers 160 are capable of operating independently under the advice of the global controller 121.

The communication between the global controller 121 and the local controllers 160 can be through any suitable bus communication system, which may include wired or wireless communication systems. In the example shown in FIG. 4 the global controller 121 and local controller 160 include wireless communication devices, but wired communication devices can also or alternatively be used in other embodiments. Examples of wireless communication systems include Wi-Fi and BLUETOOTH systems.

FIG. 5 is a block diagram illustrating another example control mode of operation of the transmission line installation system 100.

In this example, the control unit 120 no longer operates as a global controller, but rather is limited to an interface with the installation technician. In this way the control unit 120 can still receive input from the operator and pass those instructions along to the local controllers 160, but the control unit 120 does not attempt to manage or control the operations of the local controllers 160 other than passing along the instructions from the installation technician.

In this example the local controllers 160 communicate with each other using peer-to-peer communication and are capable of independently controlling their respective components 113. The local controllers 160 operate to communicate with the local controllers 160 of other components so that they can synchronize their operations and utilize information from other components, whether commands or data, in determining how best to control their own components 113. The local controllers 160 are autonomous and are programmed to react to information received from the control unit 120 and other local controllers 160, without needing to be continually controlled by a global controller.

In any of the control modes discussed herein the control unit 120 and control units 113 (including a local controller 160) may be near to each other or positioned far away from each other, so long as they are capable of data communication with each other. For example, a blower may be positioned at a starting point of the duct while a line puller is positioned at the ending point of the duct. The components can communicate with each other via wired or wireless connections, before, during, and/or after the transmission line installation.

Figure 6:
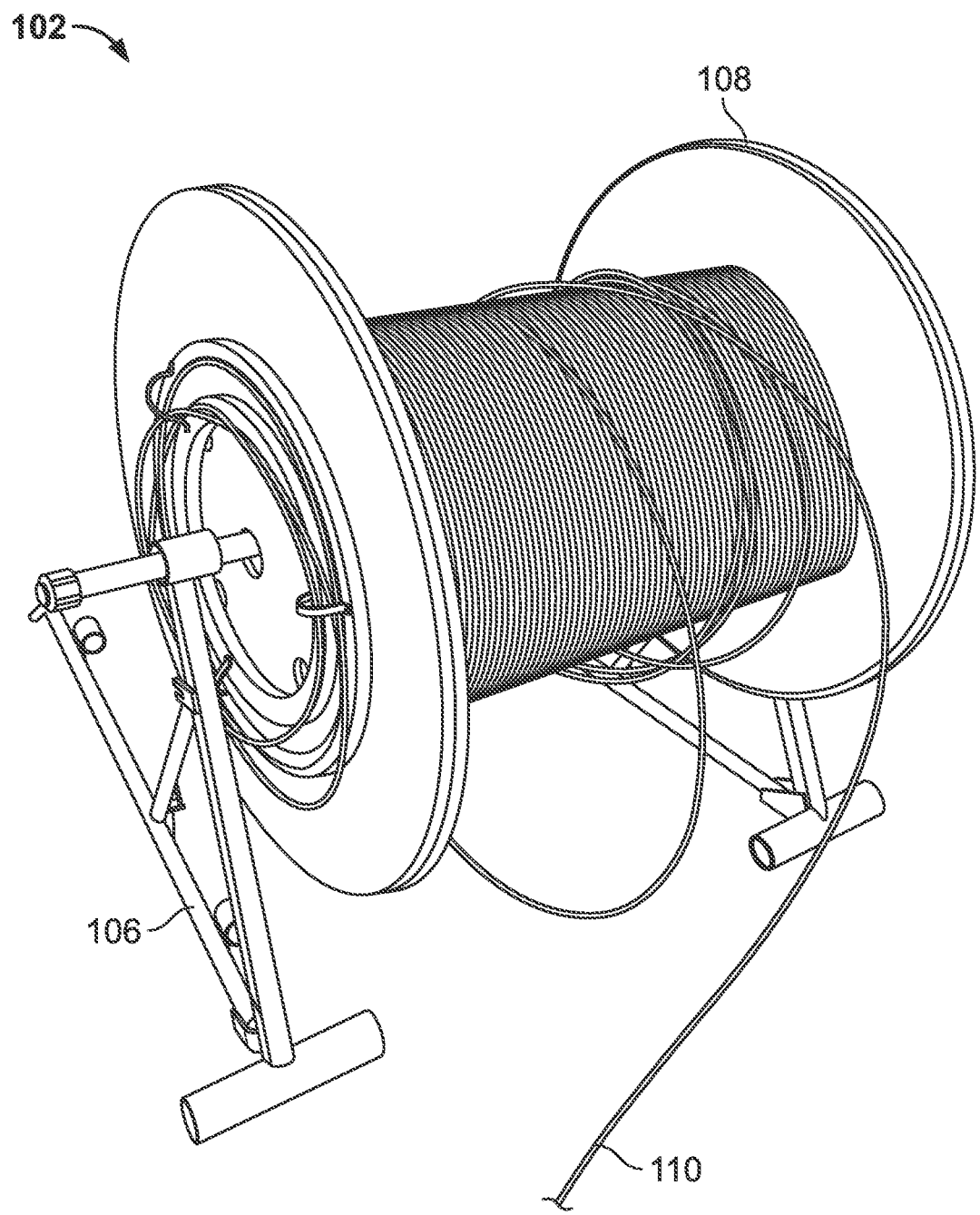
FIG. 6 is a perspective view illustrating an example of a transmission line source of the transmission line installation system shown in FIG. 1.

FIG. 6 is a perspective view illustrating an example of the transmission line source 102. In this example, the transmission line source 102 includes the reel stand 106, the transmission line reel 108, and the transmission line 110.

The transmission line 110 is typically wound around the transmission line reel 108, and the reel stand 106 operates to elevate the transmission line reel 108 above the ground to allow the transmission line reel 108 to rotate and feed the transmission line to the transmission line conveying apparatus 104. An example of the reel stand 106 is illustrated and described in further detail with reference to FIGS. 6-8. Examples of the transmission line 110 are illustrated and described in further detail with reference to FIGS. 9-10.

Other transmission line sources can be used in other embodiments. For example, the reel stand 106 can be mounted on a truck or other vehicle which supplies the transmission line 110. Further, in another possible embodiment the transmission line source 102 is a coiled length of the transmission line 110, which can be fed out by a machine or manually by one or more installation technicians.

Figure 7:
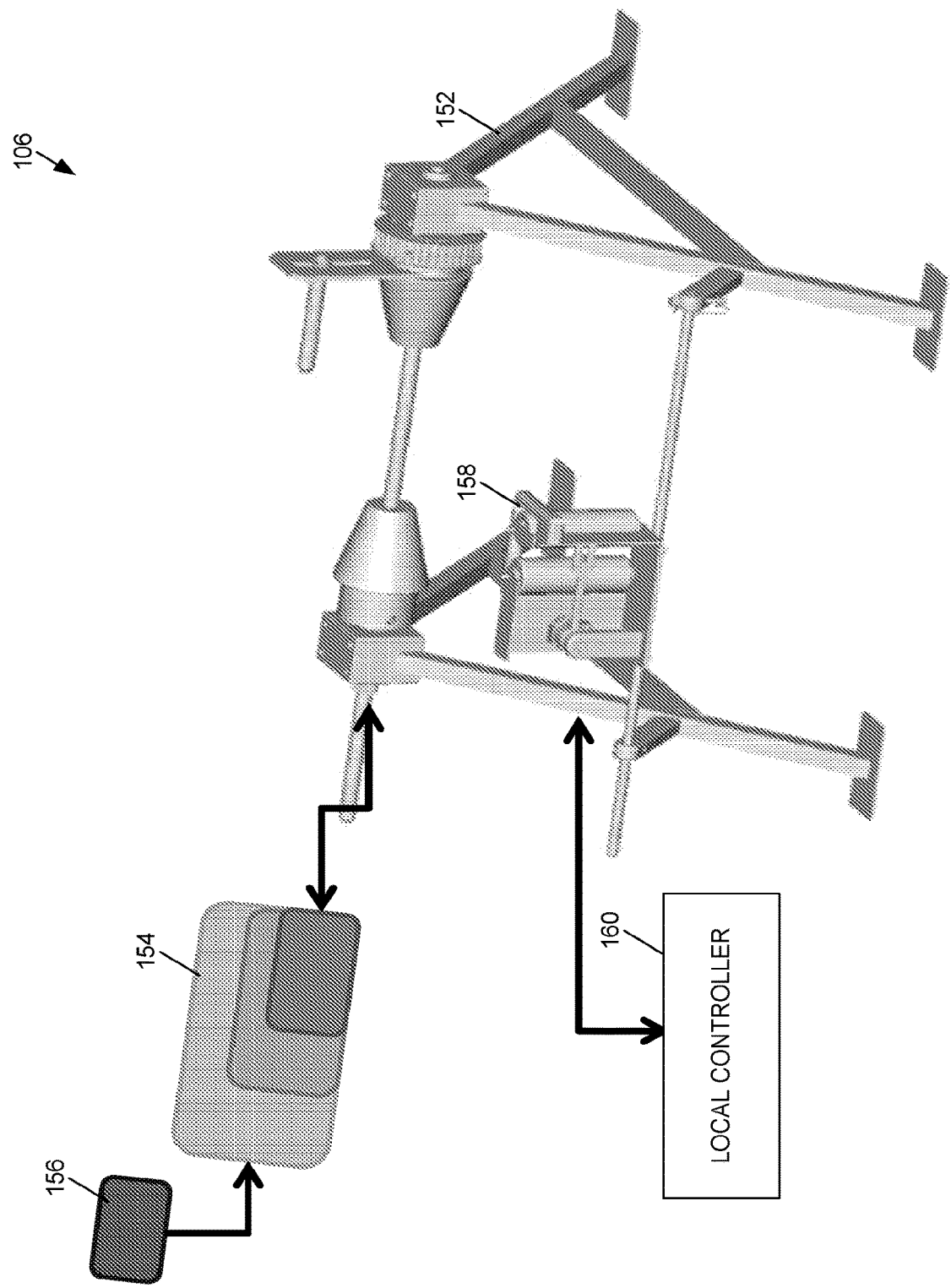
FIG. 7 is a combined perspective view and block diagram illustrating an example of a reel stand of the transmission line source shown in FIG. 2.

FIG. 7 is a combined perspective view and block diagram illustrating an example of the reel stand 106. In this example, the reel stand 106 includes a support frame 152, a motor 154, a brake 156, a transmission line tension sensor 158, and a local controller 160.

The reel stand 106 includes a support frame 152 that supports the transmission line reel 108 above a surface, such as the ground, to permit the transmission line reel 108 to rotate. When the transmission line reel 108 rotates in the proper direction, the transmission line 110 is unwound from the transmission line reel 108 to feed the transmission line 110 to the transmission line conveying apparatus 104 shown in FIG. 1. In some embodiments the support frame 152 includes height and width adjustment mechanisms that allows the height and width of the support frame 152 to be adjusted, such as to accommodate transmission line reels 108 of varying widths and diameters.

The support frame 152 includes a spindle 162 that is positioned through a central aperture of the transmission line reel 108 to support the transmission line reel and which defines an axis of rotation for the transmission line reel 108.

The motor 154 operates to generate a force to control rotation of the transmission line reel 108. In one example the motor 154 is an electric motor, though other embodiments can utilize other types of motors such as hydraulic, pneumatic, and the like. Examples of suitable electric motors include AC or DC motors, which may be synchronous or asynchronous. In some embodiments the motor is a stepper motor which can monitor and precisely control the rotation of the transmission line reel 108. The motor is coupled to the spindle 162, such as through a gear box, belt drive, or other transmission, such that rotation of the motor shaft causes rotation of the spindle 162 and the transmission line reel 108. In some embodiments the motor includes a motor controller. The motor 154 (or motor controller) is controlled by the local controller 160, either through direct electrical connections, or by other forms of wireless or wired data communication.

Some embodiments include a mechanical brake 156 that operates to slow down or stop the rotation of the spindle 162 and the transmission line reel 108. Alternatively, braking functions are performed by the motor 154, such as by adjusting the operation of the stepper motor to slow or stop the motor 154, or by driving the motor in reverse to oppose the momentum of the rotating transmission line reel 108. The brake 156 is controlled by the local controller 160, either through direct electrical connections, or by other forms of wireless or wired data communication.

The transmission line tension sensor 158 operates to detect and measure a tension on the transmission line 110 as it comes off the transmission line reel 108 and is fed toward the transmission line conveying apparatus. One example of a transmission line sensor is an absolute pressure transducer.

Some embodiments also include a line counter that measures a speed and a length of the transmission line 110 as it is fed from the reel stand 106. The measured tension, speed, and length values are communicated from the transmission line tension sensor 158 to the local controller 160, where it can then be shared throughout the transmission line installation system as needed.

In some embodiments the line counter is an optical line counter that operates to read markings present on the exterior surface of the transmission line. Many transmission lines include markings on the exterior surface, such as positioned at one-foot intervals. The markings can identify the distance (e.g., "100 feet") along the transmission line. In some embodiments the line counter includes a camera or other optical detector that detects or reads the markings.

In some embodiments the optical line counter includes a high speed digital camera, which can be a video camera. Images captured by the digital camera may be processed, such as using an optical character recognition (OCR) software program to identify text printed on the exterior of the housing, and then process the text accordingly. The text can include, for example, the name of the transmission line supplier, a model designation, a build code, a numerical distance, or other text information. Other codes may also be printed and readable from the transmission line such as barcodes, QR codes, or other machine readable codes.

In some embodiments the reel stand 106 includes a local controller 160. An example of the local controller 160 is illustrated and described in further detail with reference to FIG. 8.

Figure 8:
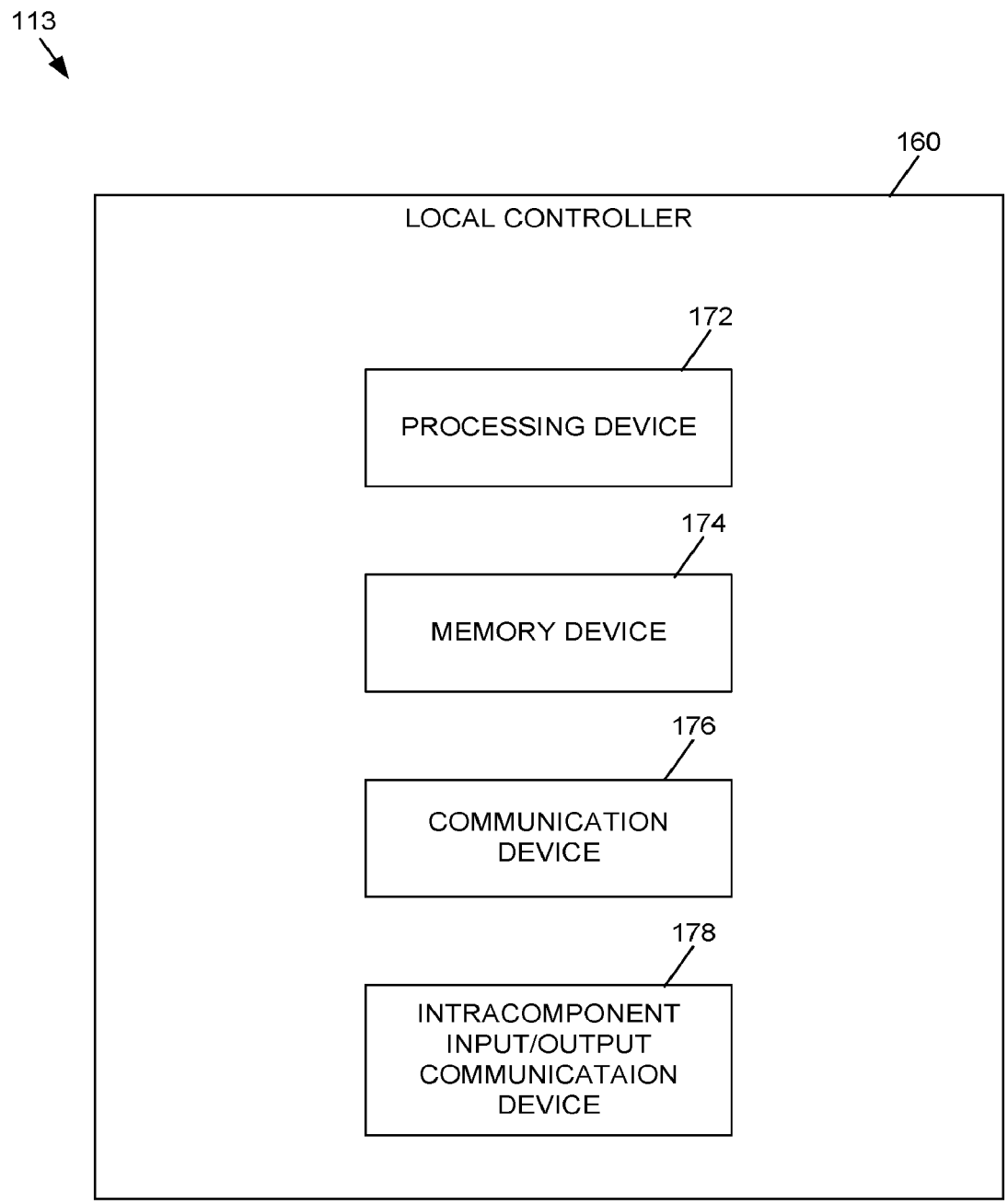
FIG. 8 is a schematic block diagram illustrating an example of the local controller of the reel stand shown in FIG. 3.

FIG. 8 is a schematic block diagram illustrating an example of the local controller 160 of the example reel stand 106 shown in FIGS. 6-7. In this example, the local controller 160 includes a processing device 172, a memory device 174, a communication device 176, and an intracomponent input/output communication device 178. Although described in terms of the reel stand, the same or similar local controller 160 is also used with other components 113 in at least some embodiments of the transmission line installation system 100. Other components include, but are not limited to the compressor 114, power source 116, line blower 118 (or transmission line pusher), and control unit 120. In view of this the same reference number (160) will be used for this device throughout and this description, and will not be separately repeated in detail for each component except where specific or different details are helpful for a complete understanding of the various possible embodiments.

The local controller 160 controls the overall operation of the reel stand 106 (or other component), and communicates through the communication device 176 with one or more other components 113 of the transmission line installation system 100, such as the transmission line conveying apparatus 104 and the control unit 120. For example, in some embodiments the local controller 160 receives commands in the form of messages or instructions from the control unit 120 through the communication device 176. Examples of such commands include start, stop, and speed adjustments (a particular speed setting, an instruction to increase the speed, or an instruction to decrease the speed, etc.). Further, in some embodiments the local controller 160 also sends messages or instructions to other components through the communication device 176. For example, measured data or current or historical settings can be transmitted by the local controller 160 to other components.

The processing device 172 operates to process data instructions to perform functions of the reel stand 106. The memory device 174 stores data instructions, which when executed by the processing device 172, cause the processing device to perform those functions. The memory device 174 does not include transitory media carrying data signals. An example of the memory device 174 is a computer readable data storage device as described in further detail herein.

The communication device 176 is a device that communicates with other devices via wired or wireless data communication. In some embodiments the communication device 176 communicates with one or more of the control unit 120 and other components of the system 100.

The communication device 176 can utilize wireless or wired communication devices. Examples of wireless communication devices include cellular communication devices, Wi-Fi (IEEE 802.11x) communication devices, and BLUETOOTH communication devices. Wired communication devices include modems, USB devices, serial and other I/O communication devices and techniques.

The intracomponent input/output communication device 178 operates to communicate with and control subsystems, sensors, or other electronic or controllable devices within the reel stand (or other component), utilizing wired or wireless communication or control signals. For example, the intracomponent input/output communication device 178 is coupled to and controls the motor 154, brake 156, and transmission line tension sensor 158 in some embodiments. The intracomponent input/output communication device is an example of the i/o devices shown in FIGS. 3-5.

Examples of processing devices, memory devices (including computer-readable storage devices), and communication devices are described herein with reference to an example computing device, and also with reference to the local controllers in FIGS. 3-5, and such descriptions similarly apply to the processing device 172, memory device 174, and communication device 176 of the example of the local controller device 160 shown in FIG. 8.

Figure 9:
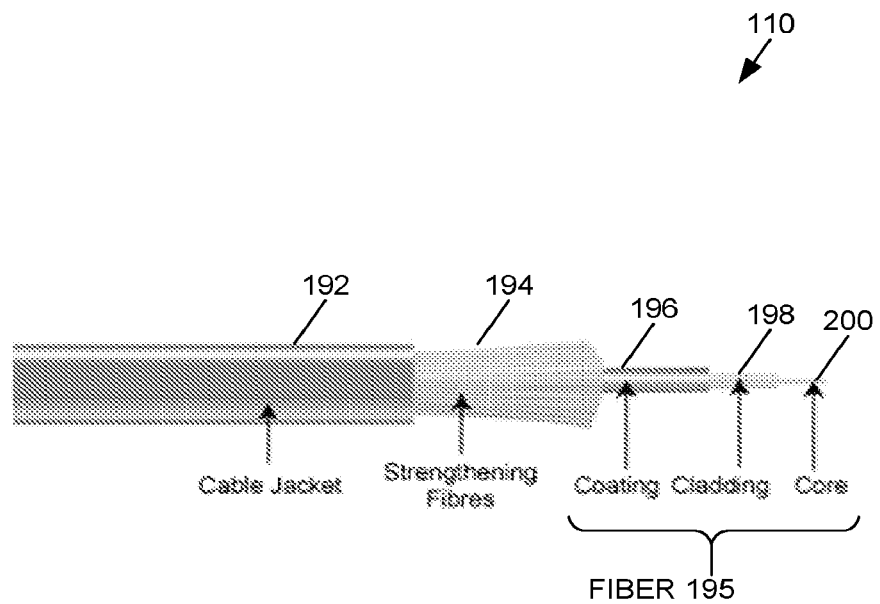
FIG. 9 is a cutaway view of a portion of an example fiber optic cable.
Figure 10:
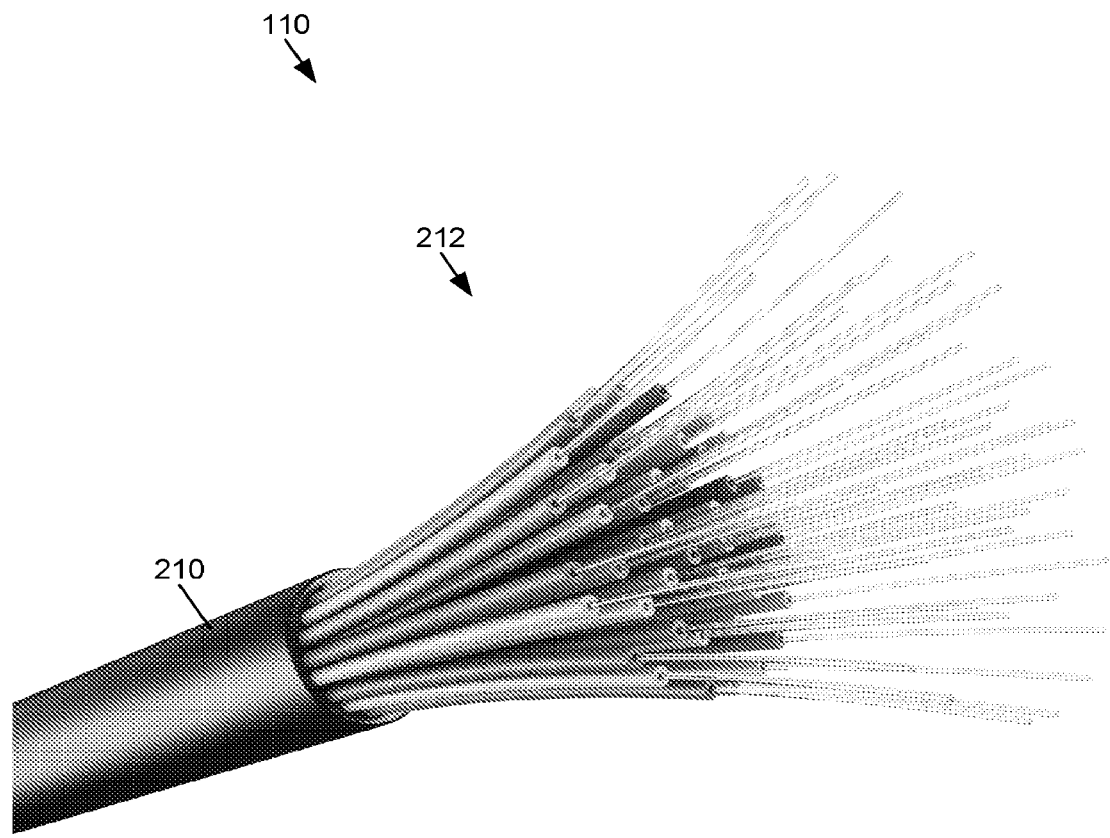
FIG. 10 is a cutaway view of a portion of another example fiber optic cable.

FIGS. 9-10 illustrate examples of a transmission line 110 in the form of a fiber optic cable 110A, shown in FIGS. 1 and 2.

FIG. 9 is a cutaway view of a portion of an example fiber optic cable 110A. In this example, the fiber optic cable 110A includes a single fiber 195. More specifically, the cable 110A includes a jacket 192, strengthening element 194, and the fiber 195 including a coating 196, a cladding 198, and a core 200. Other embodiments can use other transmission lines 110 or other fiber optic cables 110A having different types or configurations than this example.

The jacket 192 is the outer protective layer of the cable 110A. An important factor of the jacket 192 is the construction of the outer surface. Not only does the outer surface act as a primary protective layer, it also forms the outer exterior surface of the cable 110A.

The outer surface is the part of the transmission line 110 that makes contact with the interior of the duct (shown in FIGS. 1 and 11-12) during installation, and therefore directly impacts how and how easily the transmission line can be installed in a particular duct. For example, if the outer surface has a low coefficient of dynamic friction there will be less resistance to the advancement of the line and greater distances may be possible, or less force and lower speeds may be possible. As another example, if the outer surface is soft or has a low melting point, the line may need to be installed at a slower speed to avoid melting or stripping away the outer coating, or additional lubrication may be desired. The jacket also impacts the overall stiffness of the transmission line 110, which impacts how easily the line can be bent around a corner.

The fiber 195 is positioned inside of the cable 110A and includes from inside out, the core 200, the cladding 198, and the coating 196. The core is the inner-most portion of the cable 110A that is formed of a material such as glass or plastic and transmits light. The cladding 198 surrounds the core. A coating 196 surrounds the cladding. The particular properties of the core 200, the cladding 198, and the coating 196 are selected so that light that enters the core is totally internally reflected due to a difference in the refractive index between the core and the cladding. As a result, light emitted into the core at one end of the cable 110A is trapped inside the core due to the total internal reflection, and travels through the length of the cable until it reaches the other end.

Additional strengthening, protective, light blocking, or other layers or coatings are also sometimes included within the cable 110A, such as the strengthening element 194.

FIG. 10 is a cutaway view of a portion of another example of a transmission line 110 and fiber optic cable 110B. In this example, the fiber optic cable 110B includes a jacket 210 and a plurality of optical fibers 212 within a single cable 110B. For example, the fiber optic cable 110B includes a jacket 210, and a plurality of optical fibers (each which may include its own jacket or other layers or coatings). In some embodiments the fiber optic cable 110B includes a range from about 1 to about 1,000 optical fibers. Multiple optical fibers permit the cable to transmit multiple separate light signals at the same time, thereby multiplying the amount of data that can be transmitted by the single cable.

In some embodiments the transmission line 110 or its packaging includes a barcode or other printed or affixed label that includes an identifier of the transmission line 110. The identifier may be a UPC code, model or part number, a name of a manufacturer, a serial number, or other identifier or combination of identifiers. In some embodiments the identifier is scanned or otherwise read by the transmission line installation system 100, or an installation technician who inputs the identifier into the transmission line installation system 100. The transmission line installation system 100, in some embodiments, stores a database of transmission lines 110 (such as fiber optic cables) and associated specifications. Upon receipt of the identifier, the transmission line installation system 100 retrieves the specifications using the identifier so that the characteristics of the particular transmission line being installed are known before the installation begins.

Figure 11:
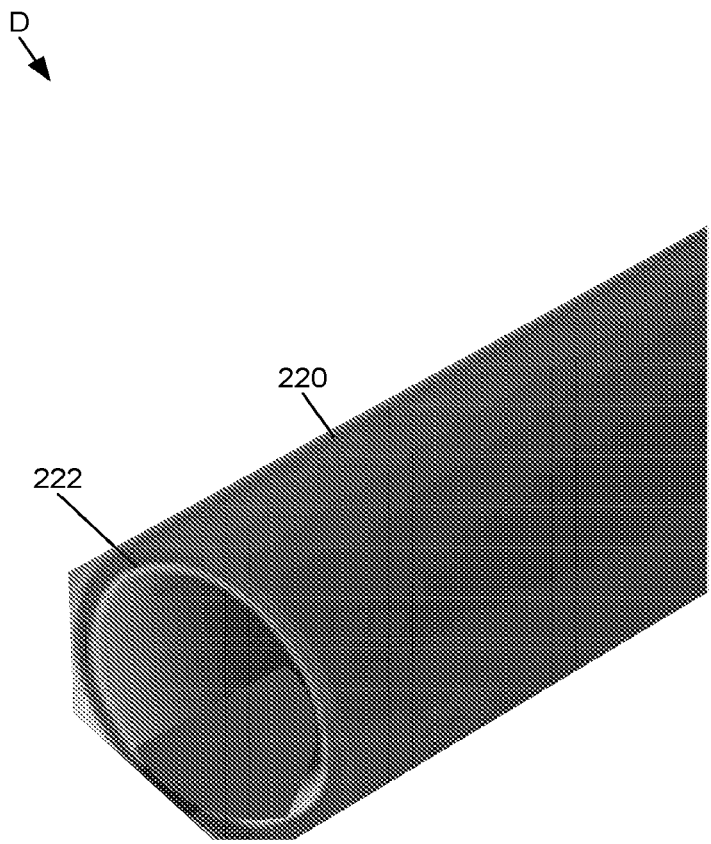
FIG. 11 is a perspective view illustrating a portion of an example duct.

FIG. 11 is a perspective view illustrating a portion of an example duct D. In this example, the duct D includes an outer sheath 220 and an interior coating 222.

The duct D is an elongate conduit having a hollow interior. Some ducts D are designed to be installed underground, whereas other ducts are designed for installation within a building or home. The duct provides a protected enclosure in which the transmission line 110 can be installed, and defines a path along which the transmission line 110 (FIG. 1) can be installed in the ground or building that is free of obstructions.

The duct can have a variety of configurations, including one or more layers of material. In this example, the duct D includes an outer sheath 220 and an interior coating 222. The outer sheath 220 is the main body of the duct defining a sidewall of the duct. In some embodiments the outer sheath 220 is formed of a waterproof or resistant that acts to prevent water or other contaminants from entering the interior of the duct and interacting with the transmission line 110 or other contents. The duct is also typically airtight (when the ends are adequately sealed) to allow to be increased in the duct by blowing air in from one end. In some embodiments the duct D has an interior coating 222 along the interior surface. For example, the interior coating 222 can be formed of a material having a low coefficient of dynamic friction to reduce dynamic friction during the installation of the transmission line. Other types of ducts D do not have an interior coating 222, and may as a result have a higher coefficient of dynamic friction. Ducts D can also have a variety of different interior configurations, including homogeneous, lined, or internally profiled. Some ducts D are pre-lubricated. When installing a fiber of up to 2 or 5 km or more, even a small frictional contact along an edge of the transmission line can add up to a significant frictional resistance across the length of the transmission line, and therefore the specific configuration and coefficient of dynamic friction is helpful to know in advance so that the system 100 can adjust accordingly.

Another factor that impacts the installation process is the diameter of the duct. A smaller sized duct is sometimes referred to as a microduct, which generally has a diameter in a range from about 3 to about 16 mm. Other ducts can be much larger. However, it is typically preferred that the diameter of the duct D be not more than 30-40% larger than the diameter of the transmission line 110 so as to prevent buckling of the transmission line 110 within the duct, which can cause problems during the installation process.

Figure 12:
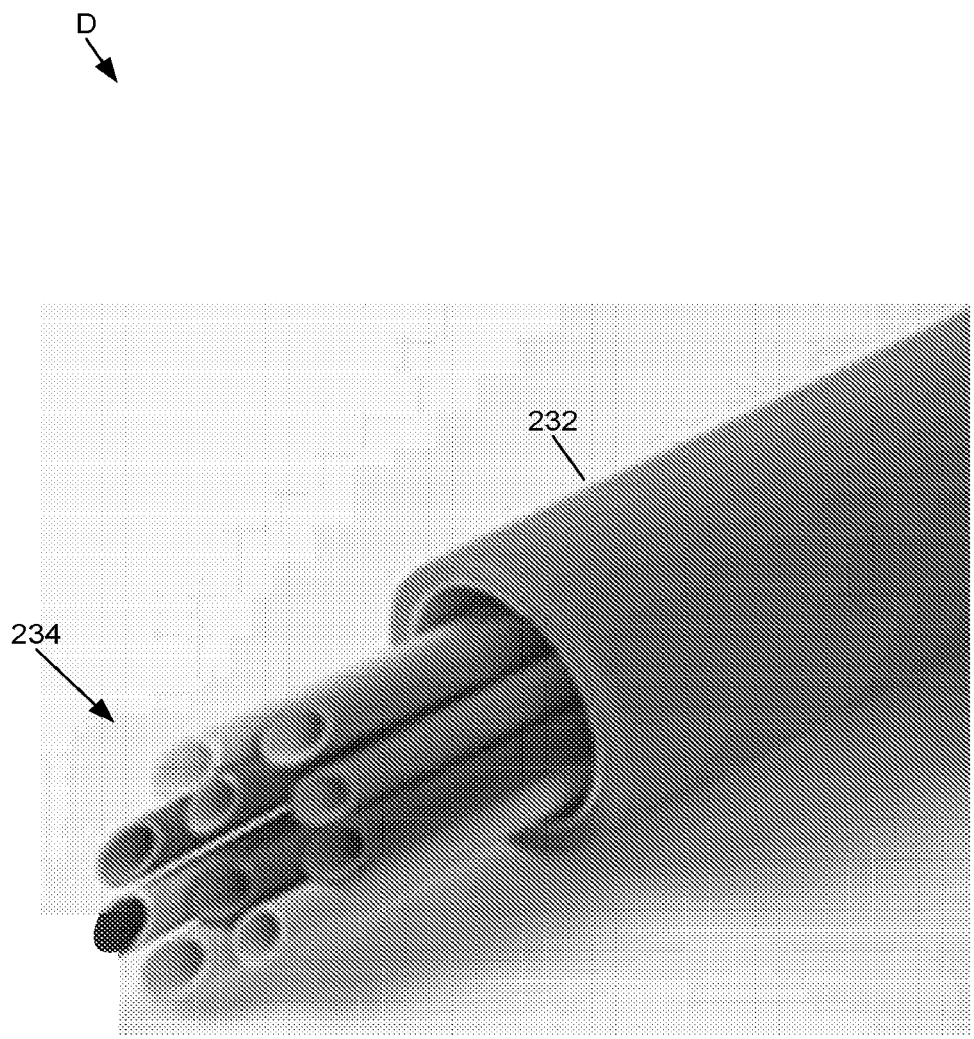
FIG. 12 is a perspective view illustrating a portion of another example duct.

FIG. 12 is a perspective view illustrating a portion of another example duct D. This example illustrates another configuration of a duct, in which the duct D includes an outer duct 232 and a plurality of microducts 234. The microducts 232 are arranged inside of the outer duct 232, defining a plurality of transmission line paths therein, to permit installation of multiple transmission lines, such as one per microduct 232. In some embodiments the duct includes a plurality of microducts 232, such as in a range from 2 to about 15. Other embodiments include other quantities of microducts.

In some embodiments the microducts have a structure similar to the duct described above with reference to FIG. 11, and similarly can include more or fewer layers and constructions.

In some embodiments the duct D or its packaging includes a barcode or other printed or affixed label that includes an identifier of the duct. The identifier may be a UPC code, model or part number, a name of a manufacturer, a serial number, or other identifier or combination of identifiers. In some embodiments the identifier is scanned or otherwise read by the transmission line installation system 100, or an installation technician who inputs the identifier into the transmission line installation system 100. The transmission line installation system 100, in some embodiments, stores a database of ducts and associated specifications. Upon receipt of the identifier, the transmission line installation system 100 retrieves the specifications using the identifier so that the characteristics of the particular duct are known before the installation begins.

A barcode is an example of a machine readable code. In other embodiments other machine readable codes can also be used, such as a two-dimensional barcode or QR code. In some embodiments optical character recognition is used to read human readable text. This applies to both the duct D and the transmission line 110 discussed above, as well as any other desired part or component of the system, such as the components discussed herein (e.g., to identify a type or model of component and corresponding functions or specifications), a lubricant container (e.g., to identify a type of lubricant being used), and the like.

Figure 13:
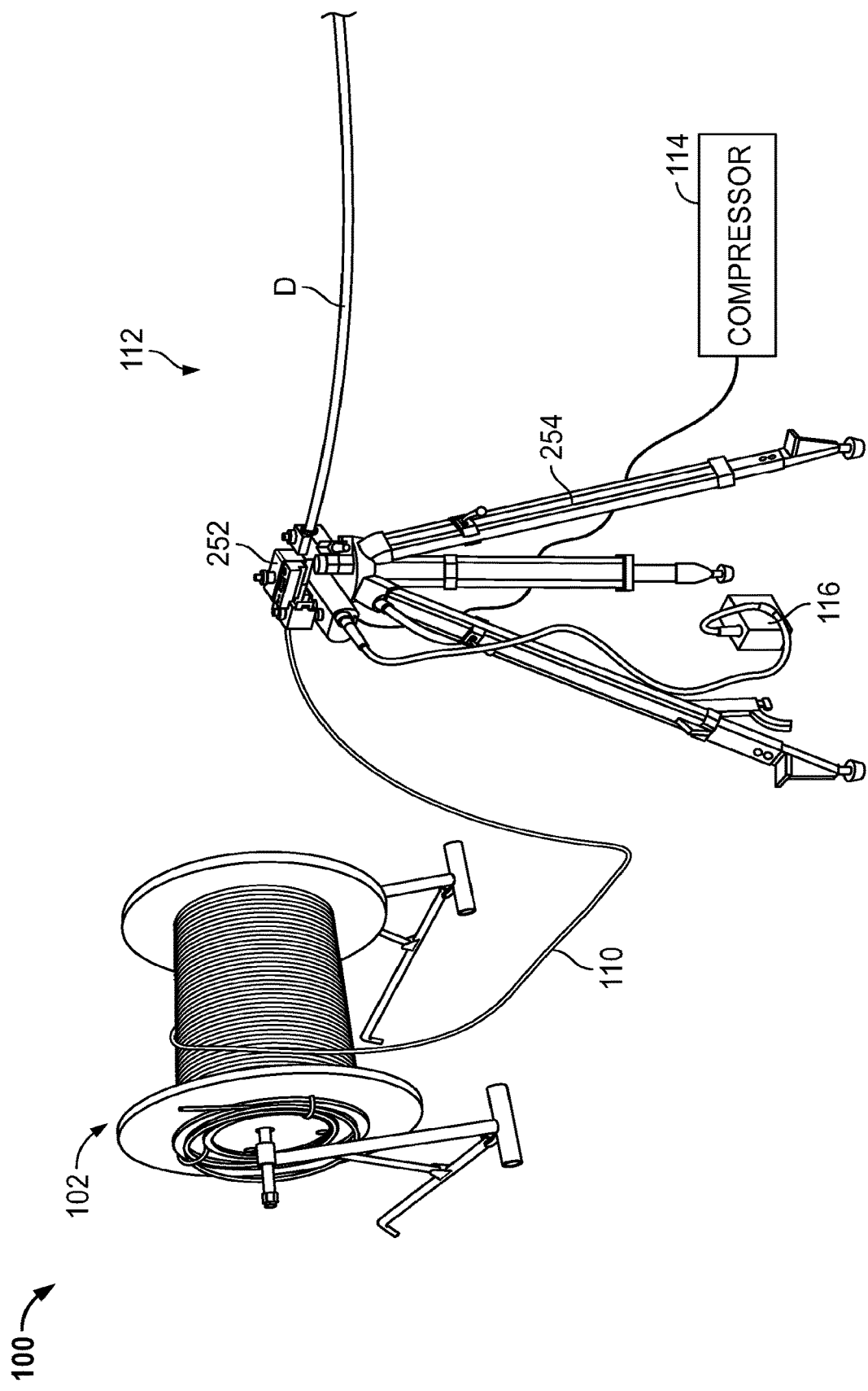
FIG. 13 is a perspective view illustrating portions of the transmission line installation system shown in FIG. 1.

FIG. 13 is a perspective view illustrating portions of the transmission line installation system 100, and in particular the reel stand 106, transmission line 110, line blower system 112, and duct D are shown. In this example the line blower system 112 includes the compressor 114, power source 116, and line blower 118, and the line blower 118 includes a blower head 252 and a stand 254.

As discussed above, the reel stand 106 supplies the transmission line 110 to the line blower system 112, which operates to advance the transmission line 110 through the duct D to install the transmission line 110 in the duct.

Figure 16:
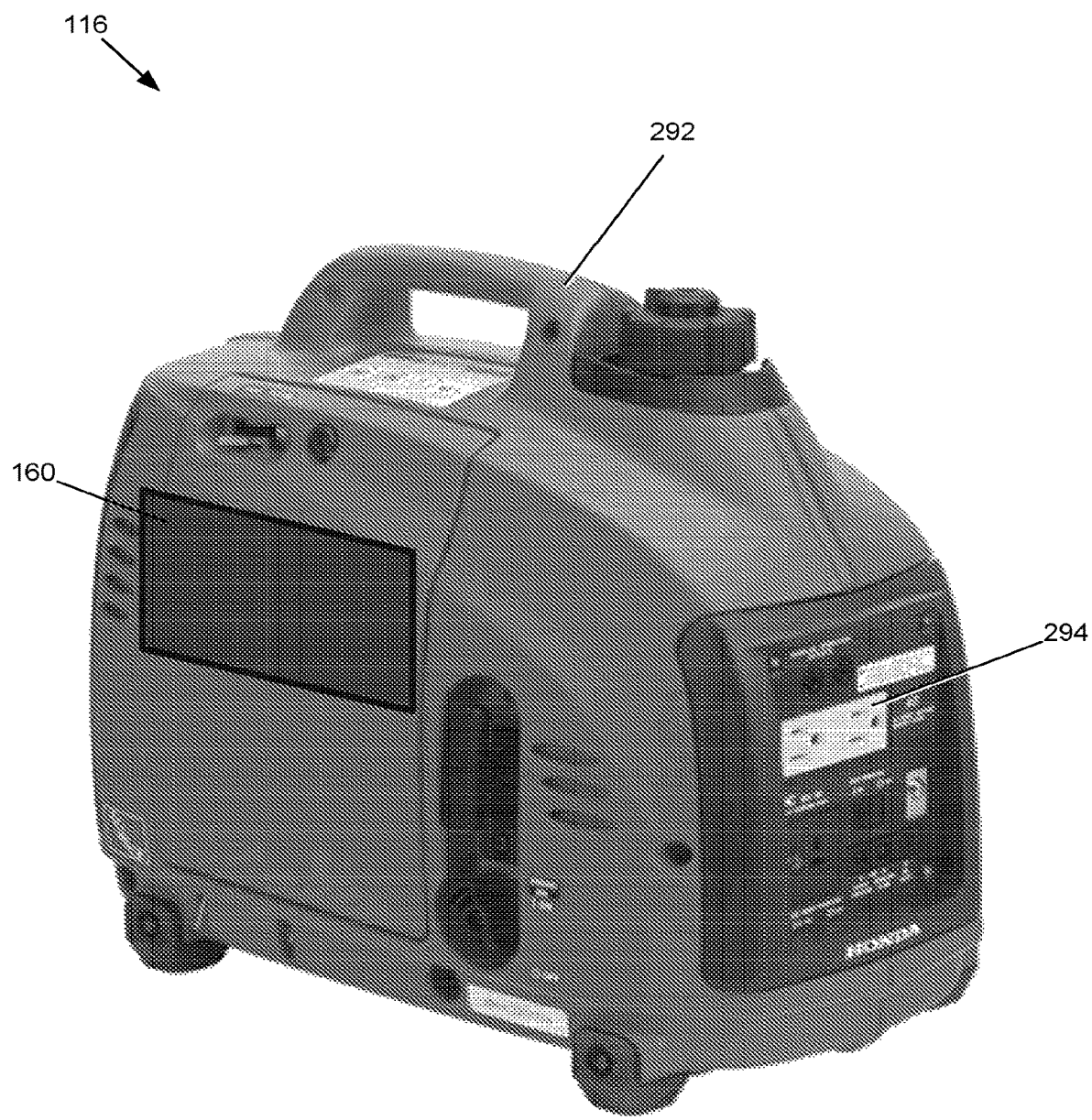
FIG. 16 is a perspective view of an example power source of the transmission line installation system shown in FIG. 1.
Figure 17:
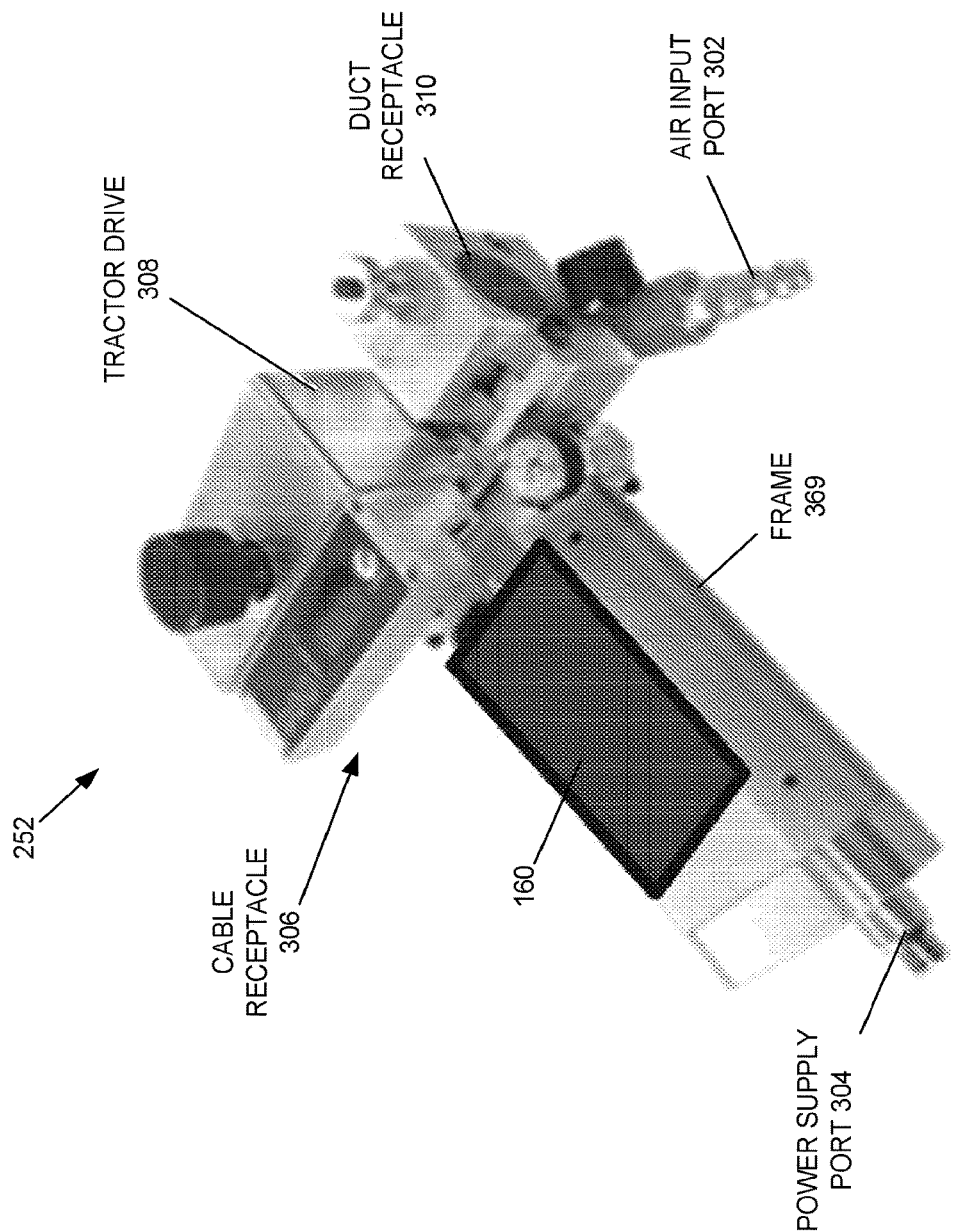
FIG. 17 is a perspective view of an example blowing head of the transmission line installation system shown in FIG. 1.
Figure 18:
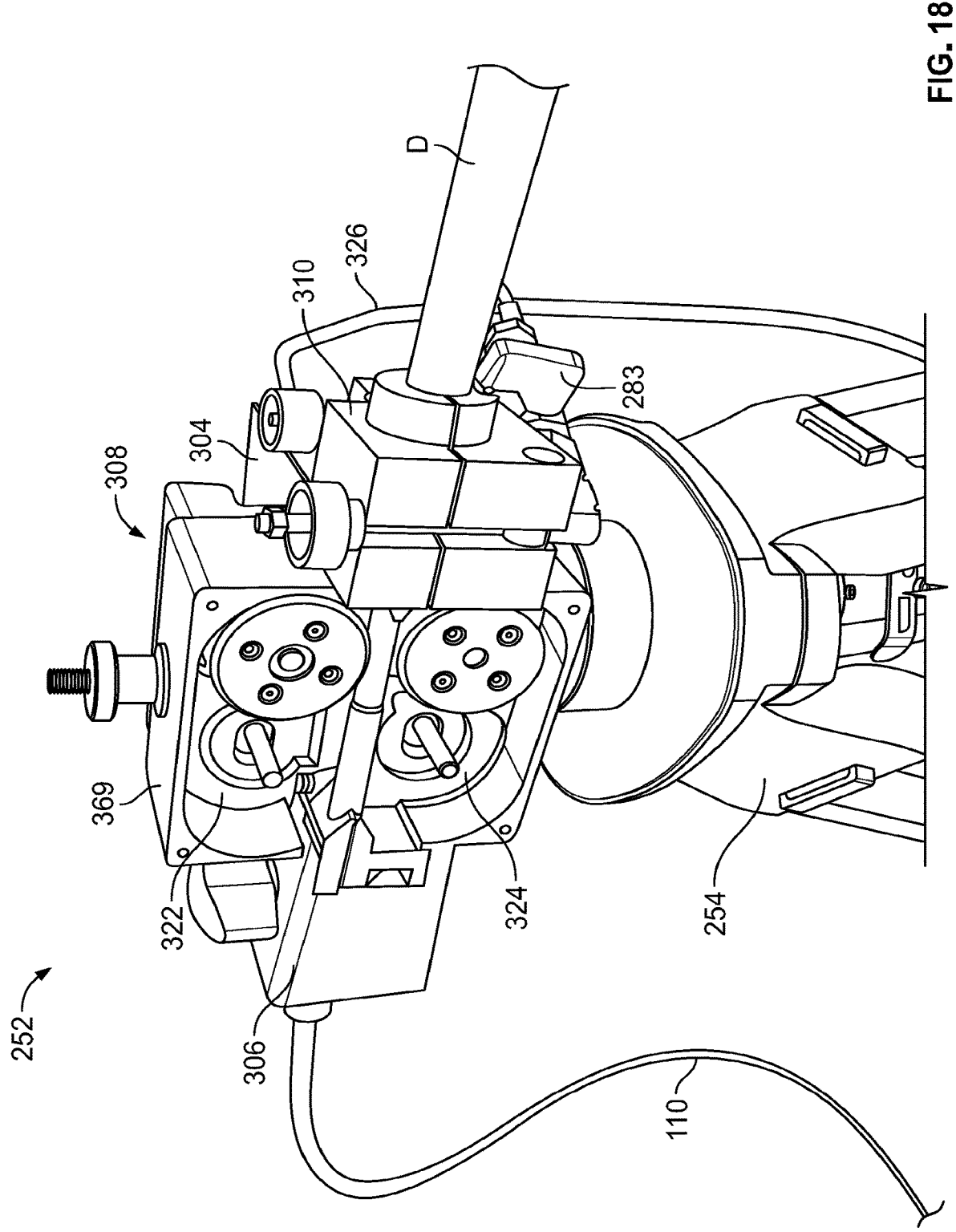
FIG. 18 is another perspective view of the example blowing head shown in FIG. 13.
Figure 19:
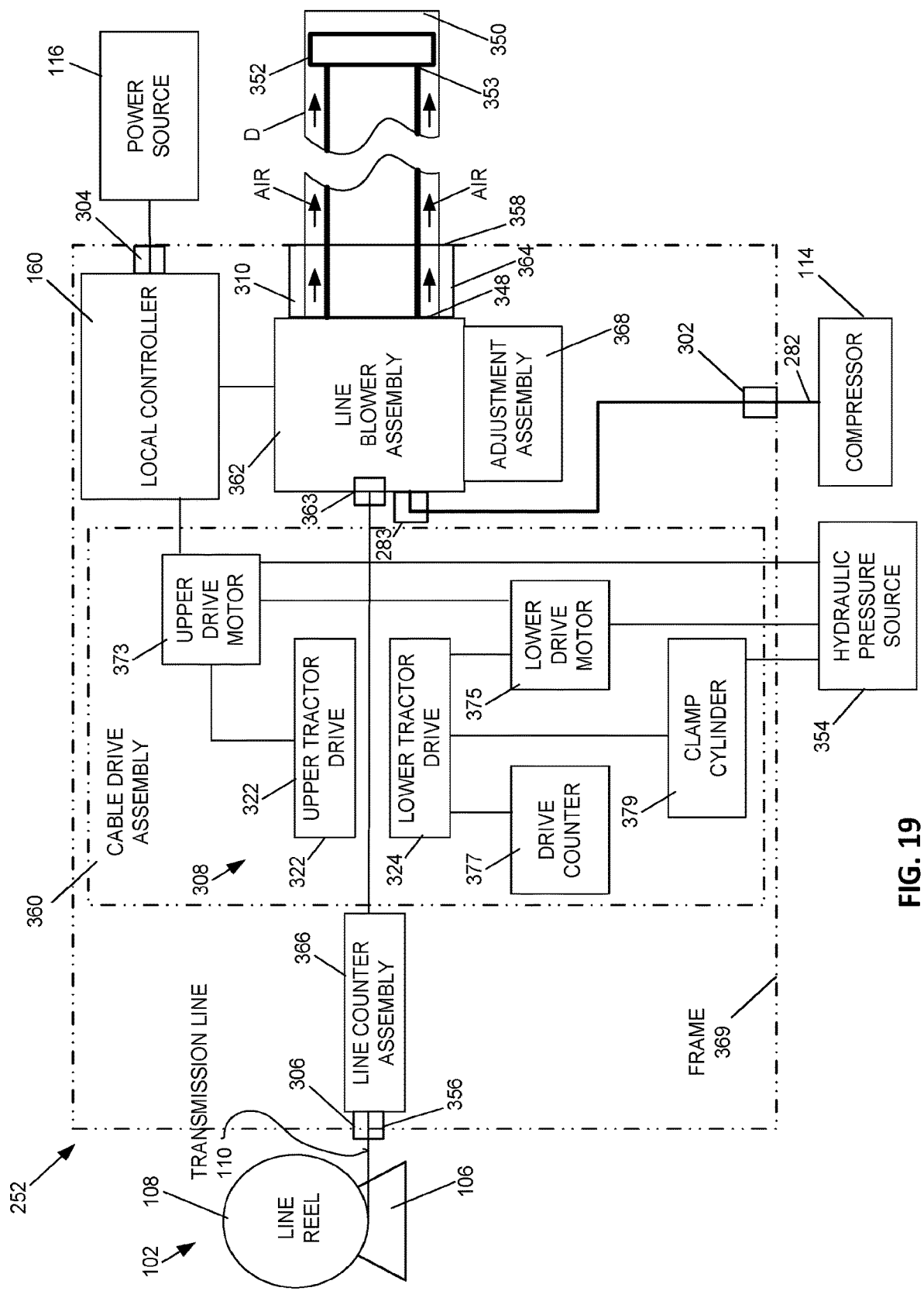
FIG. 19 is a block diagram of the example blowing head shown in FIG. 13.

Parts of the example line blower system 112 are illustrated and described in further detail with reference to FIGS. 14-19. More specifically, an example compressor 114 is shown in FIGS. 14-15, an example power source is shown in FIG. 16, and an example line blower 118 is shown in FIGS. 17-19.

Figure 14:
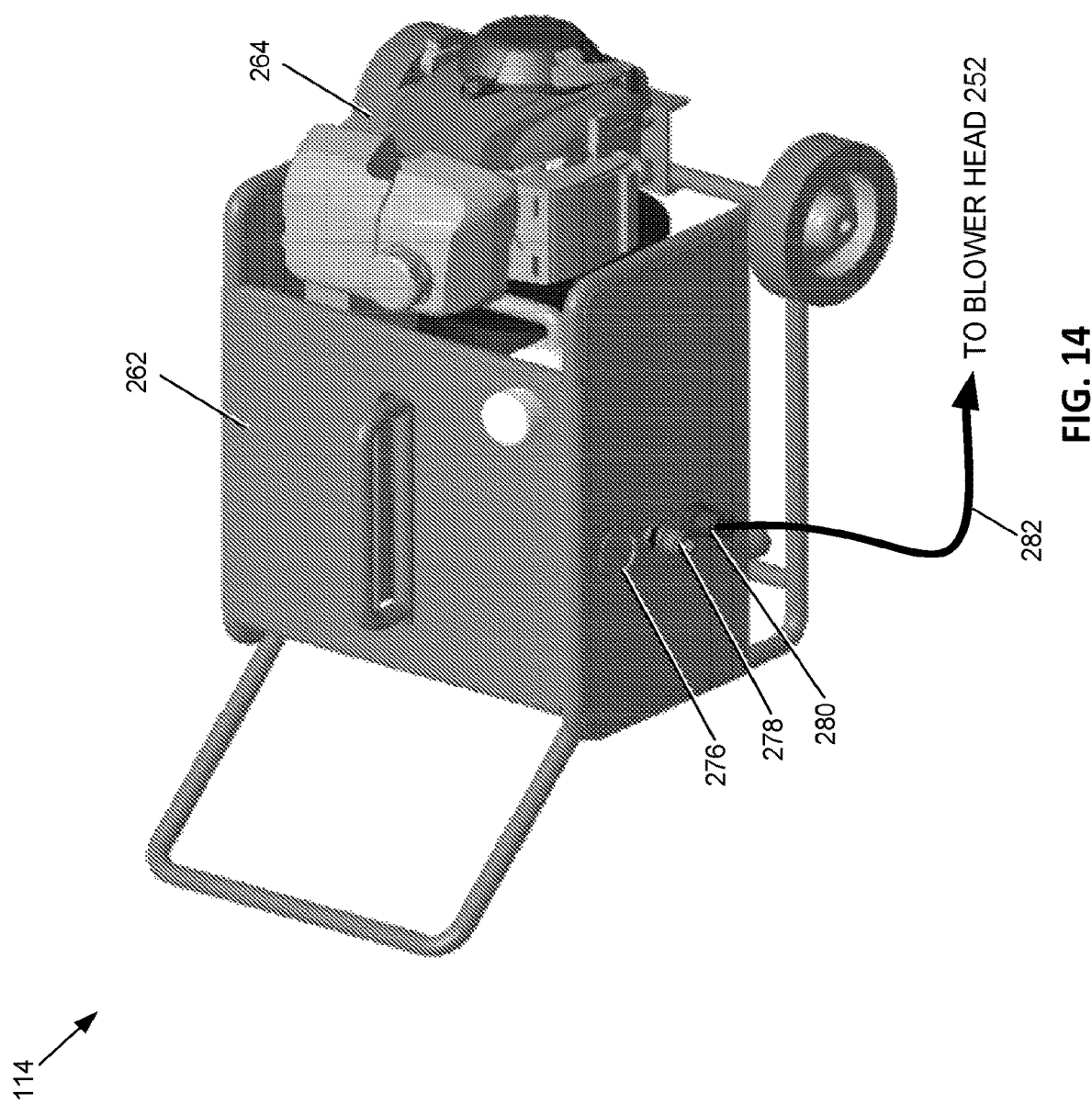
FIG. 14 is a perspective view of an example compressor of the transmission line installation system shown in FIG. 1.
Figure 15:
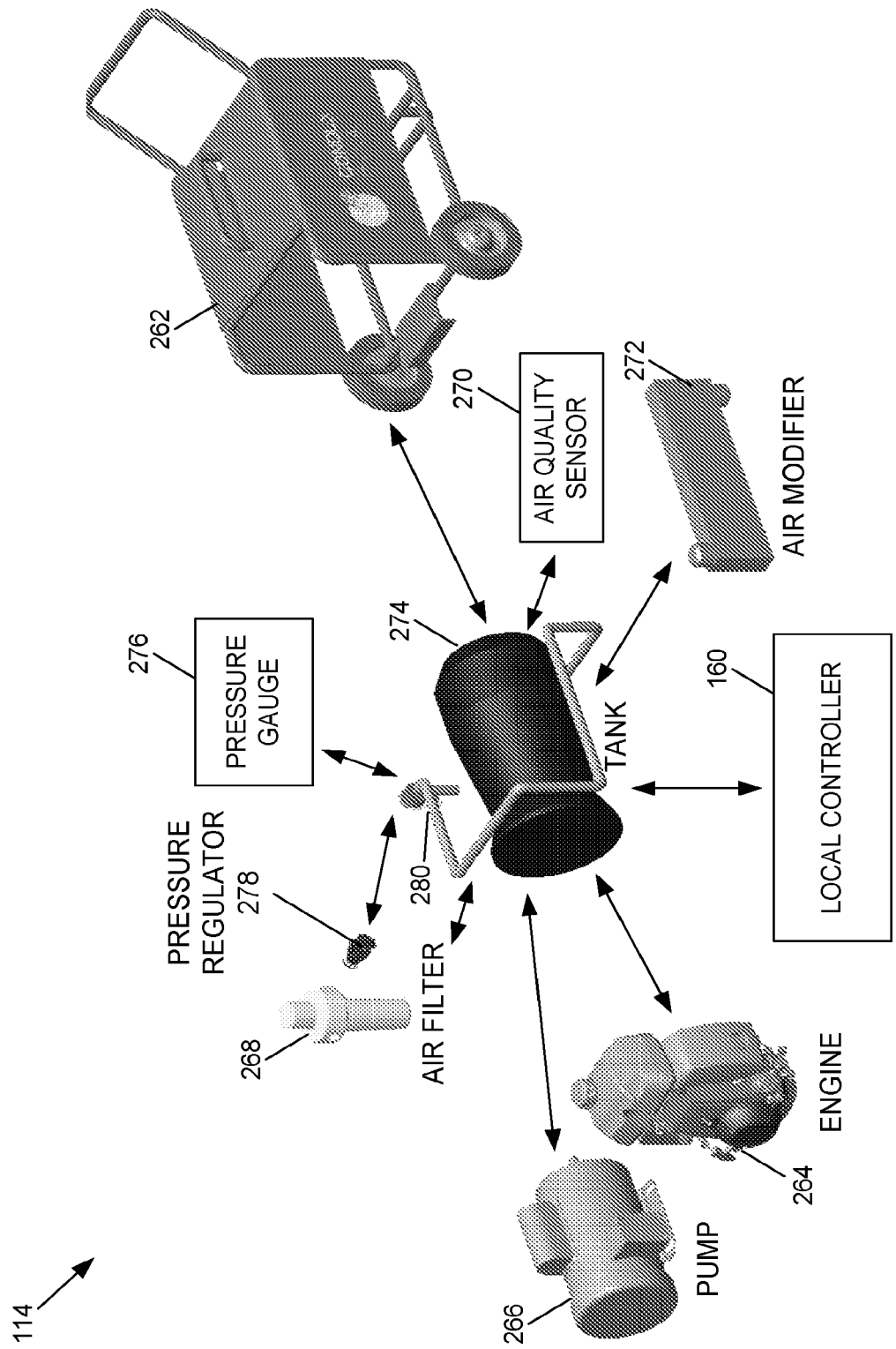
FIG. 15 is an exploded perspective view and block diagram of the example compressor shown in FIG. 10.

FIGS. 14-15 illustrate an example of the compressor 114. FIG. 14 is a perspective view and FIG. 15 is an exploded perspective view and block diagram of the example compressor 114. In this example, the compressor 114 includes a mobile cart 262, an engine 264, a pump 266, an air filter 268, an air quality sensor 270, an air modifier 272, a tank 274, a pressure gauge 276, a pressure regulator 278, an air output 280, an air hose 282, and a local controller 160.

The compressor 114 is a machine that provides a source of pressurized air to the blower head 252 (shown in FIG. 13). The pressurized air is then supplied by the line blower 118 into the duct to help propel the transmission line 110 through the duct during the installation process. A variety of possible air compressors can be used, and FIGS. 14-15 illustrate one possible example.

The mobile cart 262 is a wheeled platform that supports the rest of the compressor 114 components, to allow for more easily moving and transporting the compressor 114 to, from, and around a site S. In this example the mobile cart 262 has a handle, frame, and wheels.

The engine 264 is provided to generate power when another power source is not readily available. In some embodiments the engine 264 is a gasoline engine, which is connected to an electrical generator that generates electrical energy to operate the pump 266. In other embodiments the engine 264 is mechanically coupled to the pump (such as through a transmission) to operate the pump directly. The gasoline engine 264 is powered by a fuel such as gasoline and generates power by capturing energy generated by combustion.

The pump 266 is a machine that pushes air. The pump 266 receives input air and pushes it into the tank 274, such as using one or more of a piston, rotary vane, or rotary screw type pump.

One of the byproducts of compressing air is that heat is generated. Excessive heat can negatively impact the installation of a transmission line 110 by causing condensation, and/or increasing friction through the softening of the transmission line jacket, or even causing the jacket to melt. Accordingly, some embodiments include an air modifier 272 (discussed in further detail below) that can be used to cool the input air either before or after passing through the pump 266. Some embodiments include an after cooler. In some embodiments the air modifier includes an air conditioner that utilizes a refrigerant to cool the air. In some embodiments the air modifier includes a humidifier to inject water.

The air filter 268 receives input air from the environment and passes that air through a filter media that removes contaminants such as dust from the input air before providing the air to the pump 266.

An air quality sensor 270 is provided in some embodiments to detect one or more qualities of the input air. In one example embodiment, the air quality sensor 270 is a temperature sensor. In another example embodiment, the air quality sensor 270 is a humidity sensor. Some embodiments include multiple air quality sensors, such as a temperature and humidity sensor. In some embodiments the air quality sensor 270 is coupled to the air modifier 272, and/or the local controller 160. The air quality sensor 270 can be used to detect one or more qualities of the input air before or after the air modifier 272 and before or after the pump 266, or can include multiple sensors to detect one or more qualities of the input air before and after the air modifier 272 and/or the pump 266.

Some embodiments include an air modifier 272, which operates to modify the input air. In some embodiments the air modifier 272 is an air cooler, such as an air conditioner. The air cooler reduces the temperature of the input air, such as using a refrigerant using a refrigeration cycle. In some embodiments the air cooler reduces the air from the original temperature to a desired temperature that is less than the original temperature.

In some embodiments the air modifier 272 is an air dryer that operates to remove water from the input air. In some embodiments this function is a byproduct of passing the input air through the air cooler, and in other embodiments an additional or alternative air dehumidifier is used. In some embodiments the air modifier 272 reduces the humidity of the input air from an original humidity to a desired humidity that is less than the original humidity.

In some embodiments, the air modifier 272 is an air humidifier that operates to add water to the input air. In some embodiments the air modifier 272 injects a spray of water vapor into the input air to increase the humidity of the input air from an original humidity to a desired humidity that is greater than the original humidity.

The tank 274 is a storage receptacle configured to store compressed air prior to delivery to the blower head 252.

The pressure gauge 276 is provided to measure the pressure of the air. In some embodiments the pressure gauge 276 measures the air pressure within the tank 274. In other embodiments the pressure gauge 276 measures the air pressure along the air output line.

The pressure regulator 278 operates to control the air pressure supplied to the air output 180. The pressure regulator 278 can supply an air pressure to the air output that is less than the air pressure in the tank 274. In some embodiments the pressure regulator 278 is controllable by the local controller 160 to select and adjust the desired air pressure delivered to the output 280.

The air output 280 is a coupling where the air hose 282 can be connected, and where the pressurized air is output from the compressor 114. In some embodiments the air output 280 includes a quick connect coupling, for example.

The air hose 282 is an air supply line that can deliver air from the air compressor to the blower head 252. The air hose 282 typically includes couplings on either end configured for connection to the air output 280 and a pressurized air input port on the blower head 252.

The local controller 160 of the compressor 114 operates to control operations of the compressor 114 and to communicate with other local controllers 160, and the control unit 120. An example of local controller 160 is shown in FIG. 8.

In some embodiments the transmission line installation system 100 can also include a compressor module separate from the compressor 114. In some embodiments the compressor module is a separate component 113 that includes its own local controller.

FIG. 16 is a perspective view of an example power source 116. In this example, the power source 116 is a generator 292. The generator 292 includes an output receptacle 294 and a local controller 160.

The generator 292 operated to generate electricity to power electronic components of at least the blower head 252, and can also be used to power other electronic components of the transmission line installation system 100. In some embodiments the generator 292 includes a gas engine that powers the generator through combustion. The electricity is provided to the receptacle 294 where a power cord can be plugged in to deliver power from the receptacle 294 to the blower head 252.

Other power sources 116 are used in other embodiments. As one other example, if mains power is available at or near the site S, the mains power can be used directly by plugging the power cord directly into the mains power. In another possible embodiment, a battery power source is used. Power sources 116 can also include a hydraulic or pneumatic source.

FIGS. 17-19 illustrate an example blowing head 252. FIG. 17 is a perspective view of the blowing head 252. FIG. 18 is another perspective view of the blowing head 252 with a cover piece removed to show interior components of a tractor drive. FIG. 19 is a block diagram of the example blowing head 252.

The example shown in FIG. 17 illustrates several parts of the blowing head 252, including an air input port 302, a power supply port 304, a transmission line receptacle 306 (hidden from view in FIG. 17), a tractor drive 308, a duct receptacle 310, the local controller 160, and the frame 369. The blowing head 252 is described in further detail with reference to FIGS. 18 and 19.

The example shown in FIG. 18 illustrates several of these parts of the blowing head 252 more clearly, and in particular a cover piece is removed to show interior components of the tractor drive 308. Shown in FIG. 18 are the transmission line 110, duct D, power supply port 304, transmission line receptacle 306, tractor drive 308 including the upper tractor drive 322 and lower tractor drive 324, duct receptacle 310, power cable 326, and the stand 254. The parts are discussed in further detail with reference to FIG. 19.

FIG. 19 is a schematic block diagram of the example blower head 252. As in prior examples, this example of the blower head 252 includes the air input port 302, power supply port 304, transmission line receptacle 306, tractor drive 308 including the upper tractor drive 322 and the lower tractor drive 324, and the duct receptacle 310.

The duct D is shown including a proximal end 348 and a distal end 350. The transmission line 110 is provided by the transmission line source 102 (such as including a reel stand 106 and transmission line reel 108). In some embodiments a carrier 352 is fastened at a distal end 353 of the transmission line 110. The compressor 114, power source 116, and a hydraulic pressure source 354 are also shown.

Some embodiments of the blower head 252 further include one or more of an inlet 356 and outlet 358, a transmission line drive assembly 360, a line blower assembly 362, an air block 363, a duct mount assembly 364, a transmission line counter assembly 366, an adjustment assembly 368, and a frame 369. Some embodiments of the transmission line drive assembly 360 include the upper and lower tractor drives 322, 324, upper and lower drive motors 373 and 375, a drive counter 377, and a clamp cylinder 379.

The blower head 252 generates motive force(s) for the installation of the transmission line 110 to be pulled from the transmission line reel 108, or other transmission line source, and inserted into an interior of duct D. The duct D can be any of a variety of known ducts, such as polyethylene, suitable for receiving and storing the transmission line 110. Once installed in the duct, the transmission line 110 can subsequently be used, such as for transmission of light or electrical signals, or power. As discussed, herein, the transmission line 110 can be any of a variety of known cables or wires used for transmitting energy or signals, including fiber optic cable having one or more optical fibers contained therein, and preferably having a circular outer perimeter. The blower head 252 accepts the transmission line 110 at the inlet 356, and the transmission line 110 exits the blower head 252 at the outlet 358. The duct D extends from the blower head 252 to the distal end 350, which can be several hundred feet or less away from the blower head 252, or several thousand feet or more away from the blower head 252.

Preferably, the motive force generated by the blower head 252 includes a pushing force generated by frictional engagement of the transmission line 110 with a moving drive assembly 360. The blower head 252 includes a transmission line drive assembly 360, which frictionally engages the transmission line 110 so as to provide a motive pushing force. In some embodiments, the transmission line drive assembly 360 is hydraulically driven by a hydraulic pressure source 354 linked by hydraulic lines to the drive assembly 360.

In some embodiments the motive force further includes a pulling force generated by air pressure. The blower head 252 preferably also includes the line blower assembly 362, which allows for pressurized air to enter the duct D. The carrier 352 attached to the distal end 353 of the transmission line 110 slideably and sealably closes off duct D from the atmosphere sufficient to create a pressure difference adjacent to the carrier 352. An example of a line carrier 352 is illustrated and described in further detail with reference to FIG. 20. Line blower assembly 362 is linked to the compressor 114, which generates appropriate air pressure. The air hose 282 and a valve 283 (FIG. 18) link the compressor 114 with the line blower assembly 362. The valve 283 can be manually or electronically adjustable. An electronically adjustable valve is electronically connected to the local controller, which can adjust the valve between open and closed positions, or to various partially opened positions, to adjust the air flow through the blower and into the duct D. Air pressure within the duct D between the carrier 352 and the blower head 252 causes the carrier 352 to move toward the distal end 350 of the duct D where it exits the duct D. The pressurized air within the duct D, behind the carrier 352, flows along sides of the transmission line 110 which can generates a motive pulling force at the distal end 353 of the transmission line 110. The flow of air can also generate a pillow of air that helps to space the transmission line 110 from the interior surface of the duct D to reduce frictional contact between the transmission line 110 and the duct. Further if the carrier does not completely seal the duct, the air will flow along the duct at a faster speed than the transmission line 110. This creates a distributed viscous drag between the air flow and the transmission line 110 that further helps to propel the fiber along the duct by pulling on the transmission line 110 along the entire length of the transmission line 110. A further advantage of this is that it reduces the required pushing and pulling forces that are localized to the distal and proximal ends of the transmission line, which if too great can result in damage to the transmission line 110.

In some embodiments the blower head 252 preferably further includes the transmission line counter assembly 366, which monitors the speed of the transmission line 110 during operation. Preferably, the transmission line counter assembly 366 also monitors the length of the transmission line 110 passing through blower head 252 from the transmission line reel 108. Similar to the line counter discussed herein for the reel stand 102, the blower can similarly include an optical counter that reads markings on the exterior of the transmission line as it passes through the blower head 252. The length is communicated to and received at the local controller 160, for communication to other components or the control unit 120. In some embodiments the transmission line counter assembly 366 is used to detect slip of the transmission line within the blower head 252. Slip typically occurs between the transmission line and the drive system of the blower, such as the upper and lower tractor drives 322, 324. One way to detect slip is to compare the measurements read by the transmission line counter assembly 366 with other speed or distance measurements in the system, such as the blower distance measurement, or from the reel. When the speeds or distances do not match (or deviate by more than a particular amount), the system can determine that the transmission line is slipping in the blower head 252. Remedial action can then be taken, such as to reduce the air pressure, alert the operator, or other remedial action.

In some embodiments the blower head 252 also includes a frame 369, which can be supported by legs, a cart, or other stand for supporting the frame 369 at a convenient level above the ground. Such supporting structure also includes wheels in some embodiments, for conveniently moving the blower head 252 between locations. Frame 369 also supports the transmission line drive assembly 360, the line blower assembly 362, and the transmission line counter assembly 366. The frame 369 also supports the local controller 160 which monitors and/or controls operation of various of the parts of blower head 252. The frame 369 allows for the various assemblies to be conveniently used and transported together as a unit.

The line blower assembly 362 includes the air block 363 which links both the transmission line 110 received from the transmission line drive assembly 360, and the compressor 114 with duct D. The duct mount assembly 364 at the duct receptacle 310 forms a portion of line blower assembly 362, and securably mounts the duct D to the blower head 252. The adjustment assembly 368 arranged below the line blower assembly 362 also forms a portion of the line blower assembly 362, and allows for vertical adjustment of the air block 363 and the duct mount assembly 364 relative to the frame 369. The adjustment is with respect to the transmission line drive assembly 360. Such vertical adjustment allows for different diameter transmission lines to be installed by the blower head 252. As the diameter of the transmission line 110 is varied, the location of the central axis of the transmission line 110 will vary as it exits the transmission line drive assembly 360. Such variance in height is adjusted in order to allow for proper sealing in the air block 363.

In some embodiments the transmission line drive assembly 360 includes the upper and lower tractor drives 322, 324. Preferably, each is driven by a hydraulic, pneumatic, or electric motor, 375, 373. Each tractor drive 322, 324 includes a moveable member. In some embodiments, an endless chain in each tractor drive 322, 324 is driven by the hydraulic motors 373, 373, respectively, so as to frictionally engage the transmission line 110 and apply the motive pushing force to the transmission line 110. In the illustrated embodiment, the tractor drives 322, 324 oppose each other and are aligned in the vertical direction. Other moveable drive members besides opposed endless chains are possible including wheels and/or belts. Further, the moveable members can be arranged in V-shape, for example.

The lower drive counter 377 monitors movement of the lower tractor drive 324, which is indicative of the speed of transmission line drive assembly 360. Such speed monitoring is important for preventing excessive relative speed between the transmission line drive assembly 360 and the transmission line 110 during slippage. The speed is communicated from the lower drive counter 377 to the local controller 160 which receives the speed. The speed can then be communicated from the local controller 160 to other components or the control unit 120.

In some embodiments the transmission line drive assembly 360 further includes a hold down system, such as a hydraulic clamp cylinder 379, linked to the hydraulic pressure source 354 by a hydraulic line. The hydraulic clamp cylinder 379 generates a predetermined normal force on the transmission line 110 between the upper and lower tractor drives 322, 324. Some slip is acceptable. Too much slip can cause transmission line jacket damage. Too much slip may also limit the usefulness of the blower head 252 if insignificant push forces are generated. The duct D usually contains some irregularities, joints and bends that can keep transmission line 110 and carrier 352 from moving smoothly. Unless an appropriate normal force is generated (not too much slip), the pushing force may be inadequate to overcome the irregularities, and slip may occur too often, causing unnecessary transmission line jacket damage or insignificant transmission line push force. On the other hand, a normal force which is too high risks crush damage to the transmission line 110, and inadequate slippage, such that column damage will be more likely to occur as the transmission line drive assembly 360 continues to move the transmission line 110 when transmission line 110 is being slowed or stopped within the duct D. When slip does occur under high normal force loads, transmission line jacket damage may result. By providing for a predetermined normal force with the blower head 252, predetermined slip levels can be monitored. This results in an appropriate level of slip, so as to not cause too many shutdowns of the blower head 252 when transmission line damage is not significantly at risk, but excessive slip is noted, and can be used to shut off the blower head 252 to prevent damage.

The blower head 252 balances the benefits and risks associated with the drive assembly 360, which generates a pushing force from a moving member frictionally engaged with the transmission line 110. The blower head 252 reduces or avoids transmission line damage (crush, column, and slippage), but allows for sufficiently long runs of continuous transmission line to be installed. Such balance comes from monitoring and controlling the normal force applied to transmission line 110, the speed of transmission line 110, and the speed of transmission line drive assembly 360.

In some embodiments the local controller 160 of the blower head 252 includes control subsystems for: monitoring and controlling the speed of the upper and lower tractor drives 322, 324; monitoring the speed of the transmission line 110; monitoring and controlling system air pressure; and monitoring and controlling the hold down system, such as the clamp cylinder 379.

Some embodiments of the blower head 252 further include a buckle sensor configured to detect buckling or the transmission line 110.

Figure 20:
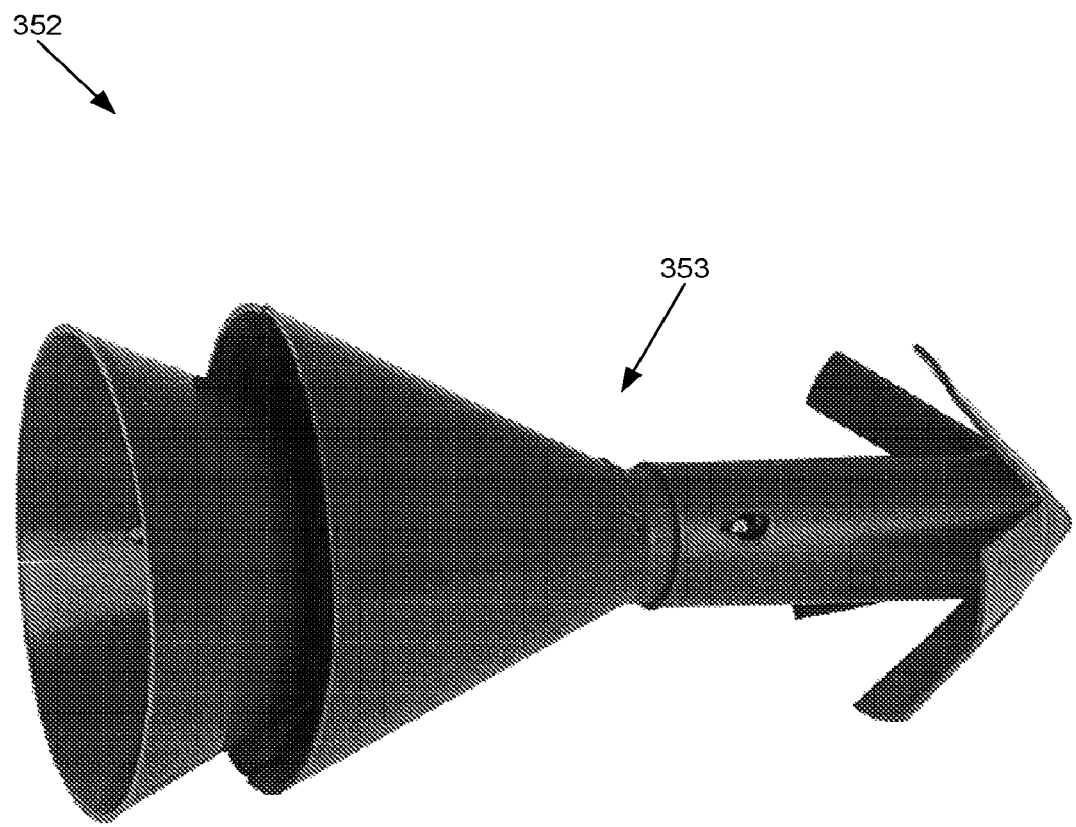
FIG. 20 is a perspective view illustrating an example of a line carrier.

FIG. 20 is a perspective view illustrating an example of a line carrier 352. The line carrier has a body 353 that is designed to be coupled to a leading end of the transmission line, and is shaped to guide the transmission line through a duct D.

Line carriers can come in a variety of configurations. In some embodiments the body 353 includes one, two, or more cone shaped features that are configured to extend across the cross-section of the duct D to catch the air supplied to the duct by the blower as the air passes through the duct. The pressure differential in front of and behind the carrier propels the carrier forward, generating a pulling force on the transmission line, that further helps to propel the line through the duct. Other types of line carriers can be used in other embodiments, such as duct projectiles, cable chute line carriers, foam carriers, and the like.

FIG. 21 is a perspective view illustrating an example of a line puller 119. In this example the line puller 119 includes a frame 355, motor 357, capstan 359, local controller 361, and elongate member 123.

The frame 355 forms a primary body of the line puller 119 and in various embodiments can be mounted to various support structures, such as a truck or trailer. The frame 355 supports a motor 357, such as a hydraulic motor. The motor 357 is coupled to the capstan 359 and operates to apply a torque to the capstan to cause the capstan to rotate, thereby pulling on an elongate member 123 coupled to an end of the transmission line.

The local controller 361 is an electronic control system for the line puller 119 and can include a local controller 160 discussed herein that communicates with a control unit 120, for example. The local controller 361 can include an electronic control box. Further, some embodiments include a foot control system that allows the operator to adjust the line puller 119 operation with a foot control. In other embodiments the line puller 119 can operate without any input from the operator, such that the foot control is not needed.

As discussed with reference to FIG. 1, the line puller 119 is a machine configured to pull a transmission line through the duct. The line puller 119 utilizes an elongate member 123 such as a wire, rod, tape, cord, or the like (collectively included within the term "line") which extends through the duct. The transmission line source 102 (FIG. 1) is positioned at one end of the duct, and the system is arranged at the opposite end of the duct. The transmission line 110 at the transmission line source 102 is then fastened to an end of the elongate member 123. The line puller 119 then pulls on the elongate member 123 which in turn pulls on the end of the transmission line 110 to advance the elongate member 123 through the duct. Other components such as blowers can also be used with the puller to generate a distributed viscous drag between the air and the transmission line that further assists in advancing the transmission line through the duct, similar to the operation of the line blower systems described herein. Additionally, the line puller 119 can be part of and used in conjunction with the line blower system 112 described herein.

Figure 22:
FIG. 22 is a perspective view illustrating an example of the control unit of the fiber optic installation system shown in FIG. 1.

FIG. 22 is a perspective view illustrating an example embodiment of the control unit 120. In this example the control unit 120 is a smartphone. FIG. 22 is another example of the control unit 120 that is also depicted and described in FIGS. 1-5.

The control unit 120 is a computing device that provides an interface between the installation technician and the transmission line installation system 100. In some embodiments the control unit 120 receives control inputs from the installation technician, such as to start and stop an installation. In some embodiments the control unit 120 provides status information to the installation technician, such as to convey the current status of the installation and to show the progress that has already been made. The control unit 120 is in data communication with one or more other components of the transmission line installation system 100, such as the transmission line conveying apparatus 104. Another example of the control unit 120 is illustrated and described in further detail with reference to FIG. 23.

In some embodiments the control unit 120 provides step-by-step installation instructions to the installation technician. The installation instructions guide the installation technician through the installation process. The installation instructions may reduce the amount of training required, and also operates to help the installation technician by acting like an installation checklist to remind the installation technician of each step of the process. Installation instructions can be communicated through a graphical user interface shown on a display device of the control unit 120. Installation instructions can also be communicated audibly through a speaker or headset.

Figure 23:
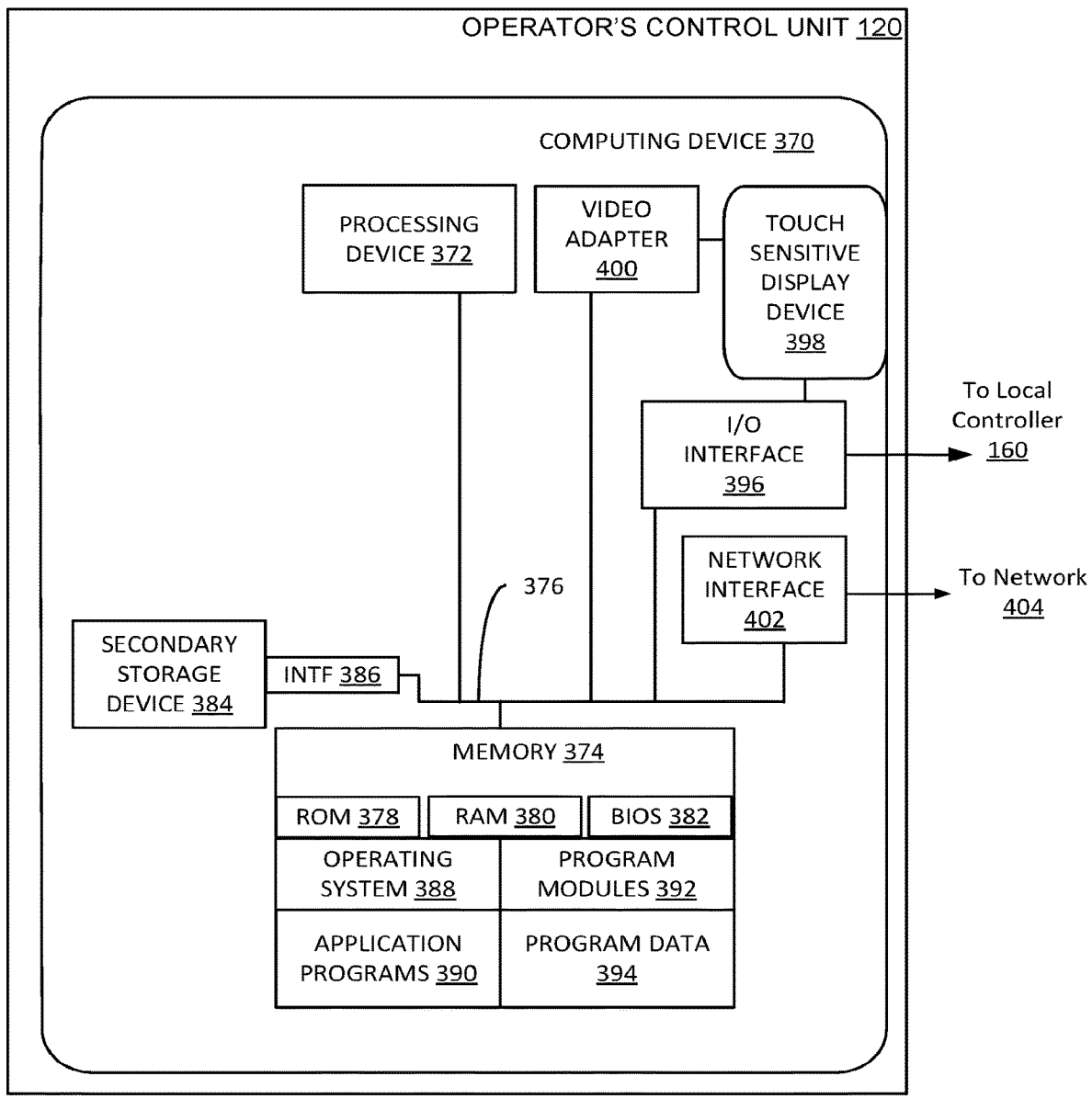
FIG. 23 is a schematic block diagram illustrating an example of the control unit shown in FIG. 16.

FIG. 23 is a schematic block diagram illustrating an example of the control unit 120, shown in FIGS. 1-5 and 22.

FIG. 23 illustrates an exemplary architecture of a computing device that can be used to implement aspects of the present disclosure, including any of the plurality of the control unit 120, the mobile computing device 128, the computing device 130, and the computing device 132. Further, the computing device can also be implemented as part of any one or more of the transmission line installation system 100 components discussed herein, such as a portion of the reel stand 106, the transmission line conveying apparatus 104 (including the compressor 114, the power source 116, and/or the transmission line blower 118. The computing device can be used to execute the operating system, application programs, and software modules (including the software engines) described herein. By way of example, the computing device will be described below as an example of the control unit 120. To avoid undue repetition, this description of the computing device will not be separately repeated herein for each of the other computing devices, including those listed above, but such devices can also be configured as illustrated and described with reference to FIG. 23.

In this example, the control unit 120 includes a computing device 370. The computing device 370 can be used to execute the operating system, application programs, methods, and software modules, and to perform any one or more of the functions of the control unit 120, described herein.

The computing device 370 includes, in some embodiments, at least one processing device 372, such as a central processing unit (CPU). A variety of processing devices are available from a variety of manufacturers, for example, Intel or Advanced Micro Devices. In this example, the computing device 370 also includes a system memory 374, and a system bus 376 that couples various system components including the system memory 374 to the processing device 372. The system bus 376 is one of any number of types of bus structures including a memory bus, or memory controller; a peripheral bus; and a local bus using any of a variety of bus architectures.

Examples of computing devices suitable for the computing device 370 include a server computer, a desktop computer, a laptop computer, a tablet computer, a mobile computing device (such as a smart phone, an iPod® or iPad® mobile digital device, or other mobile devices), or other devices configured to process digital instructions.

The system memory 374 includes read only memory 378 and random access memory 380. A basic input/output system 382 containing the basic routines that act to transfer information within computing device 370, such as during start up, is typically stored in the read only memory 378.

The computing device 370 also includes a secondary storage device 384 in some embodiments, such as a hard disk drive, for storing digital data. The secondary storage device 384 is connected to the system bus 376 by a secondary storage interface 386. The secondary storage devices 384 and their associated computer readable media provide nonvolatile storage of computer readable instructions (including application programs and program modules), data structures, and other data for the computing device 370.

Although the exemplary environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media. Additionally, such computer readable storage media can include local storage or cloud-based storage.

A number of program modules can be stored in secondary storage device 384 or memory 374, including an operating system 388, one or more application programs 390, other program modules 392 (such as the software engines described herein), and program data 394. The computing device 370 can utilize any suitable operating system, such as Microsoft Windows™, Google Chrome™, Google Android, Apple OS, Apple iOS, Linux, and any other operating system suitable for a computing device.

In some embodiments, a user provides inputs to the computing device 370 through one or more input devices, such as the touch sensitive display 398. Other input devices can also be used, such as a keyboard, mouse, pointer control device (such as a touch pad, touch stick, joy stick, etc.), microphone, and any other suitable input device. The input devices are often connected to the processing device 372 through an input/output interface 396 that is coupled to the system bus 376. Wireless communication between input devices and the interface 396 is possible as well, and includes infrared, BLUETOOTH® wireless technology, IEEE 802.11x Wi-Fi technology, cellular, or other radio frequency communication systems. Therefore, in some embodiments the I/O interface is a wireless communication device.

One or more input/output interfaces 396 can be used for communicating with other components of the transmission line installation system 100, such as the transmission line source 102, and transmission line conveying apparatus 104. The input/output interface can include AC, DC, or digital input output interfaces, including for example USB and other i/o interfaces, and can also or alternatively include one or more communication devices such as a wireless communication device, wired network communication device (e.g., a modem or Ethernet communication device), or other wired communication devices (e.g., serial bus). The I/O interface 396 can communicate with the local controllers 160 of other components of the transmission line installation system 100, for example. In some embodiments the communication includes communication of data and commands. Examples of data include sensor data, such as a temperature, humidity, transmission line length, transmission line speed, reel feed speed, and other data describing current operating conditions. Examples of commands include start, stop, setting adjustments, and the like.

In this example embodiment, a display device 398, such as a monitor, liquid crystal display device, projector, or touch sensitive display device, is also connected to the system bus 376 via an interface, such as a video adapter 400. In addition to the display device 398, the computing device 370 can include various other peripheral devices (not shown), such as a wireless headset, speakers, and a printer.

When used in a local area networking environment or a wide area networking environment (such as the Internet), the computing device 370 is typically connected to a network 404 through a network interface 402, such as an Ethernet interface, or by a wireless communication device, such as using cellular or Wi-Fi communication. In some embodiments the network interface 402 is a cellular modem that can access the Internet through a cellular network. The network interface 402 can communicate with remote systems, such as the route evaluation system 122 (including computing devices 128 and 130) and the remote control and diagnostics system 124 (including computing device 132), all of which are shown in FIG. 1.

The computing device 370 typically includes at least some form of computer readable media. Computer readable media includes any available media that can be accessed by the computing device 370. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 370. Computer readable storage media does not include computer readable communication media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 23 is also an example of programmable electronics, which may include one or more such computing devices, and when multiple computing devices are included, such computing devices can be coupled together with a suitable data communication network so as to collectively perform the various functions, methods, or operations disclosed herein. Additionally, the term computing device used herein includes multiple computing devices cooperating to perform one or more functions or sets of functions.

In some embodiments the computing device 370 includes or is connected to a location determining device, such as a geographical positioning system (GPS).

Figure 24:
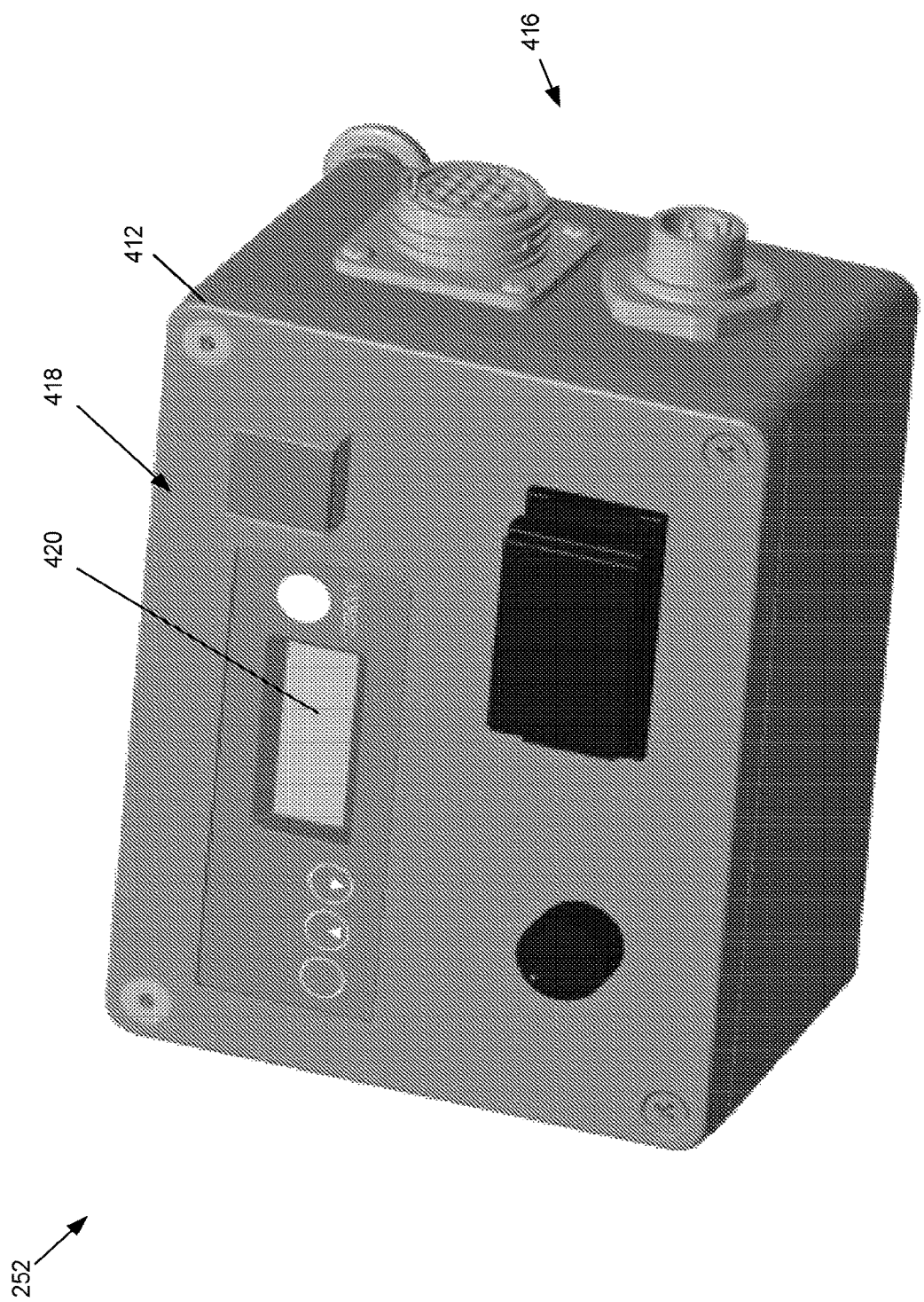
FIG. 24 is a block diagram illustrating another example of the control unit of the transmission line installation system shown in FIG. 1.

FIG. 24 is another example of the control unit 120. In this example, the control unit 120 includes a housing 412, display 414, a computing device contained within the housing, various possible input/output connectors 416, and one or more input controls 418.

The housing 412 provides a protective enclosure for the computing device contained therein. Examples of the computing device are illustrated in FIGS. 1 and 23 and described herein.

The display 414 generates a user interface display for the installation technician. An example of the display 414 is a liquid crystal display, but other embodiments include other types of displays.

The input/output connectors 416 are provided to receive power to power the control unit 120, and can also be used for data communication connections with other local controllers 160 or network communication connections. The control unit 120 includes one or more communication devices for wired or wireless communication, such as described herein.

The input controls 418 can be manipulated by the installation technician to provide inputs to the control unit 120, to control and adjust the operation of the transmission line installation system 100. For example, the input controls 418 can include one or more of: a start button, a stop button, a speed adjustment button, and one or more setup controls such as up, down, back, and select buttons that allow the installation technician to navigate menus and make selections.

Figure 25:
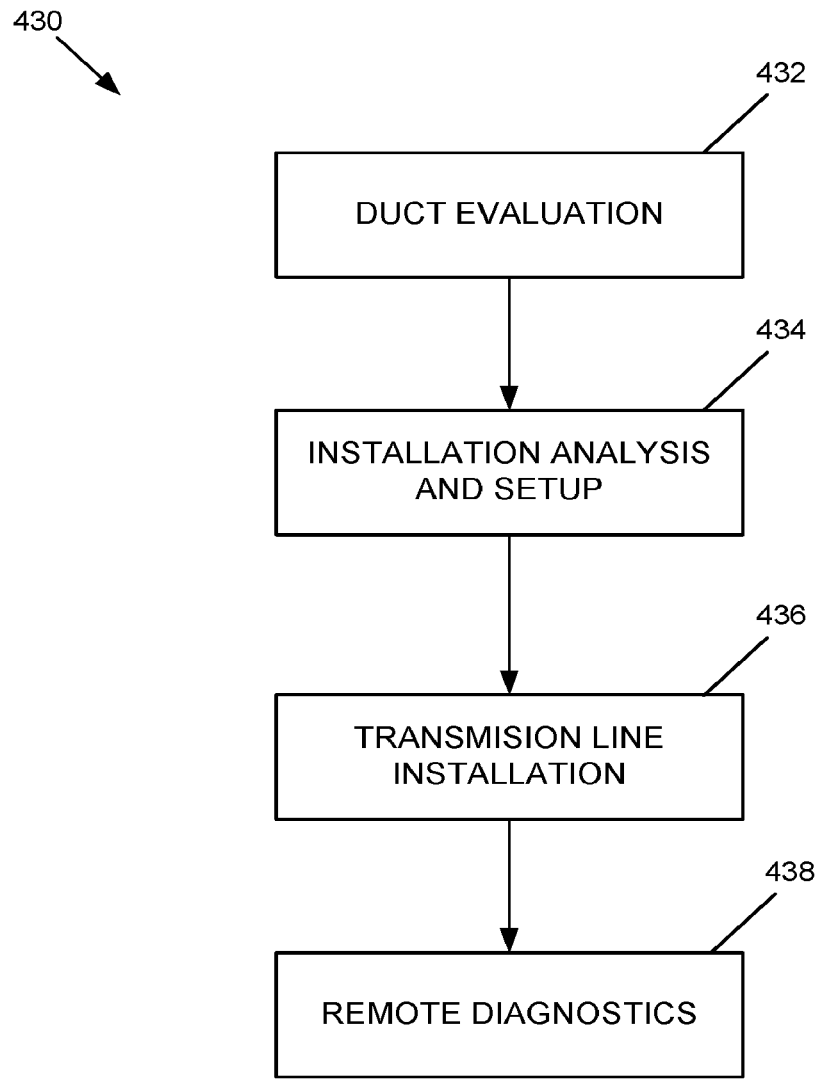
FIG. 25 is a flow chart illustrating an example method of installing a transmission line.

FIG. 25 is a flow chart illustrating an example method 430 of installing a transmission line 110. In this example the method 430 includes a duct evaluation operation 432, an installation analysis and setup operation 434, a transmission line installation operation 436, and a remote diagnostics operation 438. Other embodiments can involve fewer than all of these operations.

The duct evaluation operation 432 is performed to evaluate a duct prior to transmission line installation. An example of the duct evaluation operation 432 is illustrated and described in further detail with reference to FIGS. 26-30.

The installation analysis and setup operation 434 is performed to define the installation settings for the transmission line installation system 100 prior to transmission line installation. An example of the setup operation 434 is illustrated and described in further detail with reference to FIGS. 31-34.

The transmission line installation operation 436 is performed to install the transmission line 110 into a duct using the installation settings defined in operation 434. An example of the transmission line installation operation 436 is illustrated and described in further detail with reference to FIGS. 35-36.

The remote diagnostics operation 438 is provided to assist the installation technician in troubleshooting an installation, or otherwise getting assistance from a remote computing device and, if needed, a remote technician. An example of the remote diagnostics operation 438 is illustrated and described in further detail with reference to FIG. 37.

FIGS. 26-30 illustrate example aspects of the duct evaluation operation 432 shown in FIG. 25.

Figure 26:
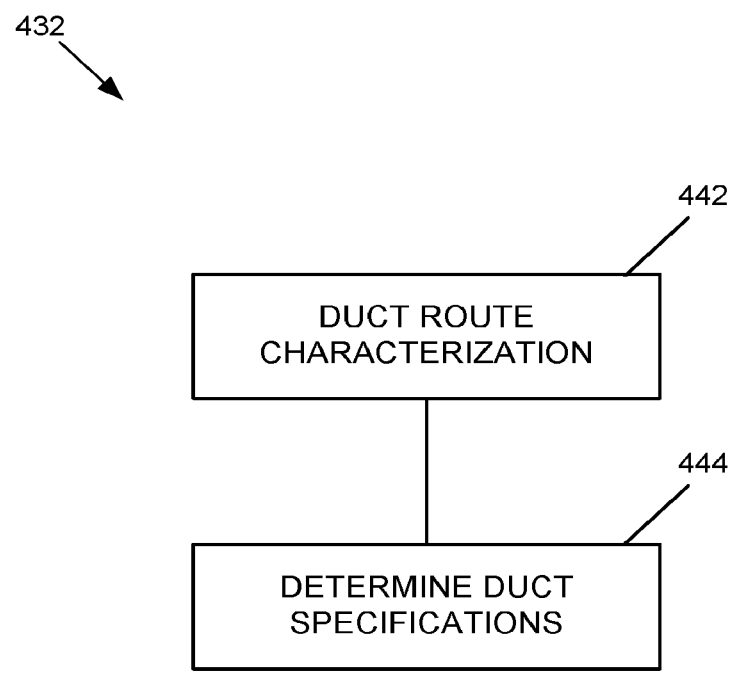
FIG. 26 is a flow chart illustrating an example of a duct evaluation operation.

FIG. 26 is a flow chart illustrating an example of the duct evaluation operation 432, shown in FIG. 25. In this example the duct evaluation operation 432 includes a duct route characterization operation 442 and a duct specifications determination operation 444.

The duct route characterization operation 442 is performed to characterize the duct route, such as to determine its starting point, ending point, and where the duct runs between the starting and ending points. Characteristics of the duct route have an impact on the transmission line installation. For example, it may be beneficial to slow down the transmission line as the leading end approaches a sharp 90 degree bend to allow the transmission line to more readily navigate the corner. Additionally, upward and downward slopes in the duct may have an impact on the optimum transmission line installation procedure. The duct route characterization operation 442 can be used to identify characteristics of the duct route, such as bends that are present at certain points of the duct and changes in slope or elevation.

In some embodiments the duct route characterization operation 442 is performed by a route evaluation system 122 separate from the transmission line conveying apparatus 104. Before transmission line installation begins, the duct route may already be known. If so, the duct route can be provided to the transmission line installation system 100, the route evaluation system 122, or the transmission line conveying apparatus. The duct route can be stored in one or more data files, such as in a geographical information system (GIS) file format, which defines the layout of the duct from the starting point to the ending point and defining positioning data. In some embodiments the duct route contains or is associated with GPS coordinates.

If the duct route is not already known, the route evaluation system 122 can be used to determine duct route. In one example, a route evaluation unit is used to characterize the duct. An example of the route evaluation unit is illustrated and described in more detail with reference to FIG. 27.

Figure 28:
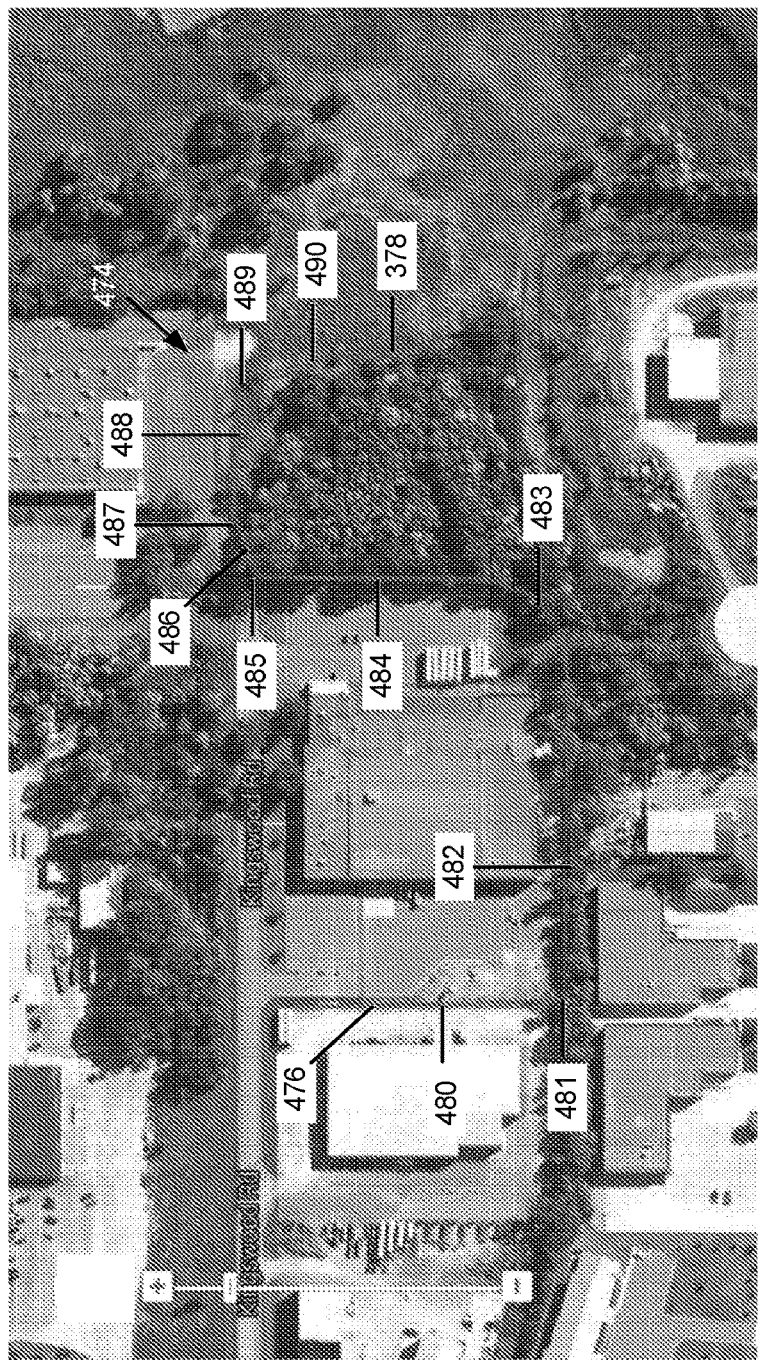
FIG. 28 is an example graphical display of a duct route.

An example of the duct route determined by the duct route characterization operation 442 is shown in FIG. 28.

An example of duct route data defining the duct route is shown in FIG. 29.

The duct specifications determination operation 444 is performed to determine non-route specifications of the duct. For example, the operation 444 can be used to determine the internal diameter of the duct, the composition of or frictional characteristics of the duct's interior coating or surface, whether the duct contains interior ribs, ridges, or other features or textures, and the like. An example of duct specifications is illustrated and described in more detail with reference to FIG. 30. The operation 444 can be performed before, after, or during operation 442.

Figure 27:
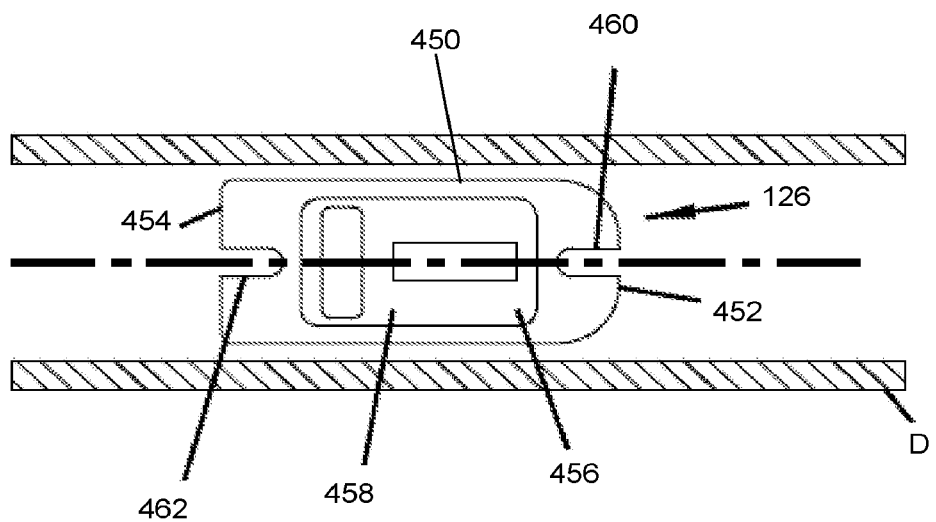
FIG. 27 is a schematic diagram of at least portions of an example of a route evaluation system, including a route evaluation unit.

FIG. 27 is a schematic diagram of at least portions of an example of the route evaluation system 122 shown in FIG. 1, including an example route evaluation unit 126, and is also an example of at least a portion of the duct route characterization operation 442 shown in FIG. 26. In this example the route evaluation unit 126 includes a body portion 450 having a first end portion 452 and a second end portion 454, an internal cavity 464, and electrical components 458. An example duct D to be evaluated is also shown.

In the depicted embodiment the system includes a route evaluation route evaluation unit 126 configured to be passed through a duct D. The route evaluation unit 126 includes a body portion 450 having a first end portion 452 arranged at a leading end of the body portion 450, and a second end portion 454 arranged at a trailing end opposite the first end portion 452.

The body portion 450 defines an internal cavity 456 configured to house electrical components 458 therein. In the depicted embodiment, the first end portion 452 includes a rounded leading surface and the second end portion 454 defines a trailing surface. A device configured to drive the route evaluation unit 126 through a duct D, for example, a line blower as described herein. The system can also include a processing device configured to receive information collected by the route evaluation unit 126 as the unit travels through the duct D to map the duct D.

In the depicted embodiment, the electrical components 458 include a battery, one or more motion sensors, as well as memory and communication electronics. An example of a motion sensor is an inertial measurement unit. The motion sensors can include one or more of an accelerometer, an angular rate sensor, and a magnetometer. In some embodiments the motion sensor includes a 6- or 9-degree of freedom microprocessor chip. The 6 degree of freedom feature is useful in that it provides 3-axis acceleration, 3-axis angular rate, and processing functions. A 9-degree of freedom microprocessor chips adds an additional 3-axis magnetic field sensor. A magnetic field sensor can be used to detect natural magnetic fields (e.g., the magnetic field of the earth) or applied magnetic fields, such as provided by magnets positioned at certain locations or at intervals along the duct. In the depicted embodiment, the electrical components are connected together to form a modular electrical unit. The modular electrical unit is configured to be removed from one unit and placed into another unit. The system can include multiple units of various sizes, each of the units configured to receive the modular electrical unit. The selection of the proper unit for a particular application can depend on the type and size of the duct. It should be appreciated that many other types of electrical components can be carried by the unit. For example, the electrical components could also include a toxic material sensor, magnetic field detector, pressure sensor, moisture sensor, or infrared scanner.

As discussed above, the route evaluation unit 126 is configured to collect position data as it moves through the duct. In some embodiments the route evaluation unit 126 is configured to transmit data so that it can be tracked as it moves through the duct, or to save the data to be subsequently delivered. In some embodiment the data is transmitted live or subsequently delivered to the computing device 130 of the route evaluation system, shown in FIG. 1. In addition to collecting position data, route evaluation unit 126 can be configured to clean the duct as it moves through the duct D, or alternatively to transfer lubricant to the duct surface. In the depicted embodiment, the route evaluation unit 126 is configured to be connected with other units. The units 126 can be configured for their own functions (e.g., one unit could be for cleaning, another for detecting moisture, and another for tracking position). In the depicted embodiment, the first end portion 452 includes a pulling eye 460 configured to connect to a duct pull cord and/or to connect to another unit, and the second end portion 454 includes an inboard link 462 configured to connect to another unit. In the depicted embodiment, the unit has an overall length of less than ten millimeters, which enables the unit to move efficiently through ducts with bends. For example, a unit having an outer diameter of between four and five millimeters (about 4.5 mm) can be blown through a 5.5 mm inner diameter duct with a minimum bend radius of 70 mm.

In the depicted embodiment, the system can further include a display configured to visually display the duct configuration, such as the display device of the computing device 130, or any of the other computing devices described herein. The unit can also include a system that provides detailed data that can be imported into blowing performance software to provide recommended flow rate, blowing pressure, and locations for blowing for example. In the depicted embodiment, the system also includes a unit trap configured to be mounted to a far end of the duct to trap the unit as it exits the duct. It should be appreciated that the system can include fewer features or more features than are described herein.

The present disclosure also provides a method for mapping a duct including selecting a unit that has a diameter that is within 5-25 percent smaller than the diameter of a duct of which the unit is configured to be blown through; inserting a modular electrical unit into the selected unit, the modular electrical unit configured to track the position of the unit; blowing the unit through the duct while the modular electrical unit collects and stores data regarding the position of the unit; and mapping the duct based on the data collected by the unit.

The method can also include providing recommended flow rate, blowing pressure, and locations for blowing based on information collected by the unit and received by the processor. In addition it can also include providing information to another software application that visually displays the mapped route.

An example of the route evaluation unit 126 is disclosed in co-pending PCT Application No. PCT/US2016/029816, filed on Apr. 28, 2016 and titled SYSTEM AND METHOD FOR MAPPING A DUCT, which claims priority to U.S. Ser. No. 62/154,470, filed on Apr. 29, 2015, the disclosures of which are hereby incorporated by reference in their entireties.

FIG. 28 is an example graphical display 472 of a duct route 474, such as received or generated by the duct route evaluation system 122 of FIG. 1, and such as determined by the duct route characterization operation 442 of FIG. 26. In this example the duct route 474 includes a starting point 476, and ending point 478, and is divided into a plurality portions including legs 480-490 (confirm correct number).

In this example the graphical display depicts the transmission line installation site S, which is a region in which the duct is installed. The site can include a region of the earth in which the duct D is installed underground (which may include under water), on the ground, or above-ground. Above-ground installation may include ceilings or walls of one or more buildings. A duct may also be arranged along above-ground structures such as telephone poles, for example. In this example, the duct route 474 is an underground installation that runs along and around several buildings and parking lots.

The example duct route includes a starting point 476 and an ending point 478. In some embodiments the starting and ending points 476 and 478 are at known locations, which can be identified by starting and ending GPS coordinates, and can be graphically represented on the site S based on the known GPS coordinates.

From the starting point 476, the duct route can be defined in various ways. One way is by individual location points taken along the length of the duct D. For example, a location may be determined and stored for each foot or meter of length of the duct. For a more detailed representation, the duct route can be determined at every inch or centimeter of length. A GPS data point can be stored for each point, for example.

Another way is to identify portions of the duct that share a common characteristic, and to store data for each of the portions. A benefit of this technique is that a long straight segment of the duct can be easily defined without having to store each individual data point.

Referring to the example duct D shown in FIG. 28, the duct can be divided into eleven segments, sometimes referred to as "legs", including legs 480-490. Leg 480 begins at the starting point 476 and extends straight in a certain direction for a certain length. It then comes to a corner defined by leg 481, which has a certain length, angle, and radius. It then proceeds to leg 482 which is another straight segment to leg 483 which has a much more gradual corner including a length, angle, and radius. The route continues in a similar manner along legs 484-490.

The duct route 474 can be defined and graphically displayed in two or three dimensions. The example shown in FIG. 28 shows a two-dimensional graphical display 472, but a three dimensional graphical display can alternatively be provided to also show changes in elevation.

Although some embodiments utilize the duct route evaluation unit 126 data to generate a duct route 474, and then utilize the duct route 474 to generate installation settings of an installation plan, another possible embodiment generates installation settings from the duct route evaluation unit 126 data directly without first generating and analyzing the duct route 474. For example, the duct route evaluation unit 126 can operate to calculate an undulations factor that identifies the extent of undulations along a duct. The undulation factor can then be used to select appropriate installation settings based on the undulation factor. Similarly, other characteristics can be identified from the duct route evaluation unit 126 data, and installation settings can therefore be selected based on the identified characteristics.

FIG. 29 illustrates an example of duct route data 502. As discussed above, the duct route can be defined in various ways. One way is to define the duct by dividing it into a plurality of sections and then characterizing each of the sections. In this example, a portion of a duct is characterized by a plurality of legs. Each leg is defined by a length and an inclination. Each bend is defined by a deviation (angle) and radius. Other route data can be used in other embodiments.

In some embodiments the route data contains GPS data points, and is stored in a standard file format. One example of a suitable file format is the comma separated values (CSV) file format. The route data file can also include other information, such as discussed in further detail herein.

The route data can be input into a GIS system, such as by importing the route data file into the GIS system. This allows the route data to be used along with other GIS data of a company or of the installation technician.

Figure 30:
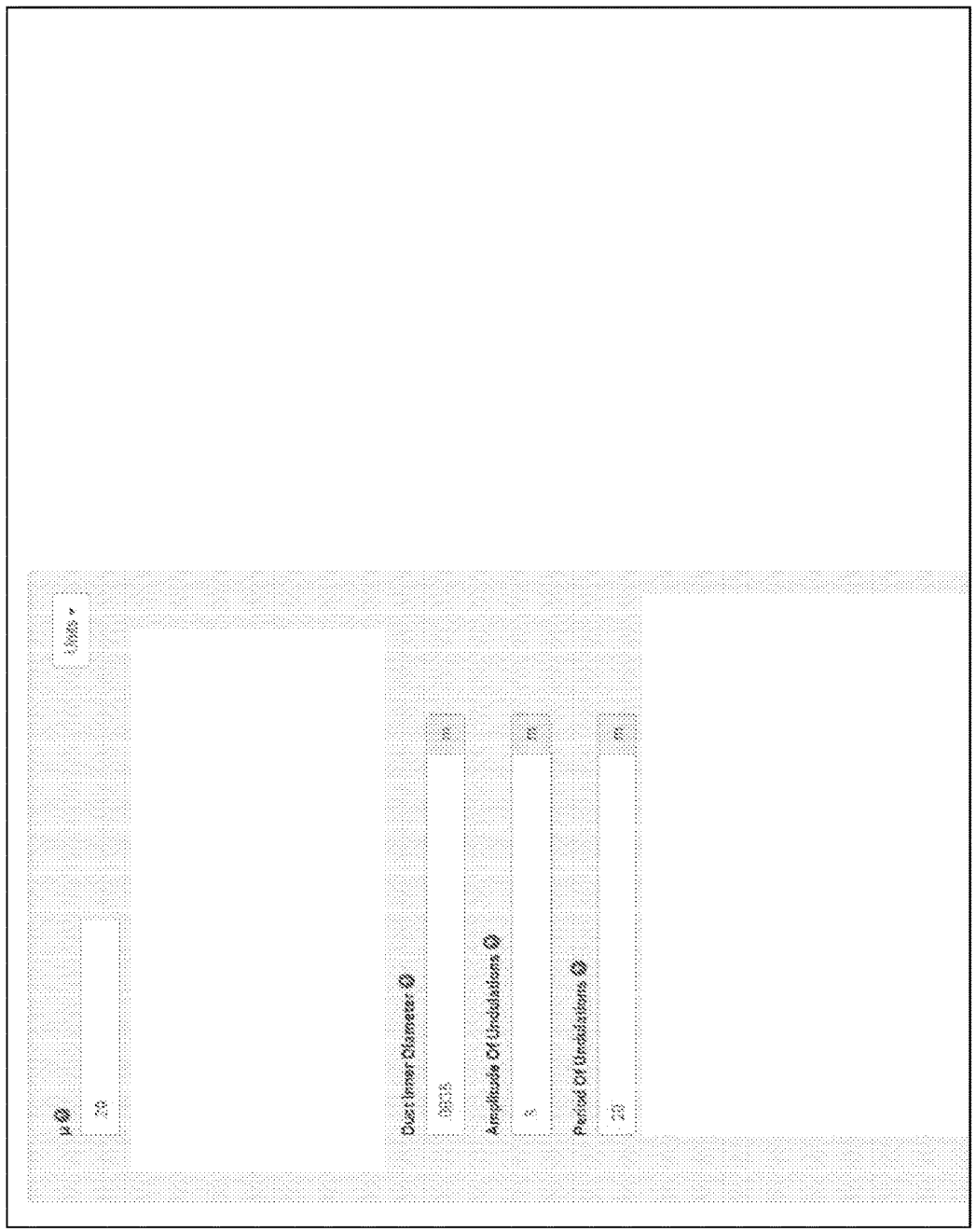
FIG. 30 illustrates an example of duct specifications.

FIG. 30 illustrates an example of duct specifications 512. In some embodiments the duct specifications 512 are determined as part of the duct specifications determination operation 444, shown in FIG. 26.

The duct specifications 512 are defined by data describing certain specifications of the duct that are relevant to the installation process. In some embodiments the duct route evaluation system 122 prompts the user to manually provide the duct specifications, such as based on a physical inspection of the duct, known duct specifications, duct manufacturer's specific sheets or data, or the like. In other embodiments, the duct evaluation system 122 prompts the user to provide or select certain information about the duct, such as a manufacturer's name and a model number of the duct (such as from a drop down menu or otherwise). A database containing duct specifications is then queried to automatically retrieve the duct specifications from the database for the identified duct. This option greatly reduces the time and knowledge required in order to determine the duct specifications for the duct D. The duct specification database can be stored on the route evaluation system 122 (computing devices 128 or 130), or on another local or remote database accessible through a data communication network, such as the computing device 132, or otherwise. In yet further embodiments the duct information is automatically identified, such as by determining a GPS coordinate associated with a starting point, and automatically retrieving information regarding the duct at that location from a database. In another embodiment, the system automatically determines whatever specifications it can, and then prompts the user to enter any remaining information that is needed. In some embodiments the user is prompted for all information that is needed, and the user does not need to navigate through menus or search for blank fields in order to identify and supply the missing information. This same functionality can be used for all operating parameters needed by the system as discussed herein.

Examples of duct specifications include the duct inner diameter, the amplitude of undulations, the period of undulations, and a coefficient of dynamic friction ($\mu$) of the inner surface of the duct.

FIGS. 31-34 illustrate example aspects of the installation analysis and setup operation 434, shown in FIG. 25. In some embodiments, the installation analysis and setup operation 434 is performed to define the installation settings for the transmission line installation system 100 prior to transmission line installation.

Figure 31:
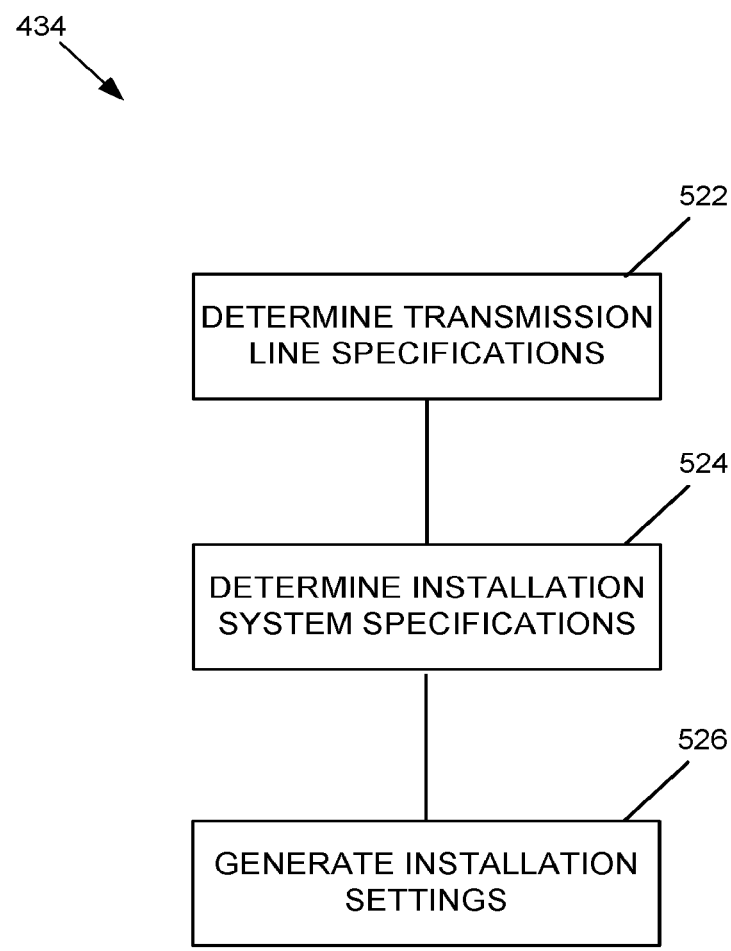
FIG. 31 is a flow chart illustrating an example of an installation analysis and setup operation.

FIG. 31 is a flow chart illustrating an example of the installation analysis and setup operation 434, shown in FIG. 25. In this example, the operation 434 includes operations 522, 524, and 526.

The operation 522 is performed to determine transmission line specifications. Similar to the duct specification determination operation 444 discussed herein, the operation 522 is performed to determine the specifications of the transmission line that is to be installed into the duct. An example of the operation 522 is illustrated and described in further detail with reference to FIG. 32.

In some embodiments the operation 524 is performed to determine installation system specifications. For example, the operation 524 can determine what components are included in the specific implementation of the transmission line installation system 100, and specifications and capabilities of those components. For example, if the air compressor 114 is being used, the operation 524 can determine the maximum pressure that the air compressor 114 can generate. If the line blower 118 is being used, the operation 524 can determine specifications and capabilities of the line blower 118 such as a maximum speed and a maximum drive force. Any other specifications and capabilities of the transmission line installation system described herein can be similarly determined.

The operation 526 is performed to generate installation settings. The installation settings define the operating parameters that will be used for the transmission line installation system in order to install the transmission line into the duct. The operation 526 utilizes at least some of the information gathered about the installation, such as the duct route characteristics, the duct specifications, the cable specifications, and the transmission line installation system specifications to generate an installation plan. The installation plan includes a set of installation settings. In one example, the installation settings are fixed for other entire installation. In another example, the installation settings vary over the course of the installation based on one or more factors. One of the factors can be a position of the leading end of the transmission line within the duct. For example, the installation plan may determine that it is best to start the installation at a first speed, but then as the leading end of the transmission line approaches a significant bend, to adjust the speed to a second speed less than the first speed until the transmission line has passed through the bend. Therefore, in some embodiments the plan defines installation settings that vary based on the position of the leading end of the transmission line along the length of the duct, to adjust the installation operation based on that position. The position can be monitored using the transmission line counter assembly 366 (FIG. 19) for example, which indicates how much of the transmission line has been installed within the duct at any given time.

Figure 32:
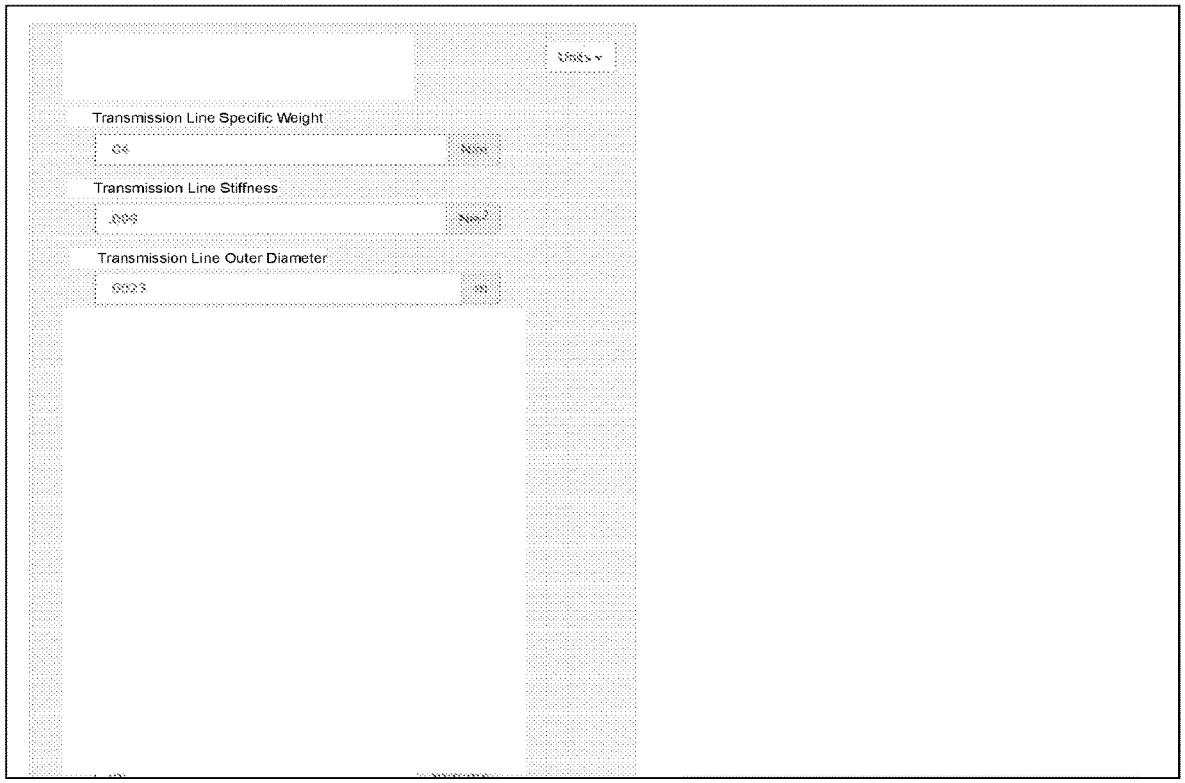
FIG. 32 illustrates an example of transmission line specifications.

FIG. 32 illustrates an example of transmission line specifications, such as determined in operation 522 shown in FIG. 27.

The transmission line specifications 522 are defined by data describing certain specifications of the transmission line that are relevant to the installation process. In some embodiments the duct evaluation system 122 prompts the user to manually provide the transmission line specifications. In other embodiments, the transmission line evaluation system prompts the user to provide or select certain information about the transmission line, such as a manufacturer's name and a model number of the transmission line (such as from a drop down menu or otherwise). A database containing transmission line specifications is then queried to automatically retrieve the transmission line specifications from the database for the identified duct. This option greatly reduces the time and knowledge required in order to determine the duct specifications for the transmission line 110. The transmission line database can be stored on the route evaluation system 122 (computing devices 128 or 130), or on another local or remote database accessible through a data communication network, such as the computing device 132, or otherwise. Further in some embodiments the information is automatically identified without requiring input by the user, and if further information is required, the user can be prompted for only that required information. In this way the system guides the user to provide exactly what is needed. In some embodiments further assistance is available to the user by clicking on a graphical icon or other selectable control proximate to the prompt, which can provide a pop-up window with more information, a link to a frequently asked questions page, an instructional video on the topic, or to initiate a technical support session, for example. In some embodiments the additional information is pre-loaded onto the control unit 120 so that it is available even if Internet, cellular, or other network connections are not available.

If a user has questions about a particular component 113 or any other part of the system, part manuals for each of the components can be pre-stored on the control unit 120 so that they are accessible even without network connectivity, and can be viewed on the control unit 120 to assist in installation or operation of the components 113.

Further, in some embodiments the system includes the ability to browse and order parts through the control unit 120 or online. In some embodiments, when a transmission line installation system 100 is originally sold (or any parts or components thereof), an identifier (e.g., a serial number) of the system or part is stored in a database along with an identifier for the sales rep that sold the system. When a new or replacement part is purchased through the control unit 120 or online, the sales rep can be identified, such as to identify and track commissions that should be paid to that sales rep.

During or before system setup, the transmission line installation system 100 can provide recommendations to the user regarding recommended components and part numbers, including a recommended blower, compressor, duct packs, and the like. In particular, if a currently connected component is insufficient to complete a transmission line installation, the user alerted to the possible deficiency, and an explanation of an appropriate component is provided, such as by model number.

In some embodiments the transmission line installation system 100 tracks maintenance status and provides maintenance recommendations to the user at appropriate times before service is required. In some embodiments the system tracks operating hours and has predefined maintenance schedules that it compares to those hours to make recommendations. In some embodiments maintenance recommendations are checked and provided when the system is turned on. In some embodiments maintenance status updates and reminders are sent via e-mail, text message, or printed and sent by mail.

Examples of transmission line specifications include the transmission line specific weight, the transmission line stiffness, and the transmission line outer diameter.

Figure 34:
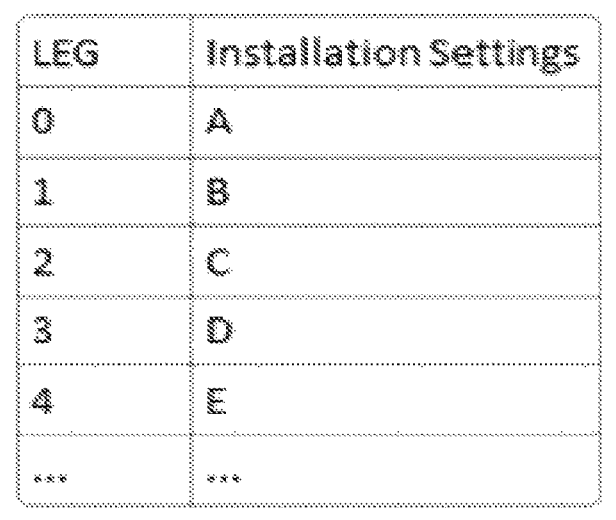

FIGS. 33-34 illustrate examples of transmission line installation plans which define installation settings for a given installation.

FIG. 33 illustrates at least a portion of an example plan for an installation having fixed installation settings. In this example, the plan specifies a recommended installation force and a recommended air flow rate. Other installation settings can be defined in other embodiments. It further suggests a particular type of line blower that could be used to complete the installation, and the predicted distance that the transmission line could be installed using those settings.

FIG. 34 illustrates another example plan for an installation. In this example, the plan has variable installation settings. More specifically, each leg of the duct route is associated with recommended installation settings for that leg. The installation settings are schematically represented in FIG. 34 by the letters A-E, which represent one or more installation settings. Additionally, the legs can be defined by starting and ending positions, such as a length along the length of the duct. For example, leg 1 may begin at 20 meters and end at 30 meters along the length of the duct.

The installation settings can include settings for multiple components of the transmission line installation system 100. For example, the installation settings can define an air pressure for the air compressor, a line advancement speed for the line conveying apparatus, and a humidity for the air modifier. The components can then work together as discussed herein to execute the installation plan.

Figure 35:
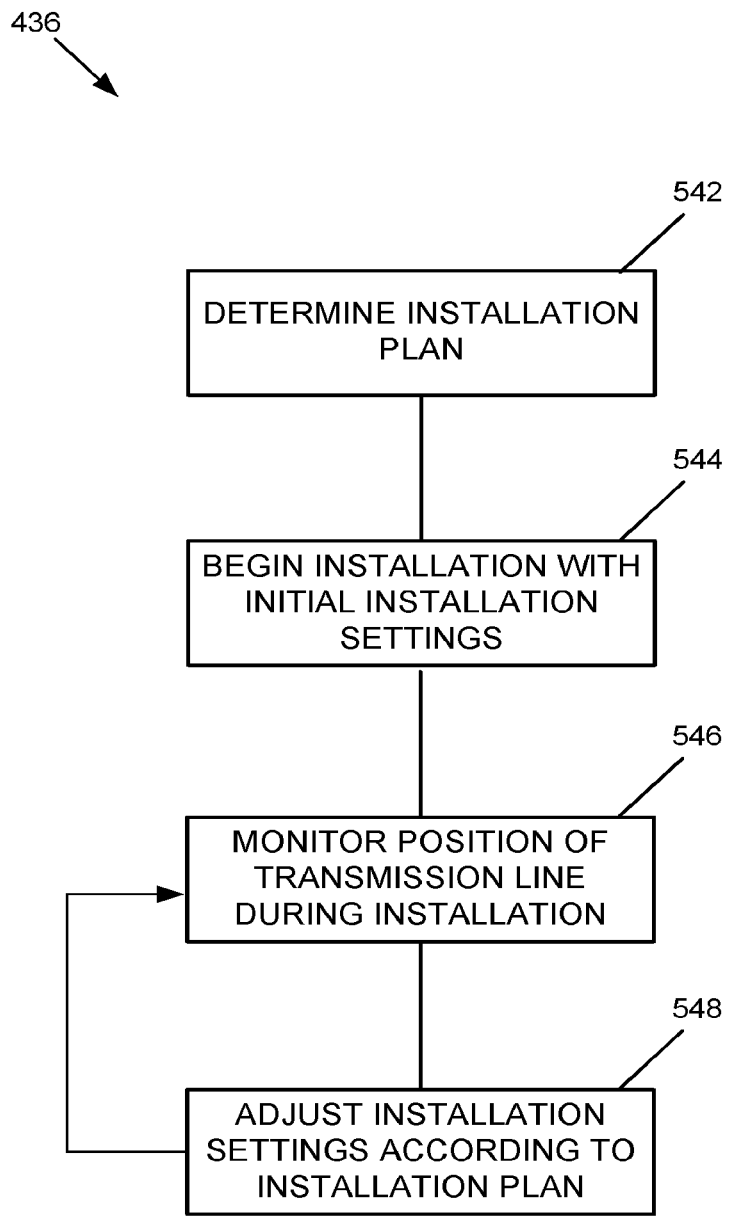
FIG. 35 illustrates an example of a transmission line installation operation.

FIG. 35 illustrates an example of the transmission line installation operation 436 shown in FIG. 25. The transmission line installation operation 436 is performed to install the transmission line 110 into a duct using the installation settings defined in operation 434. In this example the operation 436 includes operations 542, 544, 546, and 548.

Operation 542 is performed to determine the installation plan. In some embodiments the installation plan is downloaded, input, provided, or otherwise communicated to the transmission line installation system 100, such as from the route evaluation system 122 or another computing device. The installation plan may be stored and loaded as a data file, or could be manually or otherwise input or transferred into the control unit 120 (FIG. 1), for example.

The operation 544 is performed to begin installation of the transmission line using the initial installation settings. The installation plan defines initial settings for the installation, and the operation 544 begins the installation using those settings.

Figure 36:
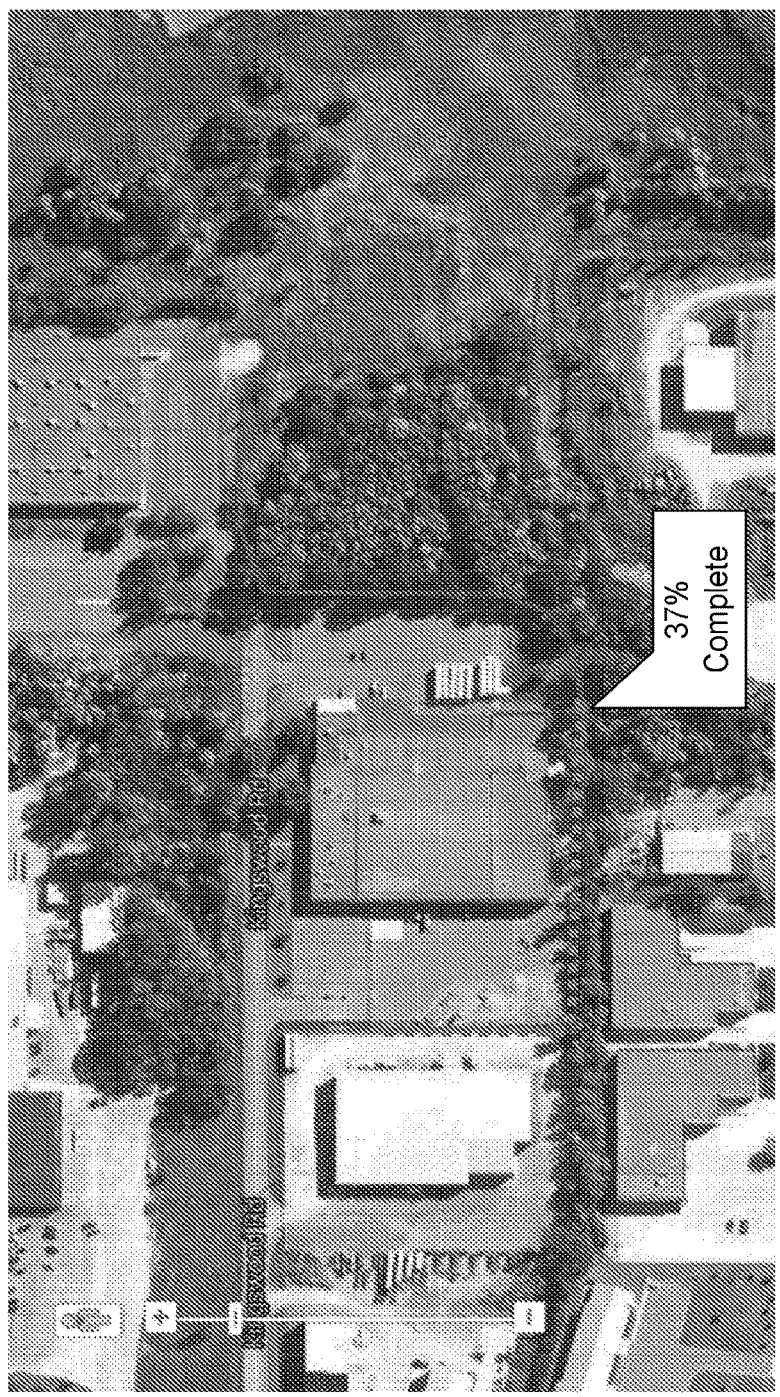
FIG. 36 illustrates an example graphical representation showing an installation status.

The operation 546 is then performed to monitor the position of the leading end of the transmission line during the installation. In some embodiments the position is monitored as a length along the length of the duct. In another example, the position is monitored as a percentage of completion. As a further example, the position can be a two- or three-dimensional location, such as a GPS location, which can be determined for example based on the length of the transmission line that has been installed and the known route of the duct. In some embodiments the progress of the installation is graphically displayed on a graphical user interface, such as shown in FIG. 36.

The operation 548 is performed to adjust the installation settings according to the installation plan. For example, as the leading end of the transmission line nears the next leg of the duct, the installation settings are adjusted in preparation for the transmission line to enter that next leg.

The process continues by repeating operations 546 and 548 until the installation has been completed.

The example shown in FIG. 35 illustrates an example in which the transmission line installation operation 436 is performed to install the transmission line 110 into a duct using the installation settings defined in operation 434. In addition to this, the installation operation 436 can also be performed to reevaluate and adjust the installation settings during the installation process. This is particularly beneficial in situations in which the installation does not proceed as expected. In such cases, the installation plan can be modified and adjusted on the fly during the installation in an effort to obtain the best results possible. For example, the installation parameters may be recalculated mid-way or at other intervals through the installation process, and the recalculated installation parameters can be used for the next portion of the installation. In some embodiments the system can provide feedback to the operator based on differences between the original plan and the actual progress.

In some embodiments a location determining device is used to identify a location of the transmission line installation system 100 (or any component thereof), such as before installation begins. The location information is then used by the transmission line installation system 100 to identify any known ducts at that location, such as any ducts that have been previously evaluated by a duct evaluation system and for which data is stored by the route evaluation system 122. In some embodiments the system presents a list of the one or more ducts to the operator, so that the operator can select the duct that will be used from the list. If only a single duct is accessible at that location, the system may automatically identify the duct based on the location. In some embodiments, upon identification of the duct, the duct route characteristics and duct specifications are retrieved from the route evaluation system 122 where they can be analyzed and processed in order to develop an installation plan.

FIG. 36 illustrates an example graphical representation showing an installation status. In this example, the graphical representation shows the duct route and a duct progress. The duct progress is graphically represented by a dashed line extending from the starting point of the route and ending at the current leading end of the transmission line. The duct progress is also shown in text, which states that the installation is "37% complete." The duct progress can also or alternatively display other information, such as a length of the installation that has been completed, a length of the installation remaining to be completed, a total length of the duct route, and any other information about the installation plan, settings, characteristics, and status, including operational statuses of the components.

Figure 37:
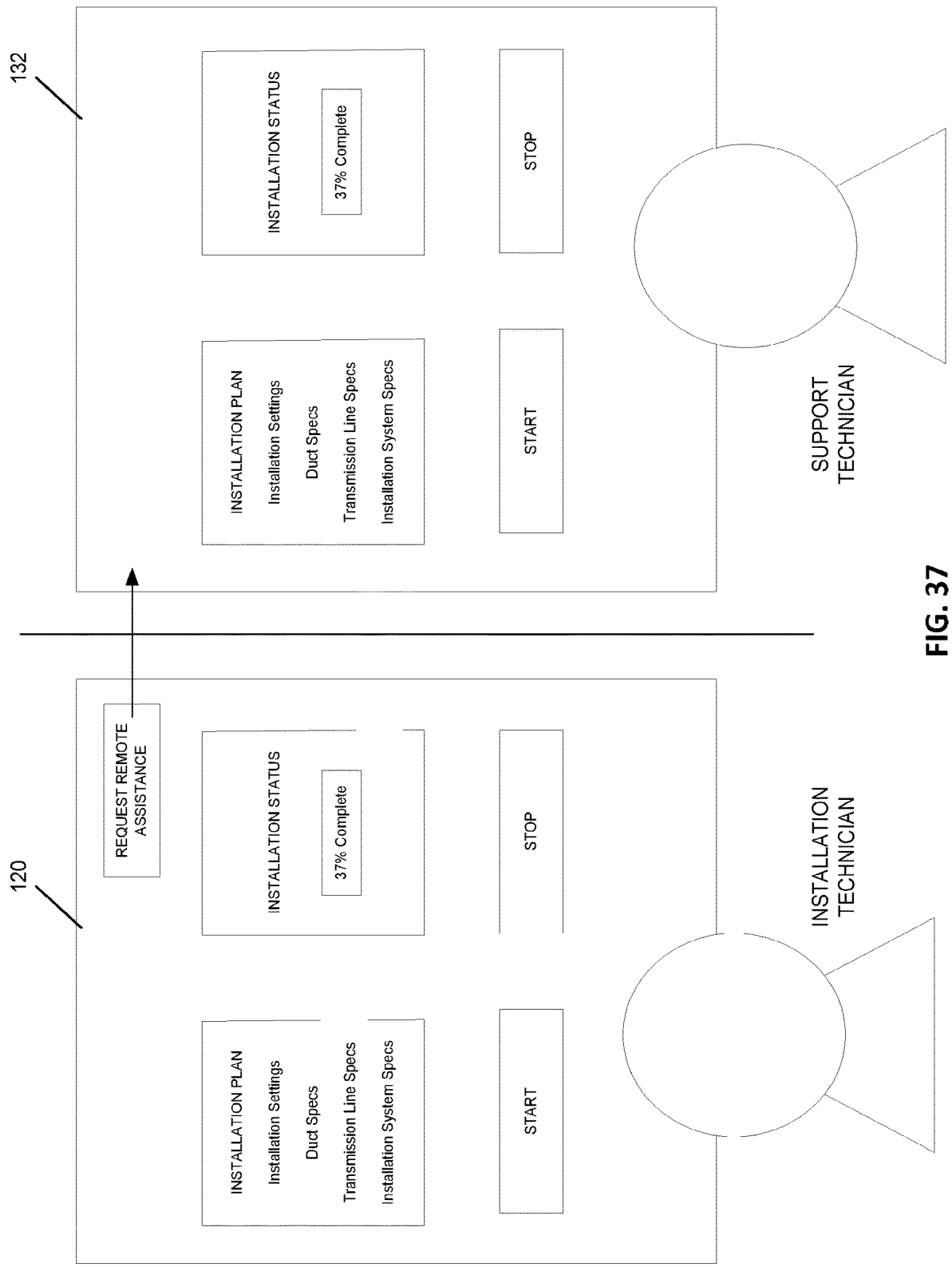
FIG. 37 illustrates an example of a remote diagnostics operation.

FIG. 37 illustrates an example of the remote diagnostics operation 438 shown in FIG. 25. The remote diagnostics operation 438 is provided to assist the installation technician in troubleshooting an installation, or otherwise getting assistance from a remote computing device and, if needed, a remote technician.

Figure 39:
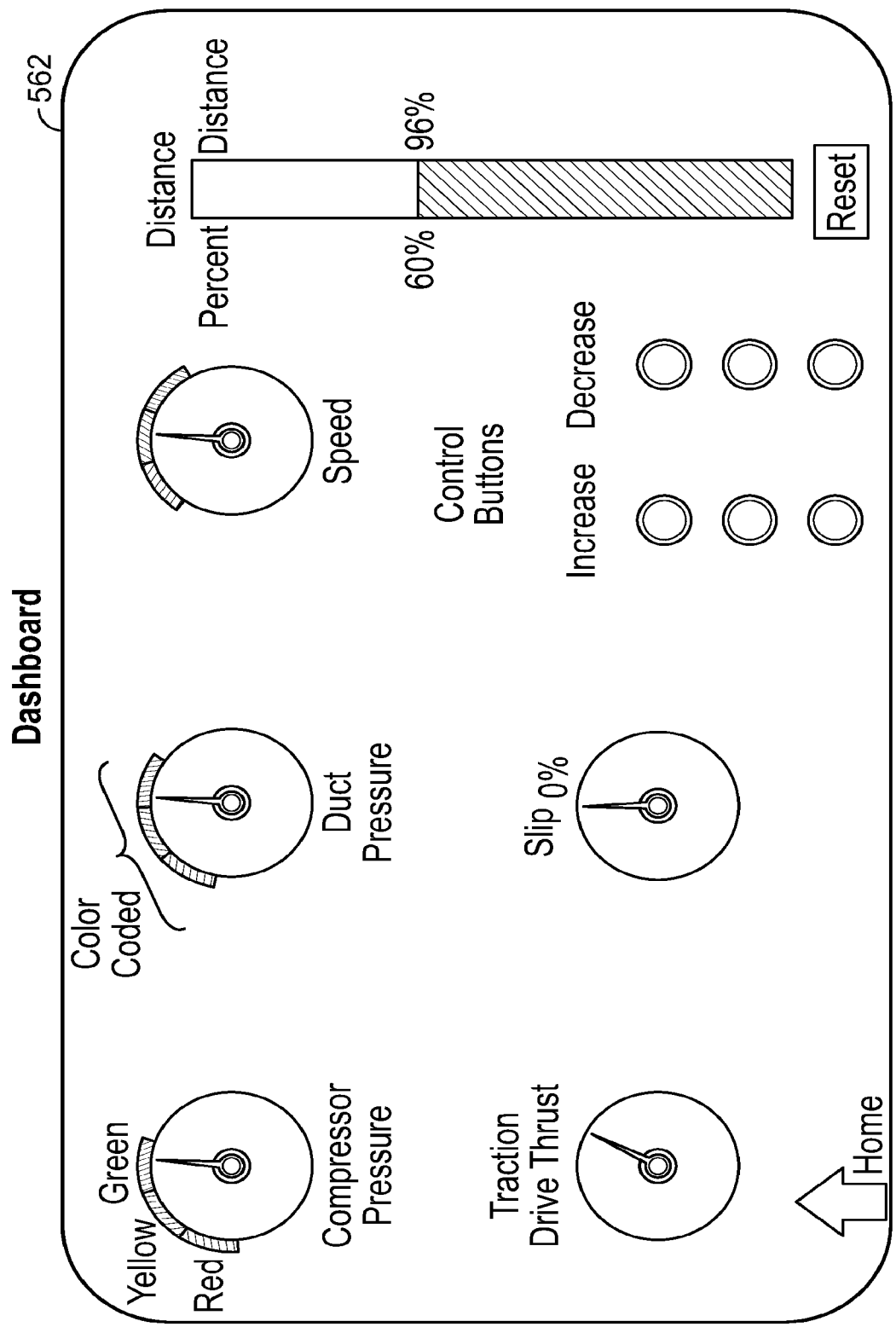
FIG. 39 illustrates an example dashboard display.

This example illustrates an example installation status screen displayed to the user on the control unit 120 regarding a transmission line installation. In this example, the installation status screen includes an installation plan window, an installation status window, and selectable controls. The installation plan window is used to display information about an installation plan. The installation status window is used to display information about the status of an installation while it is occurring. The installation status window may also include a dashboard display, such as shown in FIG. 39.

Selectable controls are provided through which the user can provide input to control the system. In the illustrated example the selectable controls include a start and stop button. The start button is used to begin the installation according to the installation plan. In some embodiments the installation then proceeds automatically to completion without further input being required from the operator. In other embodiments the operator may provide inputs to control and adjust the system during the installation process. If the operator determines that the installation should be stopped, the operator can select the stop button.

In some embodiments the installation status screen includes an option to request remote assistance. Upon selection, a troubleshooting operation is initiated, which in some embodiments includes an operation in which a remote technician is able to obtain and view information regarding the installation, such as the installation plan and the installation status. The installation plan can include any of the information known about the installation, such as the installation settings, the duct or transmission line aspects, and the installation system specs. It may also include historical or log data describing what happened in a prior attempt. In this way the remote technician is provided with a lot of information about the installation, and can interact with the installation technician during the installation process to assist the user in avoiding or identifying problems.

During the course of an installation processing, the transmission line installation system operates to keep a record of the installation, which is stored in memory. The record can include any information about the installation as discussed herein including transmission line specifications, installation system specifications, installation settings, the installation plan, data collected during the installation process from sensors or otherwise, and results of the installation. The record can stored so that it can be subsequently accessed by the installation technician, and can also be transmitted during (e.g., streamed live, as it occurs) or after the installation to a remote computing device, such as the remote control and diagnostics system 124. The remote control and diagnostics system 124 can utilize the information to monitor and advise on the installation as the installation occurs, or can be used for subsequent evaluation. Subsequent evaluation can include quality control or technical support. For example, if an installation fails the data can be evaluated by the remote control and diagnostics system 124 to attempt to identify the reason for the failure and assist the installation technician in correcting the problem or avoiding the problem during future installations. The remote control and diagnostics system 124 can also be used to permit a remote operator, such as the support technician or any other remote operator to take control of the transmission line installation system 100, such as to assist the local installation technician.

In some embodiments the record is associated with one or more identifiers, such as a serial number of the transmission line conveying apparatus 104 or the line blower 118. In some embodiments the identifier can be used to request technical support, and the support technician can receive the identifier from the installation technician, such as through a telephone call or video conference, to pull up the record and begin an evaluation of the installation. This allows the support technician to access the record very quickly, and the availability of the actual data from the installation allows the support technician to immediately begin a review of the data without the installation technician having to explain or otherwise provide the information to the support technician. It also avoids errors or misunderstandings that can occur when an installation technician provides erroneous or incomplete information regarding the installation.

Figure 38:
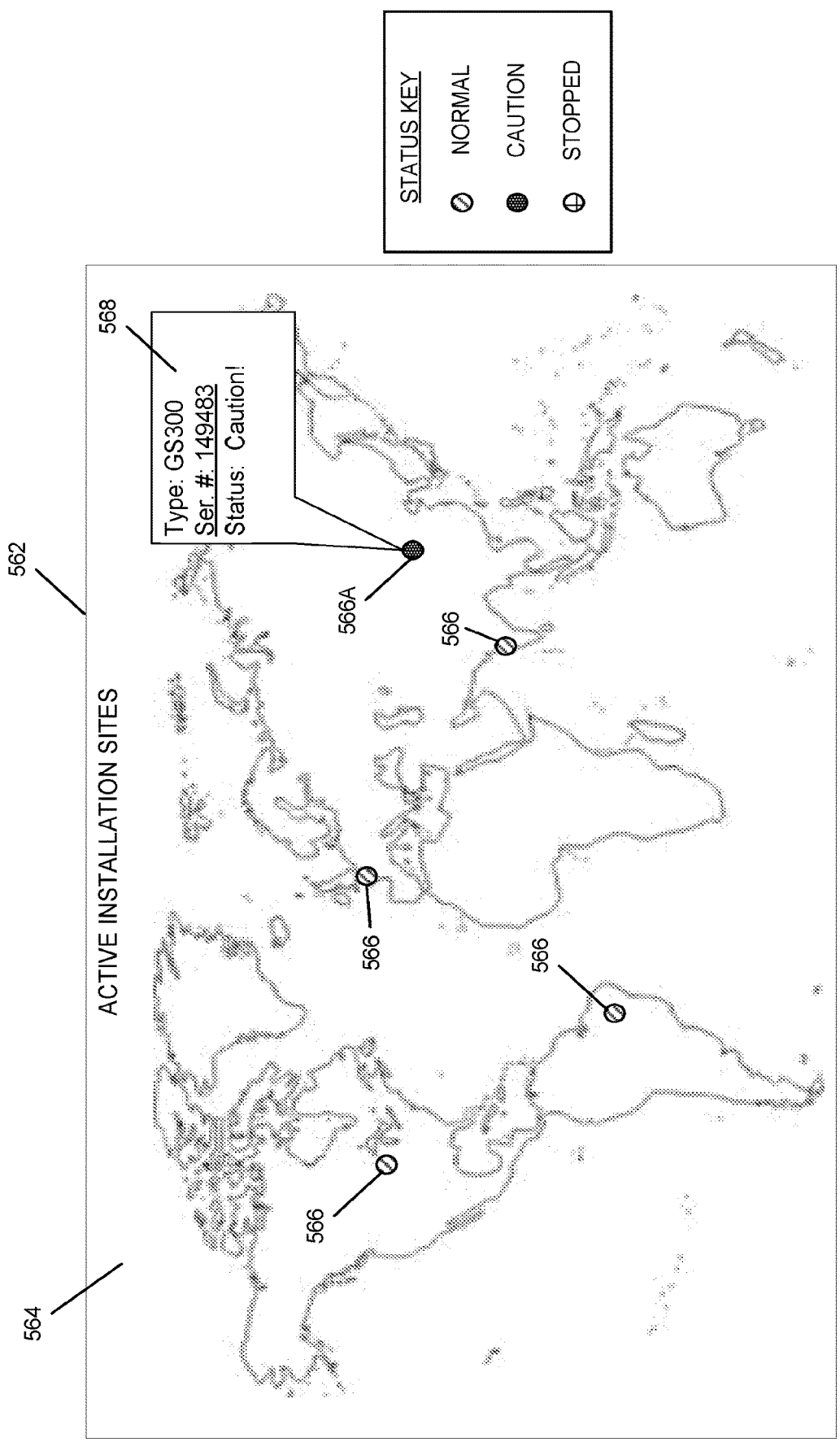
FIG. 38 is a screen shot illustrating an example graphical user interface, such as generated by a remote control and diagnostics system.

FIG. 38 is a screen shot illustrating an example graphical user interface 562, such as generated by a remote control and diagnostics system 124, shown in FIG. 1.

The screen shot shown in FIG. 38 illustrates another example user interface that can be generated and displayed on the computing device 132 of the remote control and diagnostics system 124, previously discussed with reference to FIG. 37.

In this example, the graphical user interface 562 includes a map display 564, graphical icons 566, and a site data display 568.

In some embodiments the remote control and diagnostics system 124 receives data from the transmission line conveying apparatus 104 that are actively installing transmission lines. The data can include information about the transmission line conveying apparatus (e.g., model number, serial number, and specifications of the components of the apparatus), and can also include live status data including the current configuration or settings of the apparatus, how much of the installation has been completed, and the like. The data can also include route data, which may be provided by the transmission line conveying apparatus 104, or by the route evaluation system 122 (or another source that received the data from the route evaluation system 122, for example).

Further, in some embodiments the data includes a location of the transmission line conveying apparatus 104. The location can be obtained from a location determining device that is part of the transmission line conveying apparatus 104, or of the control unit 120. An example of a location determining device is a geographical positioning system (GPS, which can obtain location information from satellites) or other positioning systems such as a Wi-Fi or cellular positioning system. In another example, the location can be determined from the route data, such as based on a starting point or an ending point of the route.

The example graphical user interface 562 provides information to a support technician to allow the support technician to monitor active installations. In this example, the graphical user interface 562 includes graphical icons 566 that represent each of the sites that are actively installing a transmission line. The graphical icons 566 are positioned on a map display 564. In this example the map display 564 includes a map of the world, but the map display can alternatively include any desired portion of the world, such as a continent, country, state, city, or an installation site. The position of the graphical icons 566 can be determined based on the known location of the transmission line conveying apparatus 104, such as discussed herein.

In this example each graphical icon includes a status identifier. An example of a status identifier is a color code. For example, the graphical icons 566 can be filled with or otherwise displayed in a color representing the status of the respective transmission line conveying apparatus. As shown in the example status key, this example includes three color codes including a first color representing a normal status, a second color representing a caution status, and a third color representing a stopped status. Example of the status color codes are green, yellow, and red, respectively.

The example depicts five active installation sites 566, five of which have a normal status, and one (566A) having a caution status. No installation site has a stopped status in this example.

If the support technician wishes to obtain additional information about an installation site, the graphical icons 566 are selectable. In this example, the support technician has selected graphical icon 566A, which causes the graphical user interface 562 to generate the site data display 568 for that site.

The site data display 568 provides additional information regarding the active installation site. In this example the site data display 568 provides information including a model and serial number of the transmission line conveying apparatus (or a portion thereof), and the status of the transmission line conveying apparatus.

In some embodiments further information is available by selecting the site data display 568, such as by selecting the serial number. For example, in some embodiments upon selection of the site data display 568 a graphical user interface such as shown in FIG. 37 is displayed, which provides more information regarding the transmission line conveying apparatus and the current status of the installation. Examples of such information include a pressure being used, speed of installation, push force, distance completed, moisture content or humidity, or any other available information.

In some embodiments the support technician can initiate communication with the installation technician, such as when the support technician has advice, suggestions, or instructions for the installation technician. The communication can be in the form of a message, or oral communication. As one example, the support technician might question why the pressure is only at 8 bars for the current installation, and might suggest that the pressure should be increased to 10 bars. A reply from the installation technician indicating that the transmission line conveying apparatus only has a 5 bar compressor can help the support technician advise on resulting issues. Alternatively, the installation technician may provide an input to the system to adjust the pressure to 10 bars. Upon correction, the status is updated in the graphical user interface 562 to normal as the installation proceeds to completion.

In some embodiments the status of a particular site can be determined automatically by the remote control and diagnostics system 124. One way that this can occur is by generating or receiving an installation plan that defines the proper specifications and operating parameters for the installation, and then comparing the data received from the site. Some variation from the plan may be permitted, but threshold values and alerts can be established that define when the variation triggers a caution status or when the installation is deemed to have failed and triggers a stopped status. Other rules and statuses can be defined based on other criteria, such as any one or more parameters or combinations of parameters.

FIG. 39 illustrates an example dashboard display 580, such as can be displayed to an installation technician on the control unit 120, or to a remote support technician. In one possible embodiment the dashboard display 580 is an example of the installation status window shown in FIG. 37.

In this example, the dashboard display 580 includes graphical indicators that convey information about the current status of a transmission line installation. In this example the indicators present the compressor pressure, duct pressure, speed, distance, traction drive thrust, and slip. In some embodiments the graphical indicators include color-coded ranges that identify, for example, a normal operating range (in a first color, such as green), and one or more abnormal operating ranges (e.g., in a second color, such as yellow, and a third color, such as red). The operating ranges and particular values associated with the ranges can be customized depending on the particular configuration and capabilities of the transmission line installation system 100, and the components 113 that are being used. They may also be customized based on the original installation plan, or an extent of deviation from that plan.

In some embodiments the dashboard may also include one or more control buttons to allow the operator to make adjustments to the operation, such as to increase or decrease certain installation parameters (e.g., air pressure, speed, etc.)

Although the present disclosure refers to examples of transmission line installation systems, the hardware, methods, principles, and concepts can also be used in other systems and implementations. For example, in some embodiments are directed to an installation system. One example of an installation system is a transmission line installation system. Other examples of installation systems and other suitable applications include a conduit installation system, for installing a duct or other conduit, a microtrenching system, a horizontal directional drilling system, a power cable pulling system, a cable plowing system, and a pipe locating system. The installation system includes a plurality of components, each of which includes at least a local controller configured to interact with the component, and a communication device configured to communicate with a control unit 120 and/or local controllers 160 of other components 113.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A transmission line installation system comprising:
a control unit comprising a processing device, a computer-readable storage device, a communication device, a display device, and at least one input device, the control unit being configured to display status information and to receive input from a user; and
a line blower system operable to advance a transmission line through a conduit, the line blower system comprising a plurality of components each including a local controller operable to communicate with the control unit and locally control the associated component, the local controllers of the components comprising a processing device, a computer-readable storage device, and a communication device, wherein the communication devices of the local controllers are capable of communicating with each other, without being controlled by the control unit, to: synchronize operation of the components and utilize information from other components during installation of the transmission line.

2. The transmission line installation system of claim 1, wherein one of the components is a line blower comprising a blowing head.

3. The transmission line installation system of claim 2, wherein another of the components is a reel stand.

4. The transmission line installation system of claim 3, wherein another of the components is an air compressor.

5. The transmission line installation system of claim 4, wherein another of the components is a power source.

6. The transmission line installation system of claim 3, wherein communications with the reel stand and the line blower synchronize operation of line blower with operation of the reel stand.

7. The transmission line installation system of claim 6, wherein at least some of the communication is peer-to-peer communication directly between the reel stand and the line blower.

8. The transmission line installation system of claim 7, wherein the peer-to-peer communication is wireless communication.

9. A transmission line installation system comprising:
a control unit configured to receive instructions from a user; and
a line blower system operable to advance a transmission line through a conduit, the line blower system comprising a plurality of components each including a local controller comprising a processing device and a communication device, each local controller operable to communicate with the control unit and operable to locally control the associated component in accordance with the instructions, wherein the local controllers are capable of communicating with each other, without being controlled by the control unit, to: synchronize operations of the plurality of components and utilize information from other components during the advancing of the transmission line.

10. The transmission line installation system of claim 9, wherein the control unit communicates with the local controllers to send the instructions to the local controllers.

11. The transmission line installation system of claim 9, wherein the plurality of components comprise a line blower configured to advance the transmission line through the conduit, a reel stand, and an air compressor.

12. A transmission line installation system comprising:
a control unit configured to receive instructions from a user;
a transmission line conveying apparatus comprising:
a transmission line source for supplying a transmission line;
a transmission line blower having a transmission line receptacle to receive the transmission line and a conduit receptacle to receive a conduit, the transmission line blower configured to generate a motive force to advance the transmission line through the conduit; and
an air compressor, configured to provide a source of pressurized air to the transmission line blower; and
wherein each of the transmission line source, the transmission line blower, and the air compressor includes a local controller comprising a processing device and a communication device, each local controller operable to locally control the transmission line source, the transmission line blower, and the air compressor respectively in accordance with the instructions, and each local controller is configured to communicate with at least one of: the control unit, and at least one of the other local controllers, to synchronize operations of the transmission line source, the transmission line blower, and the air compressor during the advancing of the transmission line, wherein the local controllers are capable of communicating with each other, without being controlled by the control unit, to utilize information received from other local controllers.

13. The transmission line installation system of claim 12, wherein the motive force includes a propelling force generated by the pressurized air.

14. The transmission line installation system of claim 12, wherein the transmission line blower further includes a transmission line drive assembly, and the motive force includes a frictional force generated by a frictional engagement between the transmission line and the transmission line drive assembly.

15. The transmission line installation system of claim 14, wherein the transmission line drive assembly includes an upper tractor drive and a lower tractor drive, and the transmission line is frictionally engaged between the upper tractor drive and the lower tractor drive.

16. The transmission line installation system of claim 15, wherein the local controller of the transmission line blower is configured to monitor and control:
a speed of the transmission line;
a speed of the upper tractor drive and the lower tractor drive; and
a pressure of the pressurized air.

17. The transmission line installation system of claim 12, wherein the local controller of the air compressor is configured to monitor and control at least one of:
a pressure of the pressurized air;
a temperature of the pressurized air; and
a humidity of the pressurized air.

18. The transmission line installation system of claim 17, wherein the air compressor comprises an air modifier controlled by the local controller of the air compressor and configured to modify at least one of:
a temperature of the pressurized air; and
a humidity of the pressurized air.

19. The transmission line installation system of claim 12, wherein the transmission line source comprises:
   a reel stand for supplying the transmission line; and
   a motor controlled by the local controller of the transmission line source and configured to generate a force to control rotation of the transmission line reel.

20. The transmission line installation system of claim 19, wherein the transmission line source further comprises:
   a transmission line tension sensor operable to measure a tension on the transmission line as the transmission line comes off the transmission line reel.

21. The transmission line installation system of claim 12, wherein the local controllers are capable of communicating directly with each other.

22. The transmission line installation system of claim 12, wherein the local controllers capable of operating autonomously from the control unit.

\* \* \* \* \*